(12) United States Patent
Huo et al.

(10) Patent No.: US 12,309,447 B2
(45) Date of Patent: May 20, 2025

(54) VIDEO PROCESSING METHOD AND ELECTRONIC DEVICE

(71) Applicant: HONOR DEVICE CO., LTD., Shenzhen (CN)

(72) Inventors: Weilong Huo, Shenzhen (CN); Zhen Dong, Shenzhen (CN); Shiyu Zhu, Shenzhen (CN); Zuochao Zhang, Shenzhen (CN); Dong Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/014,553

(22) PCT Filed: Sep. 9, 2022

(86) PCT No.: PCT/CN2022/118146
§ 371 (c)(1),
(2) Date: Jan. 5, 2023

(87) PCT Pub. No.: WO2023/065884
PCT Pub. Date: Apr. 27, 2023

(65) Prior Publication Data
US 2024/0276055 A1    Aug. 15, 2024

(30) Foreign Application Priority Data

Oct. 22, 2021  (CN) .......................... 202111236237.6
Jan. 30, 2022  (CN) .......................... 202210114564.2

(51) Int. Cl.
*H04N 21/40*     (2011.01)
*H04N 5/76*      (2006.01)
*H04N 21/431*    (2011.01)

(52) U.S. Cl.
CPC ............. *H04N 21/431* (2013.01); *H04N 5/76* (2013.01)

(58) Field of Classification Search
CPC ........ H04N 21/431; H04N 5/76; H04N 23/64; H04N 21/41407; H04N 21/4312;
(Continued)

(56) References Cited

U.S. PATENT DOCUMENTS 6,954,894 B1 * 10/2005 Balnaves ............. G11B 27/034
                                                         715/202
9,418,702 B1 *  8/2016 Arepalli ............... G11B 27/036
(Continued)

FOREIGN PATENT DOCUMENTS

CN        105432067 A  *  3/2016  ........... G06F 3/0482
CN        105979188 A     9/2016
(Continued)

OTHER PUBLICATIONS

CN111061912A English translation, Published Apr. 24, 2020, pp. 1-23. (Year: 2020).*
(Continued)

*Primary Examiner* — Laurie A Ries

(57) ABSTRACT

A video processing method and an electronic device are provided. Includes: recording a first video in response to a first operation of a user; displaying a first interface, where the first interface is a play interface of the first video, includes a first control and a first area, the first area displays a thumbnail of a first photo and a thumbnail of a second photo, the first photo is automatically taken at a first moment, the second photo is automatically taken at a second moment, a recording process of the first video includes the first moment and the second moment; displaying a second interface in response to a second operation with respect to the first control, where the second interface is a play (Continued)

interface of a second video, duration of the second video is less than duration of the first video, the second video includes at least the first photo.

17 Claims, 48 Drawing Sheets

(58) Field of Classification Search
CPC ......... H04N 21/4334; H04N 21/47205; H04N 21/47217; H04N 21/8549; H04N 5/772; H04N 23/631; H04N 9/8227; H04N 23/66; H04N 23/62; G11B 27/034; G11B 27/102; G11B 27/327; G11B 27/34; H04M 2250/52; H04M 1/72403
See application file for complete search history.

(56) References Cited

U.S. PATENT DOCUMENTS

| | | | | |
|---|---|---|---|---|
| 10,529,384 | B2 * | 1/2020 | Chen | H04N 21/6587 |
| 10,701,435 | B2 * | 6/2020 | Li | H04N 21/44008 |
| 11,030,987 | B2 * | 6/2021 | Song | G10H 1/0033 |
| 11,490,157 | B2 * | 11/2022 | Peng | H04N 21/44008 |
| 11,856,286 | B2 * | 12/2023 | Li | H04N 23/45 |
| 2009/0309989 | A1 | 12/2009 | Tanaka et al. | |
| 2012/0182445 | A1 * | 7/2012 | You | H04N 1/00411 |
| | | | | 348/231.2 |
| 2013/0101220 | A1 * | 4/2013 | Bosworth | G06F 18/22 |
| | | | | 382/195 |
| 2015/0341546 | A1 | 11/2015 | Petrescu et al. | |
| 2015/0350559 | A1 * | 12/2015 | Kosaka | G06T 15/30 |
| | | | | 348/240.1 |
| 2016/0027476 | A1 | 1/2016 | Shimokawa et al. | |
| 2016/0343345 | A1 * | 11/2016 | Moon | H04N 21/42222 |
| 2017/0025152 | A1 | 1/2017 | Jaime et al. | |
| 2017/0026667 | A1 * | 1/2017 | Pasko | G11B 27/28 |
| 2020/0321029 | A1 * | 10/2020 | Cui | H04N 5/77 |
| 2021/0382941 | A1 | 12/2021 | Wu et al. | |
| 2022/0385997 | A1 | 12/2022 | Zhong et al. | |
| 2022/0415361 | A1 * | 12/2022 | Wang | G11B 27/031 |
| 2023/0116044 | A1 * | 4/2023 | Han | G11B 27/34 |
| | | | | 348/220.1 |
| 2024/0129621 | A1 * | 4/2024 | Yi | G06F 3/04842 |
| 2024/0412542 | A1 * | 12/2024 | O'Neill | G06V 20/49 |

FOREIGN PATENT DOCUMENTS

| | | | | |
|---|---|---|---|---|
| CN | 107911644 | A * | 4/2018 | ......... H04N 21/4788 |
| CN | 108307230 | A | 7/2018 | |
| CN | 109151546 | A | 1/2019 | |
| CN | 110263220 | A | 9/2019 | |
| CN | 110891144 | A | 3/2020 | |
| CN | 111061912 | A * | 4/2020 | ........... G06F 16/732 |
| CN | 112954218 | A * | 6/2021 | ......... H04N 5/23216 |
| CN | 115002340 | A | 9/2022 | |
| EP | 3859561 | A1 | 8/2021 | |
| EP | 4044581 | A1 | 8/2022 | |
| WO | WO-2019083588 | A1 * | 5/2019 | ........... G06F 1/1694 |
| WO | 2021104508 | A1 | 6/2021 | |
| WO | WO-2021104159 | A1 * | 6/2021 | ........... G06F 16/538 |
| WO | 2021163884 | A1 | 8/2021 | |
| WO | 2021196903 | A1 | 10/2021 | |

OTHER PUBLICATIONS

CN107911644A English translation, published Apr. 13, 2018, pp. 1-11. (Year: 2018).*

CN10543067A English translation, published Mar. 23, 2016, pp. 1-10. (Year: 2016).*

* cited by examiner

VIDEO PROCESSING METHOD AND ELECTRONIC DEVICE

This application is a National Stage of International Application No. PCT/CN2022/118146, filed on Sep. 9, 2022, which claims priority to Chinese Patent Application No. 202111236237.6, filed on Oct. 22, 2021 and Chinese Patent Application No. 202210114564.2, filed on Jan. 30, 2022. All of the aforementioned applications are incorporated herein by reference in their entireties.

TECHNICAL FIELD

This application relates to the field of electronic devices, and more specifically, to a video processing method and an electronic device.

BACKGROUND

With continuous development of intelligent terminals, photographing and video recording are essential functions of the intelligent terminals. Users' needs and experience for recording and photographing are continuously increasing. In some shooting scenes, users expect to simultaneously capture memorable photos of magic moments and wonderful videos. However, in existing technologies of intelligent terminal cameras, image quality of magic moments obtained in a video shooting process is poor, resulting in poor user experience.

SUMMARY

In view of this, this application provides a video processing method, an electronic device, a computer-readable storage medium, and a computer program product, so that a user can simultaneously obtain a high-quality photo of a magic moment and a wonderful video during video recording, thereby greatly improving user experience.

According to a first aspect, a video processing method is provided, including:
  recording a first video in response to a first operation of a user;
  displaying a first interface, where the first interface is a play interface of the first video, the first interface includes a first control and a first area, the first area displays a thumbnail of a first photo and a thumbnail of a second photo, the first photo is automatically taken at a first moment, the second photo is automatically taken at a second moment, and a recording process of the first video includes the first moment and the second moment; and
  displaying a second interface in response to a second operation with respect to the first control, where the second interface is a play interface of a second video, duration of the second video is less than duration of the first video, and the second video includes at least the first photo.

The foregoing method may be performed by a terminal device or a chip in the terminal device.

Based on the foregoing technical solution, in the process of recording a video, by automatically identifying a magic moment and triggering photographing at the magic moment, it is possible to obtain a high-quality photo of the magic moment and a wonderful video. A user can view photos (a first photo and a second photo) of magic moments associated with a recorded original video (a first video) and a selected short video (a second video), improving user experience.

In a possible implementation, the method further includes:
  displaying a third interface in response to a third operation of the user, where the third interface is an interface of a gallery application, and the third interface includes a second control; and
  the displaying a first interface includes displaying the first interface in response to a fourth operation with respect to the second control.

In a possible implementation, the third interface further includes a first prompt window, and the first prompt window is used to prompt the user that the first photo and the second photo have been generated.

In a possible implementation, brightness of the first prompt window and brightness of the first area are higher than brightness of an area except the first area and the first prompt window in the first interface.

When the first video enters the gallery application for the first time, the first prompt window is highlighted to guide the user in viewing photos in a magic moment area, and draw attention of the user to the first prompt window, thereby achieving a more striking reminding effect and improving user experience.

In a possible implementation, the method further includes:
  stopping recording of the first video in response to a fifth operation of the user, and displaying a fourth interface, where the fourth interface includes a thumbnail previewing option; and
  the displaying a third interface in response to a third operation of the user includes:
  displaying the third interface in response to a sixth operation of the user with respect to the thumbnail previewing option.

In a possible implementation, the fourth interface further includes a second prompt window, where the second prompt window is used to prompt the user that the first photo, the second photo, and the second video have been generated.

In a possible implementation, before recording the first video, the method further includes:
  enabling a "one record for multiple gains" function in response to a seventh operation of the user.

In a possible implementation, the first interface further includes a playing progress bar, where the playing progress bar is used to display playing progress of the first video.

In a possible implementation, the second interface further includes a music control, and the method further includes:
  displaying a plurality of different music options in response to an eighth operation of the user with respect to the music control.

Therefore, the user can make music for the second video, enriching user experience.

In a possible implementation, the second interface further includes a style control, and the method further includes:
  displaying a plurality of different style options in response to a ninth operation of the user with respect to the style control. For example, a style may be understood as a filter.

Therefore, the user can select a video style for the second video, enriching user experience.

In a possible implementation, a gallery application includes a first album, where the first album includes the first photo and the second photo.

Therefore, the first photo and the second photo may be stored in a same album for viewing by the user.

In a possible implementation, the first album further includes a virtual video of the second video. The virtual video refers to a data file for which no video file is actually generated. For example, the virtual video may be XML play logic.

In a possible implementation, the second interface further includes a share control or a save control, and the method further includes:

generating a video file of the second video in response to a tenth operation of the user with respect to the share control or the save control; and storing the video file in the first album.

Optionally, storage space occupied by the video file is larger than storage space occupied by the virtual video.

Therefore, the second video is generated only when the second video is shared or saved. This can effectively reduce occupation of terminal space by the video.

In a possible implementation, the first interface further includes a deletion option, and the method further includes:

displaying a third prompt window in response to an eleventh operation of the user with respect to the deletion option, where the third prompt window is used to prompt the user whether to delete the second video, the first photo, and the second photo.

Therefore, when the user deletes the first video, the user may be prompted whether to delete a photo of a magic moment of the first video and a wonderful short video, so as to avoid mistaken deletion and improve user experience.

In a possible implementation, the method further includes:

automatically deleting the first photo if no user operation of viewing the first photo is received after N days.

It may be understood that, for the second photo, if no user operation of viewing the second photo is received after N days, the second photo is automatically deleted.

Therefore, it is helpful to save space by setting "if the user does not view the photo, the photo is deleted after being automatically retained for preset duration" for the photos (such as the first photo and the second photo) of the magic moments associated with the first video.

In a possible implementation, the second video further includes the second photo. In other words, the second video may include photos of all magic moments (such as the first photo and the second photo), or may include photos of some magic moments (such as the first photo). This is not specifically limited.

In a possible implementation, the first moment is determined based on a first time tag.

Optionally, the first time tag is determined based on first level information, second level information, and third level information, the first level information is used to represent a theme or scene of the video, the second level information is used to represent a scene change of the video, and the third level information is used to represent a magic moment.

In a possible implementation, the second video further includes a nearby image frame of the first photo, the nearby image frame is determined based on the first time tag, the nearby image frame includes image frames corresponding to first A moments of the first time tag and image frames corresponding to last B moments of the first time tag, A is greater than or equal to 1, and B is greater than or equal to 1.

Optionally, an image frame corresponding to a moment at which transition occurs is removed from the second video, and the transition means that the scene changes.

In a possible implementation, the method further includes:

generating a request message in response to the first operation, where the request message includes a first identifier, and the first photo is associated with the second video by using the first identifier.

Therefore, an association between the photo of the magic moment and the wonderful short video can be implemented by using the first identifier.

In a possible implementation, resolution of the first photo is higher than resolution of an image captured from the first video. In comparison with a manner of capturing an image from a video, an image obtained in this embodiment of this application has higher resolution.

In a possible implementation, the method further includes: receiving a photographing request during video recording, where the photographing request carries a snapshotting tag; and triggering photographing and obtaining a first image in response to the photographing request, where exchangeable image file format EXIF information corresponding to the first image includes the snapshotting tag.

Therefore, a manual snapshotting request of the user may be further received during video recording, so that the user can snapshot a photo of a magic moment based on a subjective requirement to further improve user experience.

According to a second aspect, an electronic device is provided, including a unit for performing the method in any implementation of the first aspect. The electronic device may be a terminal device or a chip in the terminal device. The electronic device includes an input unit, a display unit, and a processing unit.

When the electronic device is a terminal device, the processing unit may be a processor, the input unit may be a communications interface, and the display unit may be a graphics processing module and a screen. The terminal device may further include a memory, and the memory is configured to store computer program code. When the processor executes the computer program code stored in the memory, the terminal device is enabled to perform the method in any implementation of the first aspect.

When the electronic device is a chip in the terminal device, the processing unit may be a logic processing unit inside the chip, the input unit may be an output interface, a pin, a circuit, or the like, and the display unit may be a graphics processing unit inside the chip. The chip may further include a memory, and the memory may be a memory (for example, a register or a cache) in the chip, or a memory (for example, a read-only memory or a random access memory) located outside the chip. The memory is configured to store computer program code. When the processor executes the computer program code stored in the memory, the chip is enabled to perform the method in any implementation of the first aspect.

In an implementation, the processing unit is configured to: record a first video in response to a first operation of a user;

call the display unit to display a first interface, where the first interface is a play interface of the first video, the first interface includes a first control and a first area, the first area displays a thumbnail of a first photo and a thumbnail of a second photo, the first photo is automatically taken at a first moment, the second photo is automatically taken at a second moment, and a recording process of the first video includes the first moment and the second moment; and call the display unit to display a second interface in response to a second operation with respect to the first control, where the second interface is a play interface of a second video, duration of the second video is less than duration of the first video, and the second video includes at least the first photo.

The processing unit is further configured to call the display unit to display a third interface in response to a third operation of the user, where the third interface is an interface of a gallery application, and the third interface includes a second control.

That the processing unit calls the display unit to display the first interface specifically includes calling the display unit to display the first interface in response to a fourth operation with respect to the second control.

In an implementation, the third interface further includes a first prompt window, and the first prompt window is used to prompt the user that the first photo and the second photo have been generated.

In an implementation, brightness of the first prompt window and brightness of the first area are higher than brightness of an area except the first area and the first prompt window in the first interface.

In an implementation, the processing unit is further configured to:
  stop recording of the first video in response to a fifth operation of the user, and call the display unit to display a fourth interface, where the fourth interface includes a thumbnail previewing option; and
  call the display unit to display the third interface in response to a sixth operation of the user with respect to the thumbnail previewing option.

In an implementation, the fourth interface further includes a second prompt window, where the second prompt window is used to prompt the user that the first photo, the second photo, and the second video have been generated.

In an implementation, the processing unit is further configured to enable a "one record for multiple gains" function in response to a seventh operation of the user before the first video is recorded.

In an implementation, the first interface further includes a playing progress bar.

In an implementation, the second interface further includes a music control, and the processing unit is further configured to call the display unit to display a plurality of different music options in response to an eighth operation of the user with respect to the music control.

In an implementation, the second interface further includes a style control, and the processing unit is further configured to call the display unit to display a plurality of different style options in response to a ninth operation of the user with respect to the style control.

In an implementation, a gallery application includes a first album, where the first album includes the first photo and the second photo.

In an implementation, the first album further includes a virtual video of the second video.

In an implementation, the second interface further includes a share control or a save control; and
  the processing unit is further configured to: generate a video file of the second video in response to a tenth operation of the user with respect to the share control or the save control; and store the video file in the first album.

In an implementation, storage space occupied by the video file is larger than storage space occupied by the virtual video.

In an implementation, the first interface further includes a deletion option; and
  the processing unit is further configured to call the display unit to display a third prompt window in response to an eleventh operation of the user with respect to the deletion option, where the third prompt window is used to prompt the user whether to delete the second video and photos of a plurality of magic moments.

In an implementation, the processing unit is further configured to automatically delete the first photo if no user operation of viewing the first photo is received after N days.

In an implementation, the second video further includes the second photo.

In an implementation, the first moment is determined based on a first time tag.

In an implementation, the second video further includes a nearby image frame of the first photo, the nearby image frame is determined based on the first time tag,
  the nearby image frame includes image frames corresponding to first A moments of the first time tag and image frames corresponding to last B moments of the first time tag, A is greater than or equal to 1, and B is greater than or equal to 1.

In an implementation, the first time tag is determined based on first level information, second level information, and third level information, the first level information is used to represent a theme or scene of the video, the second level information is used to represent a scene change of the video, and the third level information is used to represent a magic moment.

In an implementation, an image frame corresponding to a moment at which transition occurs is removed from the second video, and the transition means that the scene changes.

In an implementation, the processing unit is further configured to generate a request message in response to the first operation, where the request message includes a first identifier, and
  the first photo is associated with the second video by using the first identifier.

In an implementation, resolution of the first photo is higher than resolution of an image captured from the first video.

According to a third aspect, a computer-readable storage medium is provided. The computer-readable storage medium stores computer program code. When the computer program code is run by an electronic device, the electronic device is enabled to perform the method in any implementation of the first aspect.

According to a fourth aspect, a computer program product is provided. The computer program product includes computer program code. When the computer program code is run by an electronic device, the electronic device is enabled to perform the method in any implementation of the first aspect.

DESCRIPTION OF EMBODIMENTS

Figure 1:
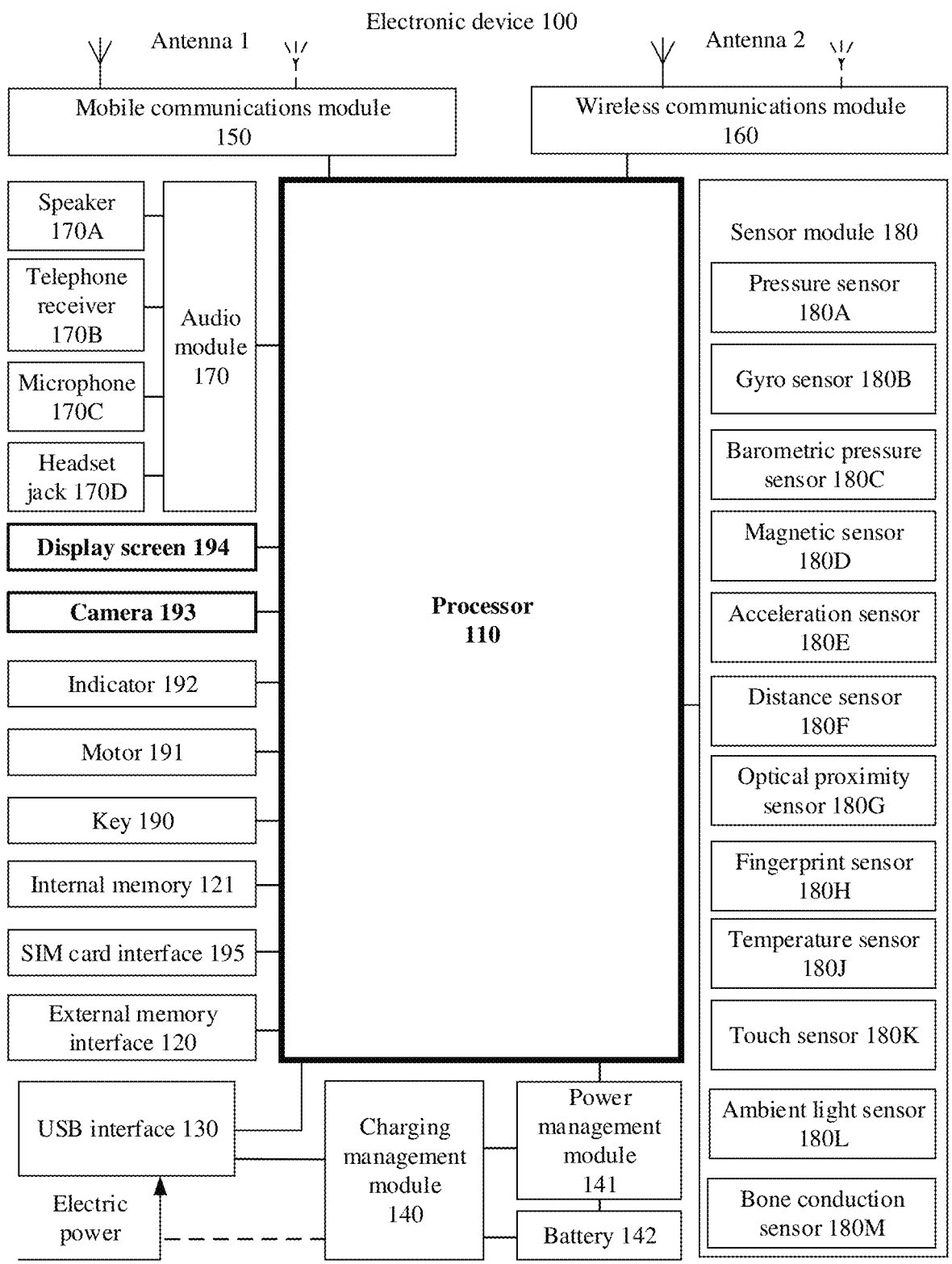
FIG. 1 is a schematic diagram of a hardware system of an electronic device applicable to this application.

The following describes the technical solutions in embodiments of this application with reference to the accompanying drawings.

In embodiments of this application, "a plurality of" means two or more than two unless otherwise specified.

Before embodiments of this application are described, some terms or concepts used in embodiments of this application are first explained. It should be understood that, names of the following terms are not specifically limited in this application. The following terms may have other names. Renamed terms still satisfy the following related term explanations.

Magic moment (magic moment, MM): an instant of some wonderful pictures in a video recording process. For example, the MM may be an optimal motion instant, an optimal expression moment, or an optimal check-in action. It may be understood that, the term MM is not limited in this application, and MM may also be referred to as a beautiful moment, a splendid moment, a wonderful instant, a decisive instant, a best shot (best shot, BS), or the like. In different scenes, the magic moment may be a different type of picture instant. For example, when a video of a football match is recorded, the magic moment may be an instant at which an athlete's foot comes into contact with a football during a shot or a pass, or the magic moment may be an instant at which the football flies into the goal; when a video of a person jumping from the ground is recorded, the magic moment may be an instant at which the person is at the highest point in the air, or may be an instant at which a motion of the person in the air is most stretching.

MM tag (TAG): a time tag; the MM tag is used to indicate a location of a magic moment in a recorded video file. For example, the video file includes one or more MM tags, and the MM tags may indicate that at moments of the 10th second, the 20th second of the 1st minute, and the like of the video file, corresponding image frames in the video file are magic moments.

MM node: used to analyze a shot video stream, identify or decide a magic moment, and automatically trigger photographing when a magic moment is identified. The MM node is also referred to as an MM decision engine, a BS decision engine, an MM decision module, or the like. These terms have the functions of the MM node described above.

One record for multiple gains: a function that may be understood as follows: When a user uses a camera application to shoot a video, one or more photos of magic moments and one or more selected videos can be obtained by pressing a "shoot" icon once. An implementation process of "one record for multiple gains" may be as follows: The MM node automatically identifies a magic moment and triggers snapshotting during video recording to obtain a photo of the MM; after the recording ends, the photo of the magic moment MM and a wonderful short video (also referred to as a selected short video, a wonderful video, or a selected video) may be recommended to the user when the user views the recorded video. It may be understood that, duration of the wonderful short video obtained through "one record for multiple gains" is less than duration of a complete video. For example, the duration of the recorded complete video is one minute. In this case, four photos of magic moments and four wonderful short videos with duration of 15 seconds can be obtained. It may be further understood that, "one record for multiple gains" may alternatively have other names, for example, "one key for multiple gains", "one key for multiple shots", "one key for film output", "one key for blockbuster movie", "AI one key for blockbuster movie".

Manual snapshotting: During video recording, manual photographing can be performed to obtain a picture that is expected to be captured.

To improve quality of an image of a magic moment obtained in a video recording mode, this application introduces a "one record for multiple gains" mode. To be specific, when a video is recorded in the video recording mode, a magic moment is automatically identified through analysis of a video stream, and photographing is automatically triggered when the magic moment is identified, to obtain a photo of the magic moment. In addition, when the video recording is completed, the photo of the magic moment and a wonderful short video can be viewed in the gallery. Compared with a photo randomly obtained from a recorded video, an image of a magic moment obtained by using the video processing method in embodiments of this application has higher quality and provides better user experience. The video processing method provided in embodiments of this application may be applied to various electronic devices.

In some embodiments of this application, the electronic device may be a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like.

The following uses an example in which the electronic device is a mobile phone. FIG. 1 is a schematic diagram of a structure of an electronic device 100 according to an embodiment of this application. FIG. 1 shows a hardware system of an electronic device applicable to this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that, the structure shown in FIG. 1 does not constitute a specific limitation on the electronic device 100. In some other embodiments of this application, the electronic device 100 may include more or fewer components than the components shown in FIG. 1, or the electronic device 100 may include a combination of some components in the components shown in FIG. 1, or the electronic device 100 may include sub-components of some components in the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be an integrated component.

The controller may generate an operation control signal based on instruction operation code and a timing signal, to complete control of instruction fetching and instruction execution.

A memory may be further disposed in the processor 110, to store instructions and data. In some embodiments, the memory in the processor 110 is a cache. The memory may store instructions or data that are or is just used or cyclically used by the processor 110. If the processor 110 needs to use the instructions or the data again, the processor 110 may directly call the instructions or the data from the memory, to avoid repeated access and reduce waiting time of the processor 110. This improves system efficiency.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface. The connection relationship between the modules shown in FIG. 1 is merely a schematic description, and does not constitute a limitation on the connection relationship between the modules of the electronic device 100. Optionally, the modules of the electronic device 100 may alternatively use a combination of a plurality of connection manners in the foregoing embodiment.

The electronic device 100 may implement a display function by using the GPU, the display screen 194, and the application processor. The GPU is a microprocessor used for image processing, is connected to the display screen 194 and the application processor, and is configured to perform mathematical and geometric calculations for graphic rendering. The processor 110 may include one or more GPUs, and the processor 110 executes program instructions to generate or change display information.

The display screen 194 may be configured to display an image or a video. The display screen 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light-emitting diode (quantum dot light-emitting diodes, QLED). In some embodiments, the electronic device 100 may include one or N display screens 194, where N is a positive integer greater than 1. In a possible implementation, when the user views a photo of a magic moment and a selected short video, the display screen 194 may be configured to display the photo of the magic moment MM and the selected short video.

The electronic device 100 may implement a shooting function by using the ISP, the camera 193, the video codec, the GPU, the display screen 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transfers the electrical signal to the ISP for processing, so that the electrical signal is converted into an image visible to a naked eye. The ISP may perform algorithm optimization on noise, brightness, and a color of an image, and the ISP may further optimize parameters such as exposure and a color temperature in a shooting scene. In some embodiments, the ISP may be disposed in the camera 193.

The camera 193 is configured to capture a still image or a video. An optical image is generated for an object by using the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into a standard image signal in a format such as red green blue (red green blue, RGB) or YUV. In some embodiments, the electronic device 100 may include one or N cameras 193, where N is a positive integer greater than 1. In this embodiment of this application, the processor 110 may determine, based on a video stream recorded by the camera 193, a magic moment MM in the video stream, and when the MM is determined, call the camera 193 to automatically trigger photographing. The ISP and the DSP may process an image signal of the magic moment MM to obtain an image of the magic moment.

The digital signal processor is configured to process a digital signal. In addition to processing the digital image signal, the digital signal processor can further process another digital signal.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a processor used by referring to a structure of a biological neural network. For example, the NPU quickly processes input information by referring to a transfer mode between human brain neurons, and may further continuously perform self-learning. Functions such as intelligent cognition of the electronic device 100 may be implemented by the NPU, for example, image recognition, face recognition, speech recognition, and text understanding.

The external memory interface 120 may be configured to connect to an external storage card such as a secure digital (secure digital, SD) card, to implement extension of a storage capability of the electronic device 100.

The internal memory 121 may be configured to store computer executable program code, where the executable program code includes instructions. The internal memory 121 may include a program storage area and a data storage area. The program storage area may store an operating system, and an application required by at least one function (for example, a voice playing function and an image playing function). The data storage area may store data (for example, audio data and an address book) created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS). The processor 110 performs various processing methods of the electronic device 100 by running the instructions stored in the internal memory 121 and/or the instructions stored in the memory disposed in the processor.

The electronic device 100 may implement an audio function such as music playing and sound recording by using the audio module 170, the speaker 170A, the telephone receiver 170B, the microphone 170C, the headset jack 170D, the application processor, and the like.

The touch sensor 180K is also referred to as a touch device. The touch sensor 180K may be disposed on the display screen 194. The touch sensor 180K and the display screen 194 constitute a touchscreen, and the touchscreen is also referred to as a touch-controlled screen. The touch sensor 180K is configured to detect a touch operation performed on or near the touch sensor 180K. The touch sensor 180K may transfer the detected touch operation to the application processor to determine a type of a touch event. A visual output related to the touch operation may be provided by using the display screen 194. In some other embodiments, the touch sensor 180K may be alternatively disposed on a surface of the electronic device 100 at a position different from that of the display screen 194.

The key 190 includes a power-on key and a volume key. The key 190 may be a mechanical key, or may be a touch key. The electronic device 100 may receive a key input signal to implement a function related to the key input signal.

The technical solutions described in the following embodiment can all be implemented in the electronic device 100 having the hardware architecture described above.

For ease of understanding, in the following embodiments of this application, the video recording method provided in embodiments of this application is described in detail with reference to the following illustrated application scenarios by using an electronic device having the structure shown in FIG. 1 as an example.

This application describes in detail the video recording method provided in this application by using an example in which the electronic device is a mobile phone and a camera application is installed in the mobile phone.

In some embodiments of this application, the user can manually enable or disable a "one record for multiple gains" function provided in embodiments of this application. The following describes a portal for the "one record for multiple gains" function with reference to FIG. 2 to FIG. 4.

Figure 2:
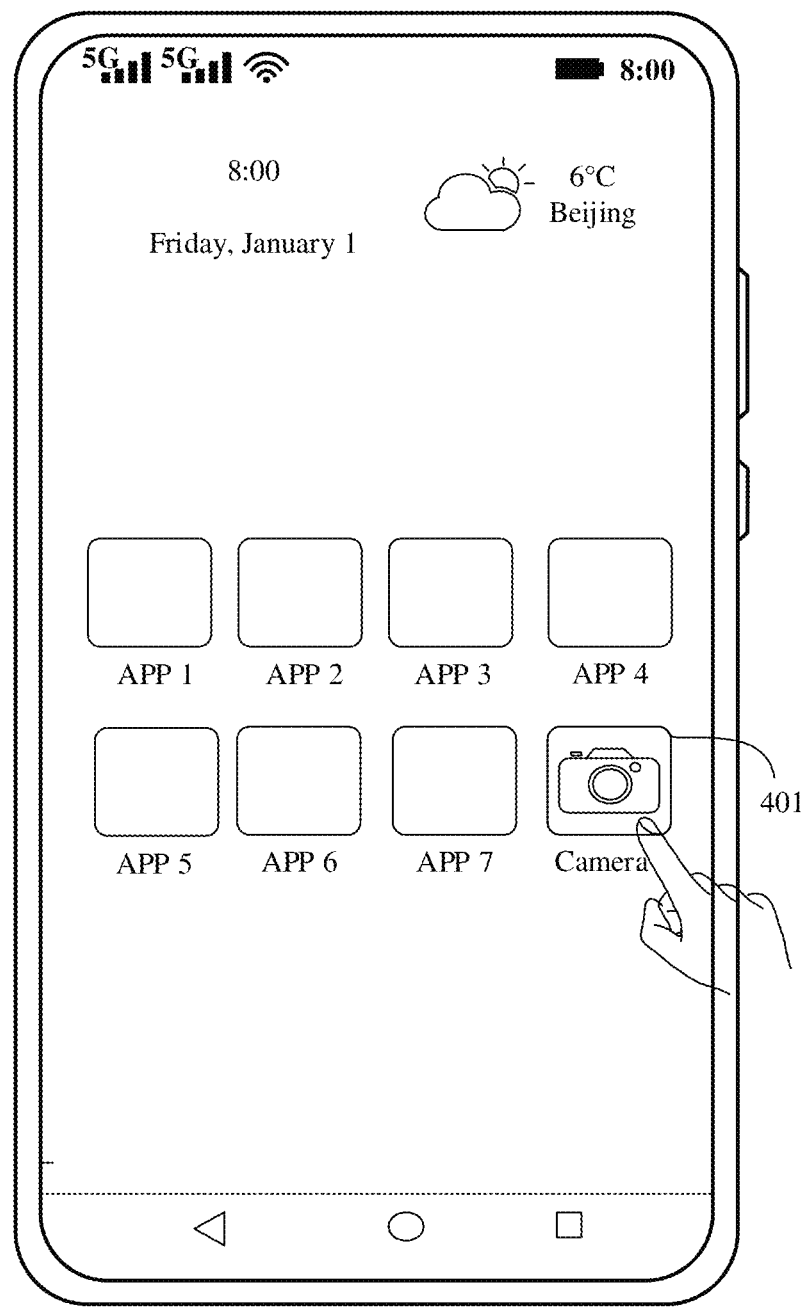
FIGS. 2(1)-2(6) are schematic diagrams of an example of enabling "one record for multiple gains" according to this application.
Figure 2:
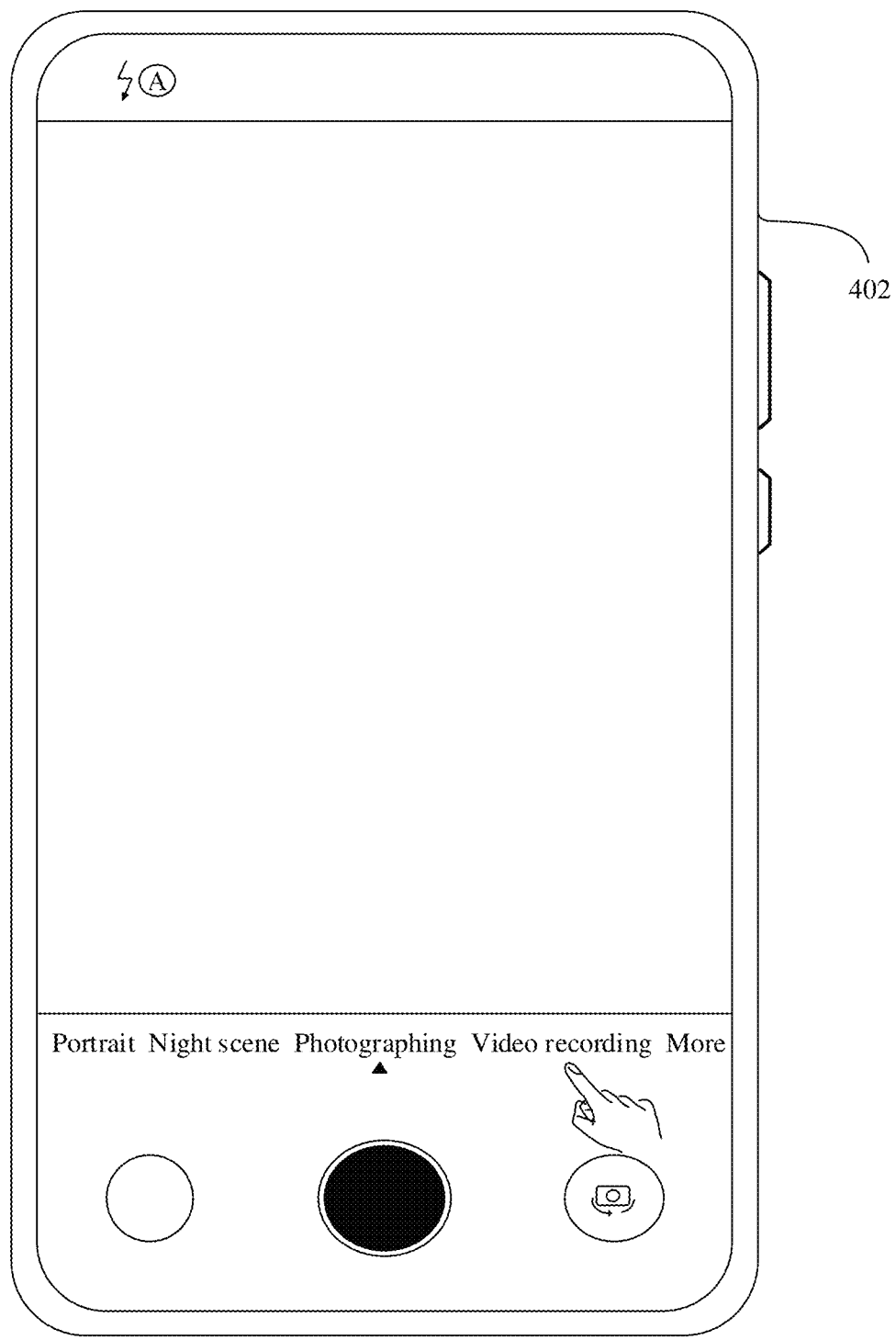
Figure 2:
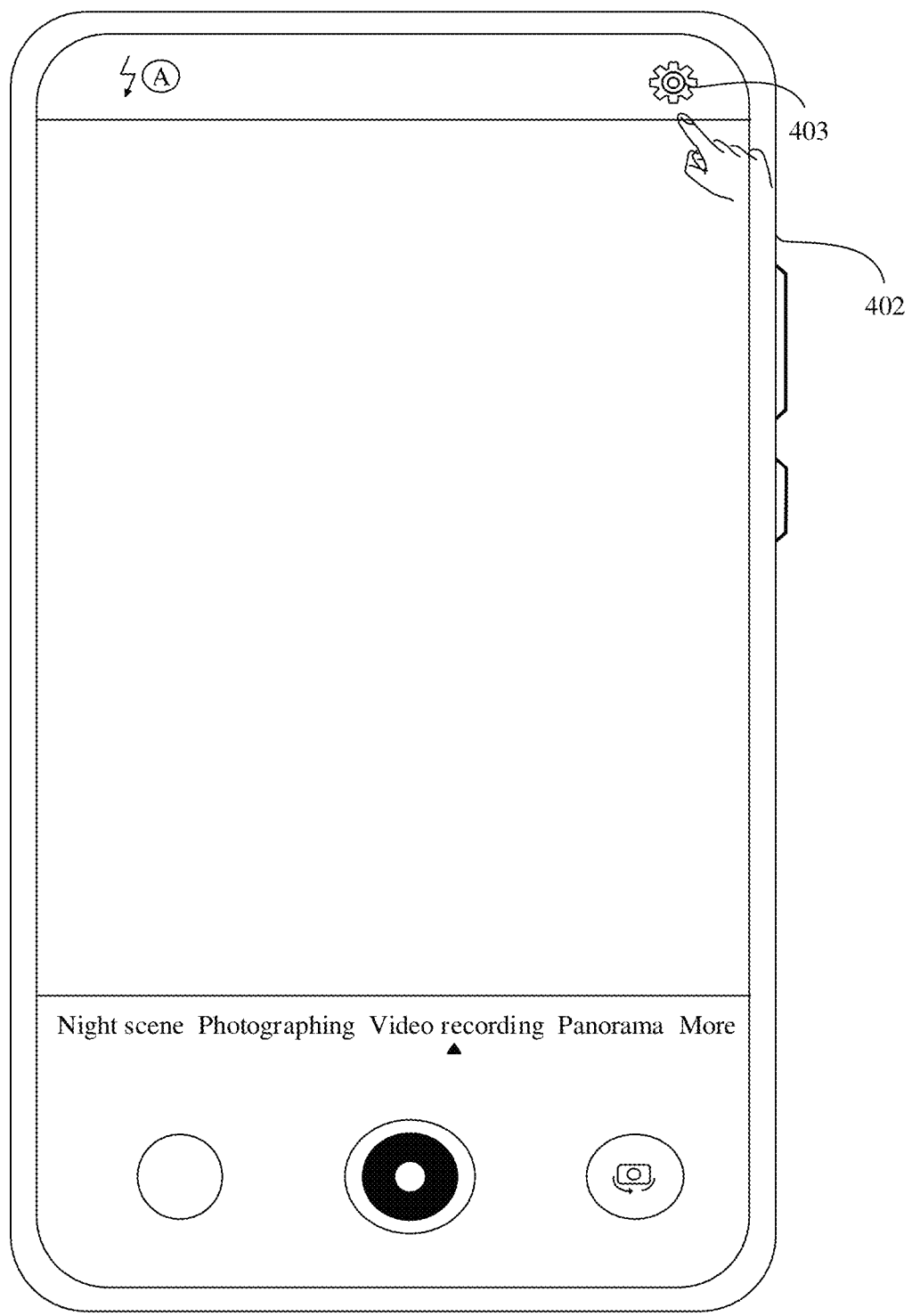
Figure 2:
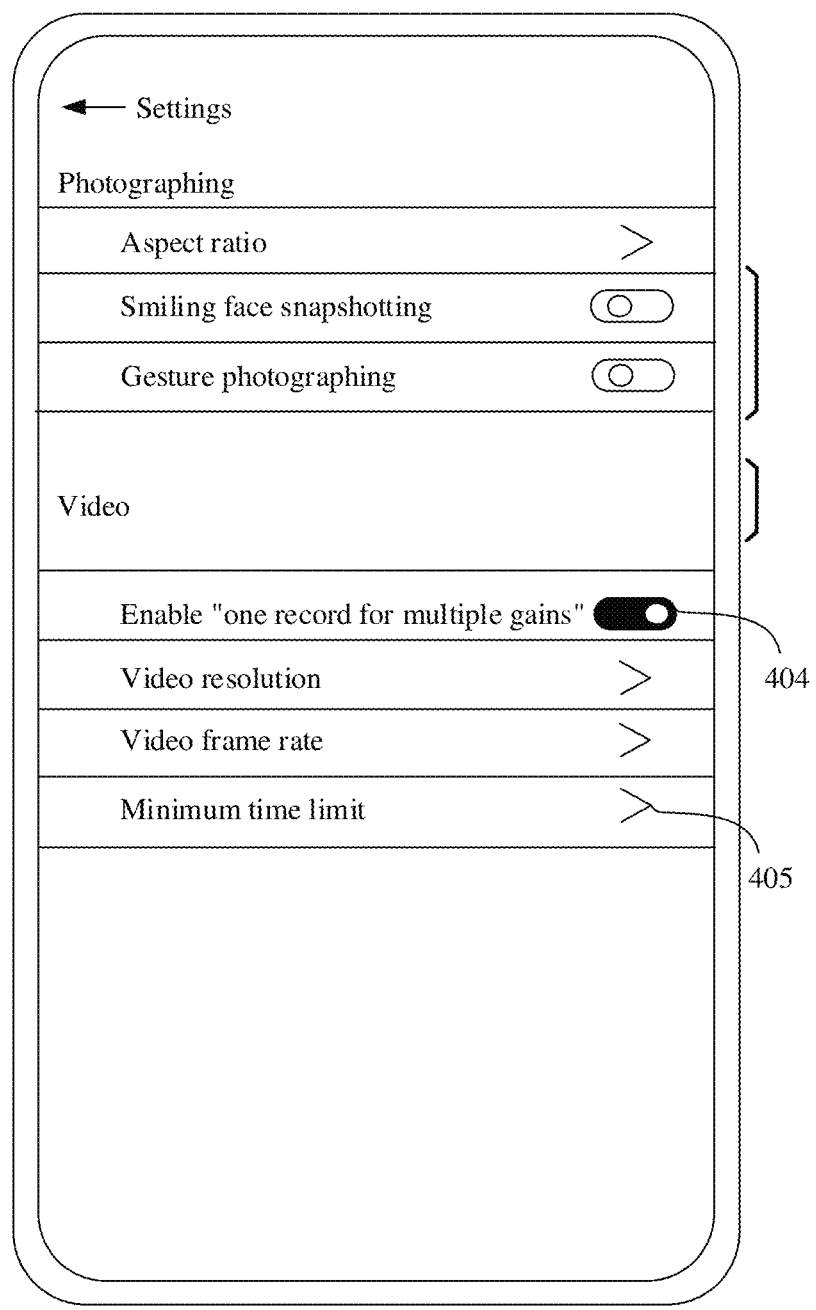
Figure 2:
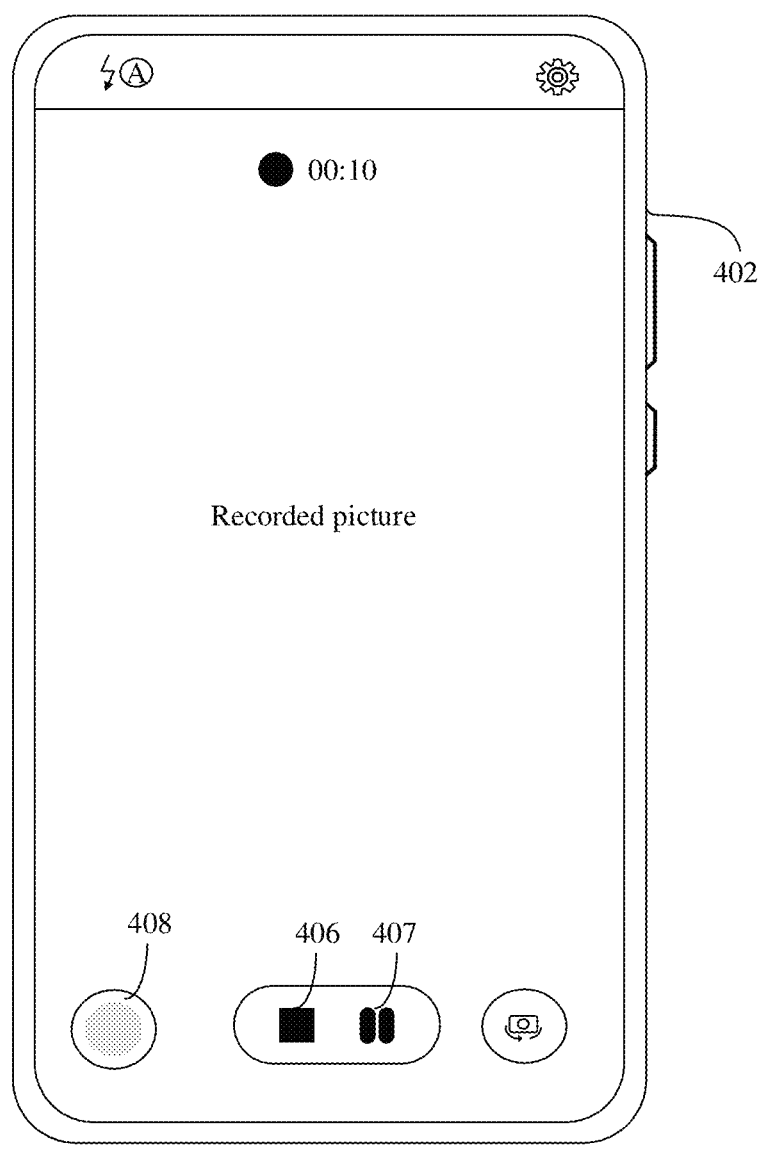
Figure 2:
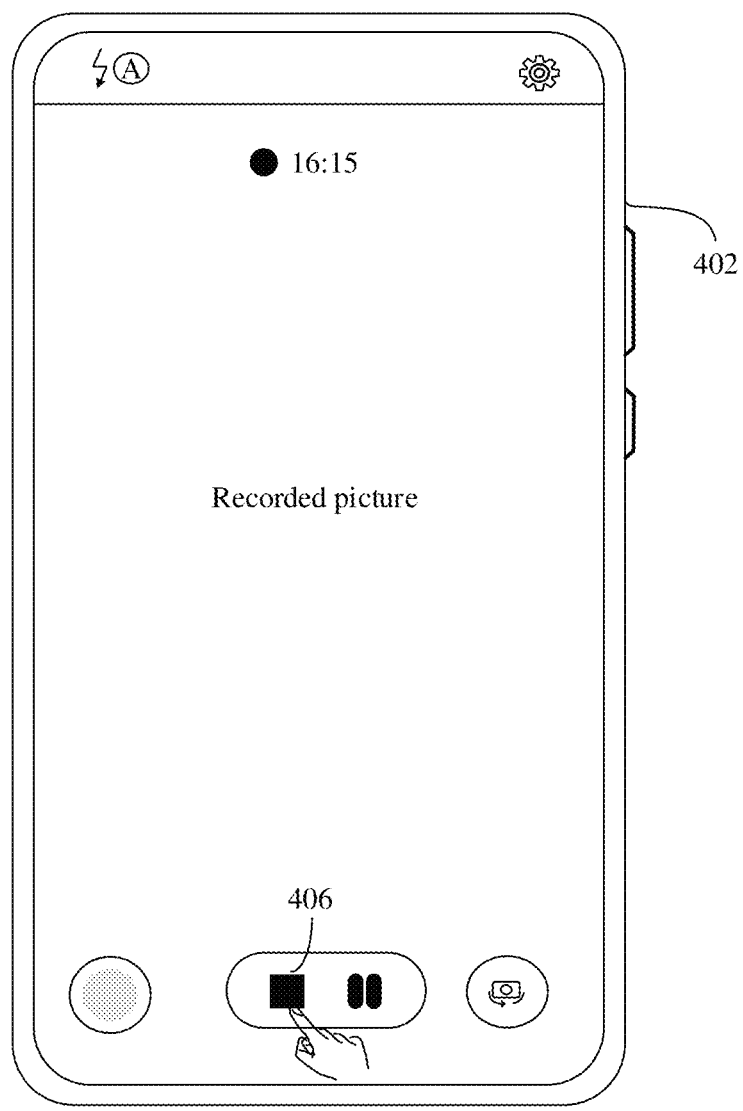

FIG. 2 is a schematic diagram of a graphical user interface (graphical user interface, GUI) of an example video processing method according to an embodiment of this application.

For example, the user can instruct the mobile phone to start the camera application by touching a specific control on a screen of the mobile phone, pressing a specific physical key or key combination, inputting a voice, a mid-air gesture, or the like. In response to receiving an instruction from the user to start the camera, the mobile phone starts the camera and displays a shooting interface.

For example, as shown in FIG. 2(1), a screen display system of the mobile phone displays currently output interface content. The interface content displays a plurality of applications (application, APP). The user can instruct the mobile phone to start the camera application by tapping the "camera" application icon 401 on a desktop of the mobile phone, and the mobile phone displays a shooting interface shown in FIG. 2(2).

For another example, when the mobile phone is in a screen-locked state, the user can instruct the mobile phone to start the camera application by using a gesture of swiping right (or left) on the screen of the mobile phone, and the mobile phone can display the shooting interface shown in FIG. 2(2).

Alternatively, when the mobile phone is in a screen-locked state, the user can instruct the mobile phone to start the camera application by tapping a shortcut icon of the "camera" application in a screen-locked interface, and the mobile phone can display the shooting interface shown in FIG. 2(2).

For another example, when the mobile phone is running another application, the user can also enable, by tapping a corresponding control, the mobile phone to start the camera application for photographing. For example, when the user is using an instant messaging application (for example, a WeChat application), the user can also instruct, by selecting a control of a camera function, the mobile phone to start the camera application for photographing and video shooting.

As shown in FIG. 2(2), the shooting interface of the camera generally includes a viewfinder frame 402, a photographing control, a video recording control, and other functional controls (such as a portrait functional control, a night scene functional control, or more other controls). The user can start a video recording mode by tapping the video recording control, and the mobile phone can display a recording interface shown in FIG. 2(3). The user can enter a setting interface by tapping "setting", and the mobile phone displays an interface shown in FIG. 2(4). The interface shown in FIG. 2(4) displays an option 404 for enabling "one record for multiple gains", and the option 404 is used to enable the "one record for multiple gains" function. To be specific, after the user enables the function, the mobile phone automatically uses the video recording method provided in embodiments of this application when the mobile phone is in the video recording mode. When recording a video, the mobile phone intelligently identifies a magic moment, and after content of the magic moment is identified, the mobile phone automatically generates a wonderful photo and short video. Certainly, the user can manually disable the "one record for multiple gains" function in the video recording mode by using the option 404.

In addition, the setting interface shown in FIG. 2(4) may further include a control 405 for a minimum time limit. The control for the minimum time setting is used to limit minimum recording duration for enabling the "one record for multiple gains" function. If recording duration of a video is less than the minimum recording duration, a "one record for multiple gains" feature of the video cannot be called back. For example, the minimum time limit may be set to 15 s, and when shooting time of the user is less than 15 s, no photo of "one record for multiple gains" is called back.

It may be understood that, the setting interface shown in FIG. 2(4) may alternatively include other controls with respect to video recording settings, for example, a control for setting video resolution and a control for setting a video frame rate. The controls shown in FIG. 2(4) are merely examples for description.

The control for setting video resolution shown in FIG. 2(4) may be used to select resolution of a video. It should be understood that, options for the video resolution depend on actual configuration of the mobile phone. For example, the video resolution may be selected from 3840*2160 (ultra high definition 4K), 1920*1080 (1080p full high definition), 1280*720 (720P high definition), and the like.

For example, the video resolution of the mobile phone may be set to 1920*1080, or in other words, the video resolution is (1080P) 16:9. Generally, resolution for normal photographing (that is, photographing that is not triggered during video recording) is 4096*3072. It should be noted that, to match an aspect ratio of 16:9, resolution of a photo of a magic moment automatically snapshotted during video recording is 4096*2304, and resolution of an image frame captured during video recording is 1920*1080. Therefore, from a perspective of image resolution, in embodiments of this application, resolution of a photo of a magic moment automatically snapshotted when the magic moment is identified is clearly superior to resolution of an image frame captured during video recording. In other words, the resolution of the photo of the magic moment is greater than the resolution of the photo captured from the video in a conventional manner. That is, at least from the perspective of resolution, quality of the photo of the magic moment automatically snapshotted is higher than quality of the photo captured from the video in a conventional manner. Certainly, the quality of the photo of the magic moment automatically snapshotted may alternatively depend on other factors, for example, quality of a photo processed by using a photographing algorithm in a photo pipeline pattern component photo pipeline is better. The photographing algorithm in the photo pipeline used in embodiments of this application is described below in detail in FIG. 8A and FIG. 8B.

In addition, the setting interface shown in FIG. 2(4) may further include controls with respect to photographing settings, for example, a control for setting an aspect ratio, a control for setting gesture photographing, and a control for setting smiling face snapshotting.

After the "one record for multiple gains" option is enabled, the user can tap the video recording control to perform video recording. The interface shown in FIG. 2(5) shows a picture (such as a picture at the 10th second) in the recording process. The interface shown in FIG. 2(5) includes a video recording stop control 406, a video recording pause control 407, and a photographing key 408. During the video recording, the user can manually snapshot a photo by tapping the photographing key 408.

In the interface shown in FIG. 2(6), the user can tap the button 406 for stopping the video recording at 16 minutes and 15 seconds to end the recording process, and a video with duration of 16 minutes and 15 seconds is obtained.

The foregoing describes the method for triggering a mobile phone to enter a "one record for multiple gains" mode, but this application is not limited to entering "one record for multiple gains" in the video recording mode. In some embodiments of this application, the user can enable the "one record for multiple gains" function in another manner. For example, "one record for multiple gains" is used as a newly added mode for the user to select in the camera application. The user may choose to enter the "one record for multiple gains" mode.

Figure 3:
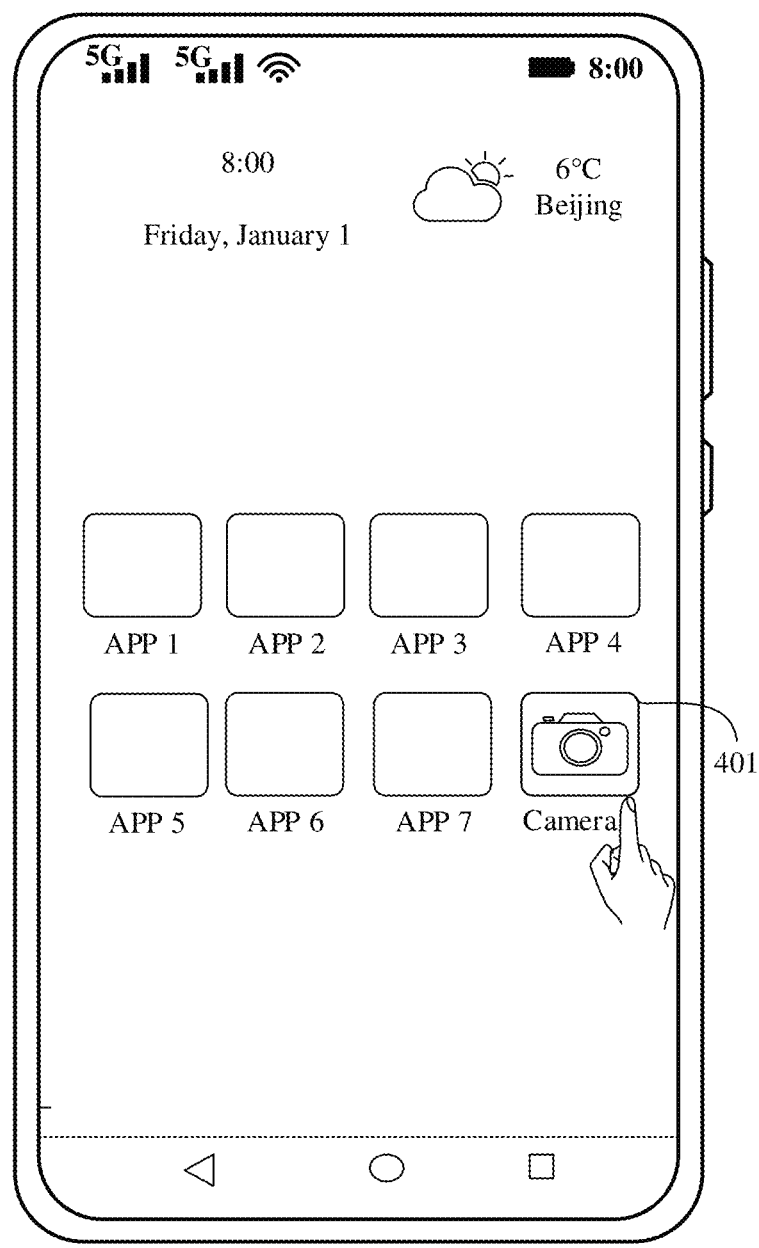
FIGS. 3(1)-3(4) are schematic diagrams of another example of enabling "one record for multiple gains" according to this application.
Figure 3:
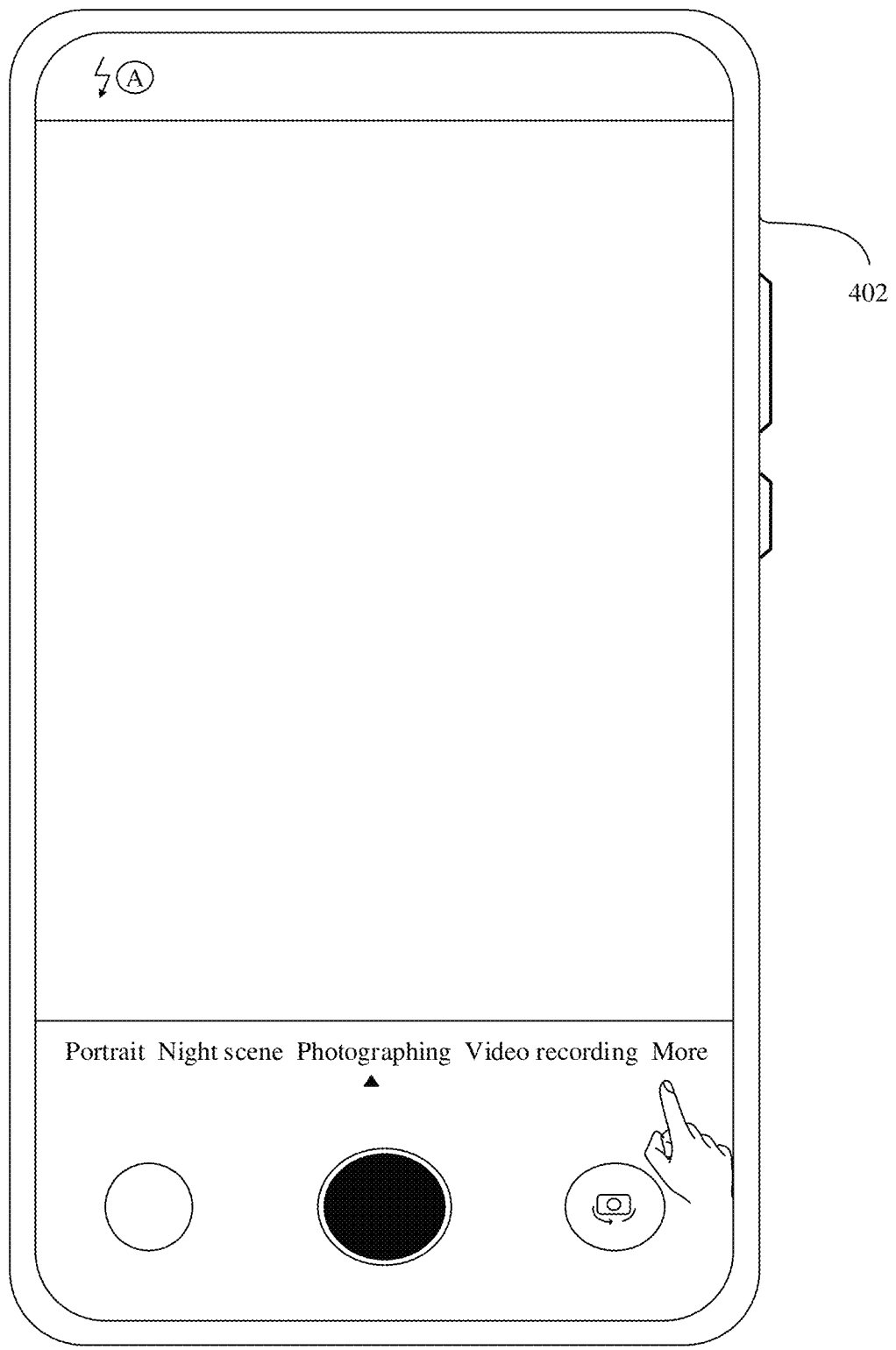
Figure 3:
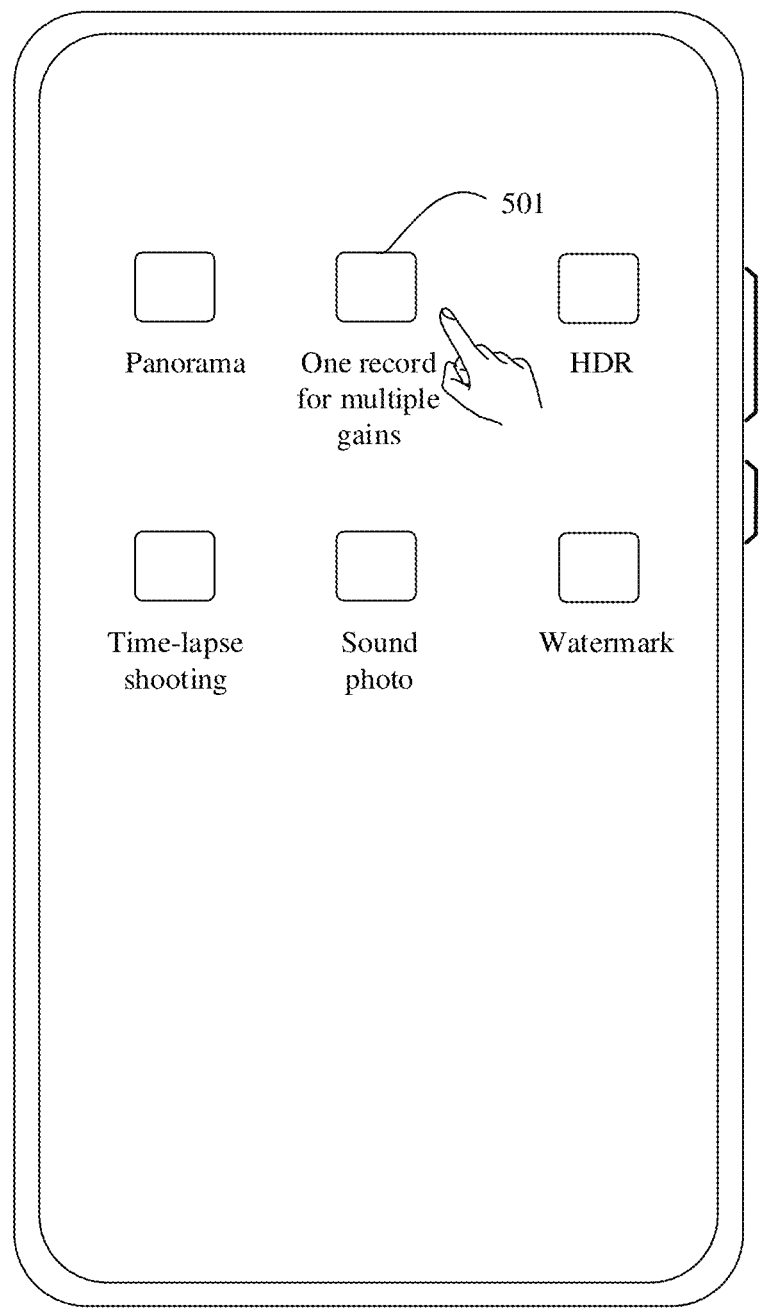
Figure 3:
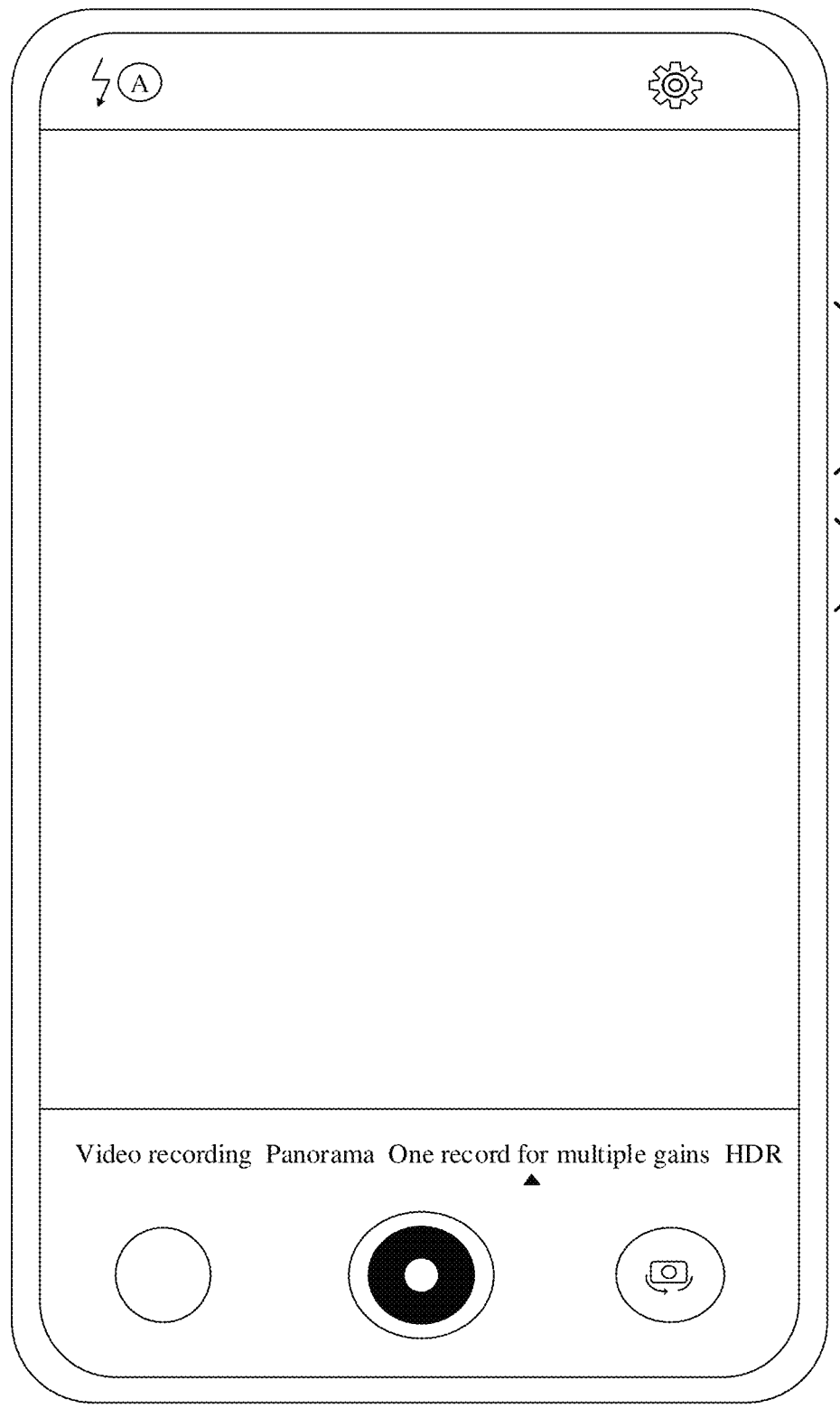

For example, with respect to the interface shown in FIG. 3(2), in response to detecting that the user taps the "more" control in the interface shown in FIG. 3(2), the mobile phone displays an interface shown in FIG. 3(3). The user taps the "one record for multiple gains" control 501 shown in FIG. 3(3) to enter the "one record for multiple gains" mode, and the mobile phone displays an interface shown in FIG. 3(4). Certainly, the "one record for multiple gains" control 501 may be alternatively displayed in the interface shown in FIG. 3(2), to be specific, in the same column as the photographing control and the video recording control, and the user selects the "one record for multiple gains" mode by swiping the control left or right.

The interface shown in FIG. 3(1) is the same as the interface shown in FIG. 2(1), and details are not described herein. The manner of entering FIG. 3(2) from FIG. 3(1) is similar to the manner of entering FIG. 2(2) from FIG. 2(1). For brevity, details are not described herein.

Alternatively, in some examples, the video recording mode of the mobile phone may be set to the "one record for multiple gains" mode in a setting menu.

Figure 4:
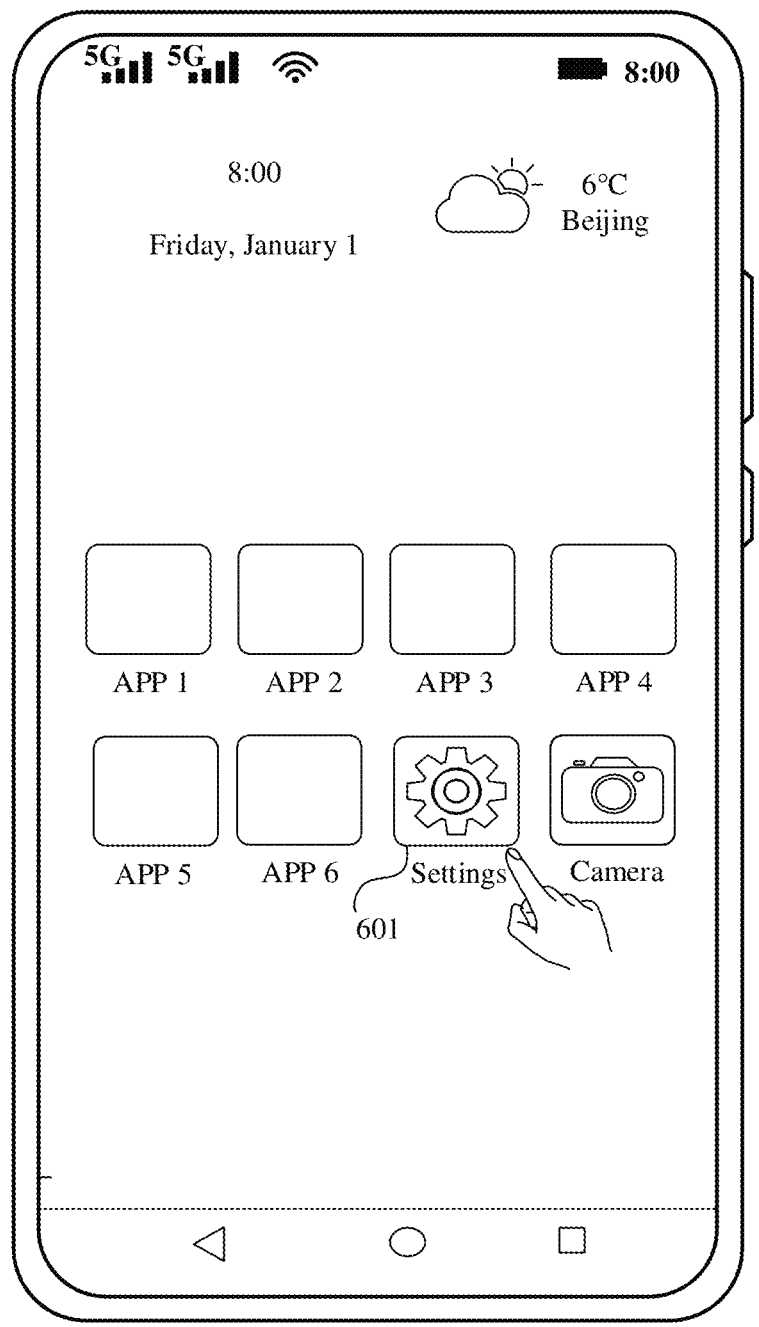
FIGS. 4(1)-4(3) are schematic diagrams of still another example of enabling "one record for multiple gains" according to this application.
Figure 4:
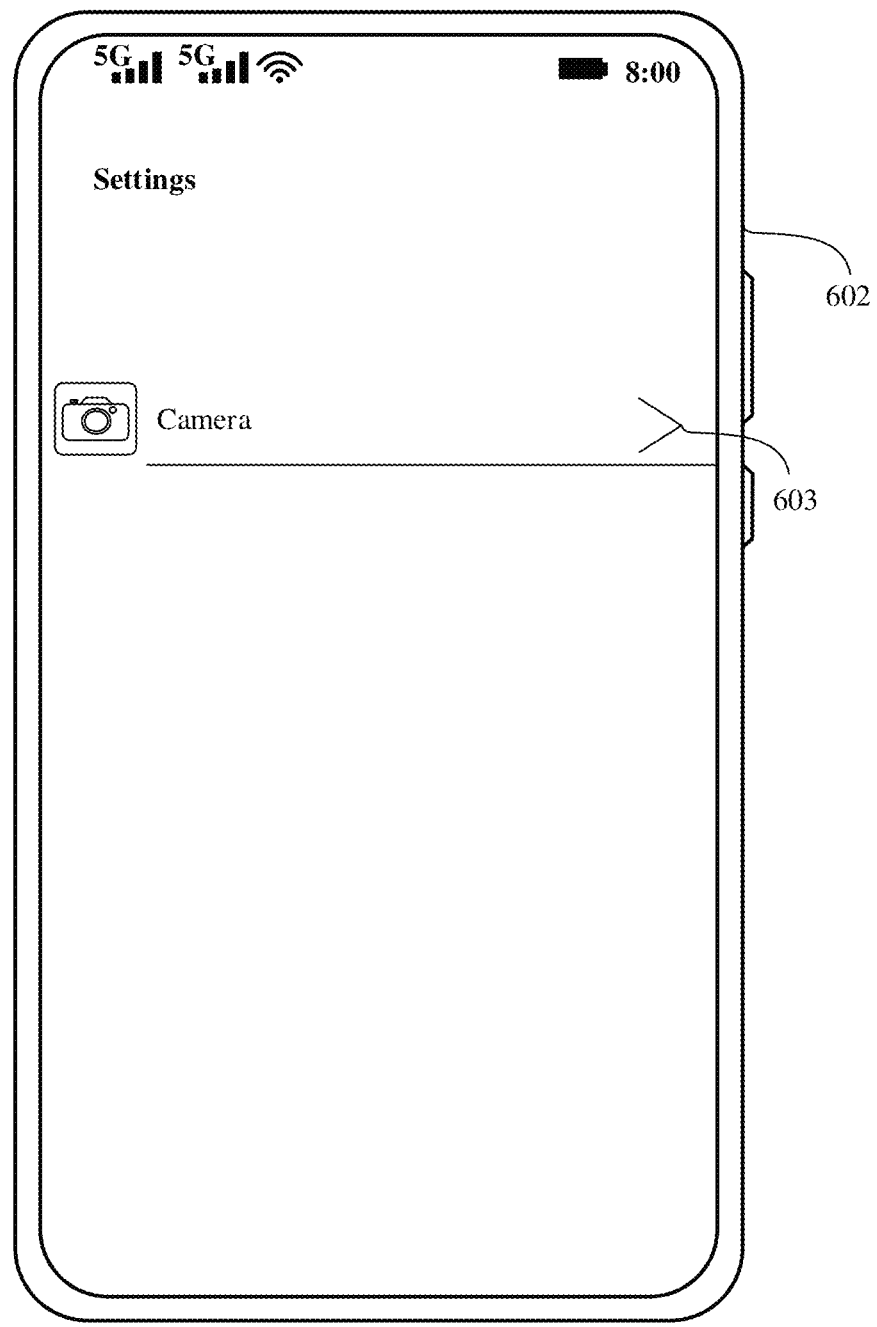
Figure 4:
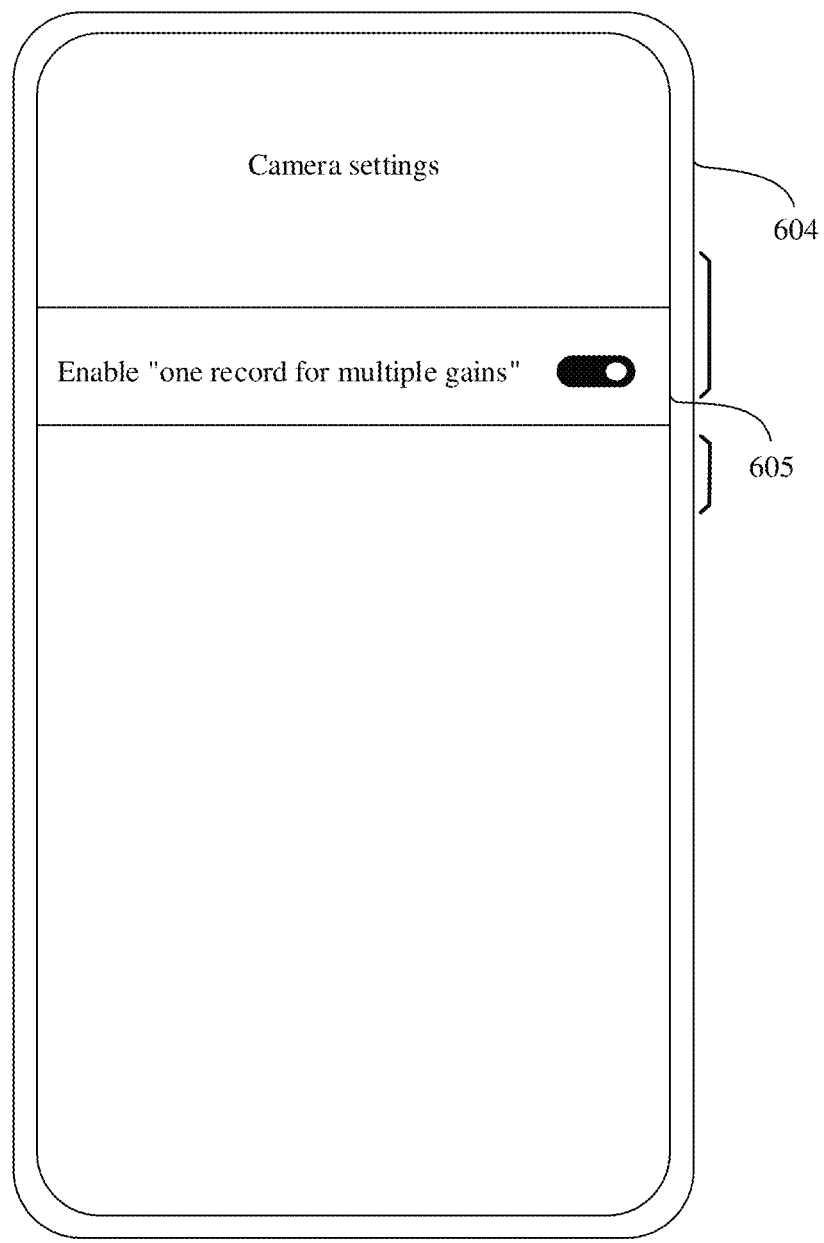

For another example, with respect to the interface shown in FIG. 4(1), in response to detecting that the user taps a control 601, the mobile phone displays a setting interface 602 shown in FIG. 4(2). The user can tap a control 603 in the interface to enter a camera setting interface 604 shown in FIG. 4(3). The camera setting interface 604 displays a control 605, which is used to enable or disable the "one record for multiple gains" function. To be specific, after the user taps the control 605 to enable the function, the mobile phone automatically uses the video recording method provided in embodiments of this application when the mobile phone is in the video recording mode. When recording a video, the mobile phone automatically determines a magic moment and triggers snapshotting, and automatically saves a photo of the magic moment and a wonderful short video that are obtained based on the "one record for multiple gains" function. Certainly, the user can manually disable the "one record for multiple gains" function in the video recording mode by using the control 605.

Certainly, the mobile phone may choose to enable the "one record for multiple gains" function in the video recording mode by default. This is not limited in this application.

It may be understood that, the user's finger tapping an icon may include the user's finger touching the icon, or may be that a distance between the user's finger and the icon is less than a specific value (for example, 0.5 mm). This case may also be referred to as the user's finger touching the icon.

On the basis of the foregoing various implementations, the "one record for multiple gains" function of the mobile phone can be enabled. After the "one record for multiple gains" function is enabled in the mobile phone, a video recorded by the user and a file of "one record for multiple gains" related to the video can be viewed in the gallery. The following provides description with reference to FIG. 5.

Figure 5:
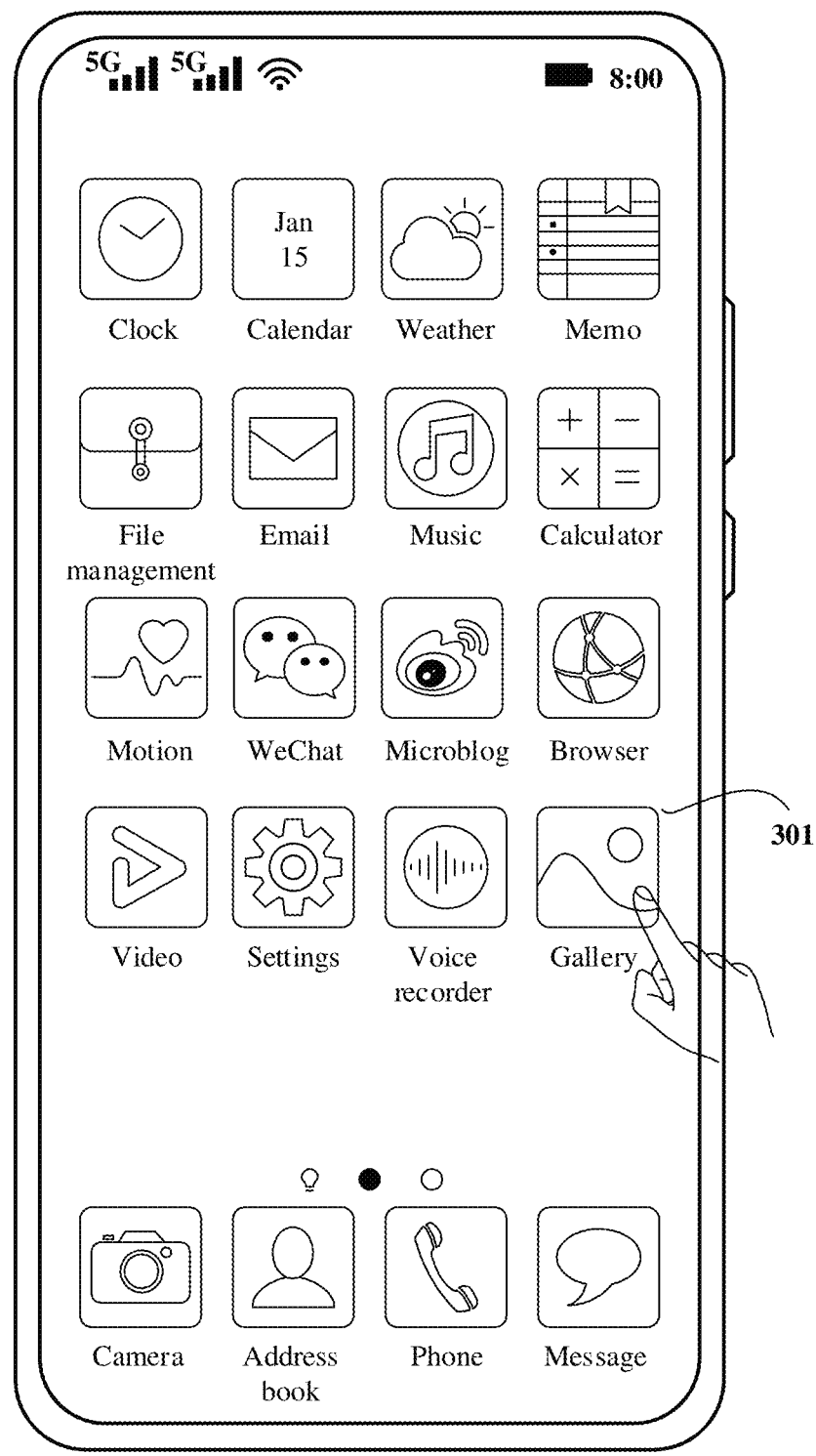
FIGS. 5(1)-5(8) are schematic diagrams of a graphical user interface GUI for an example of "one record for multiple gains" according to this application.
Figure 5:
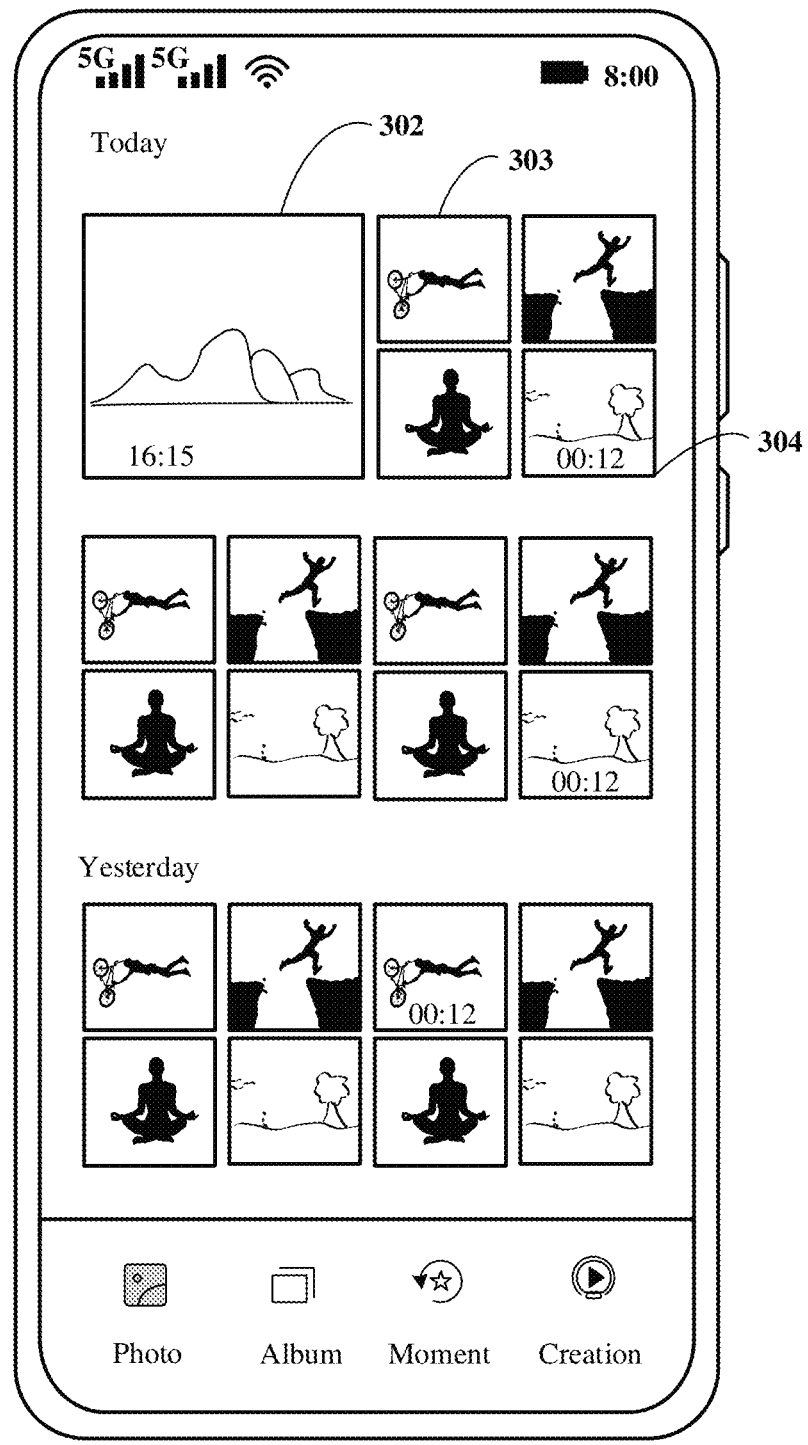
Figure 5:
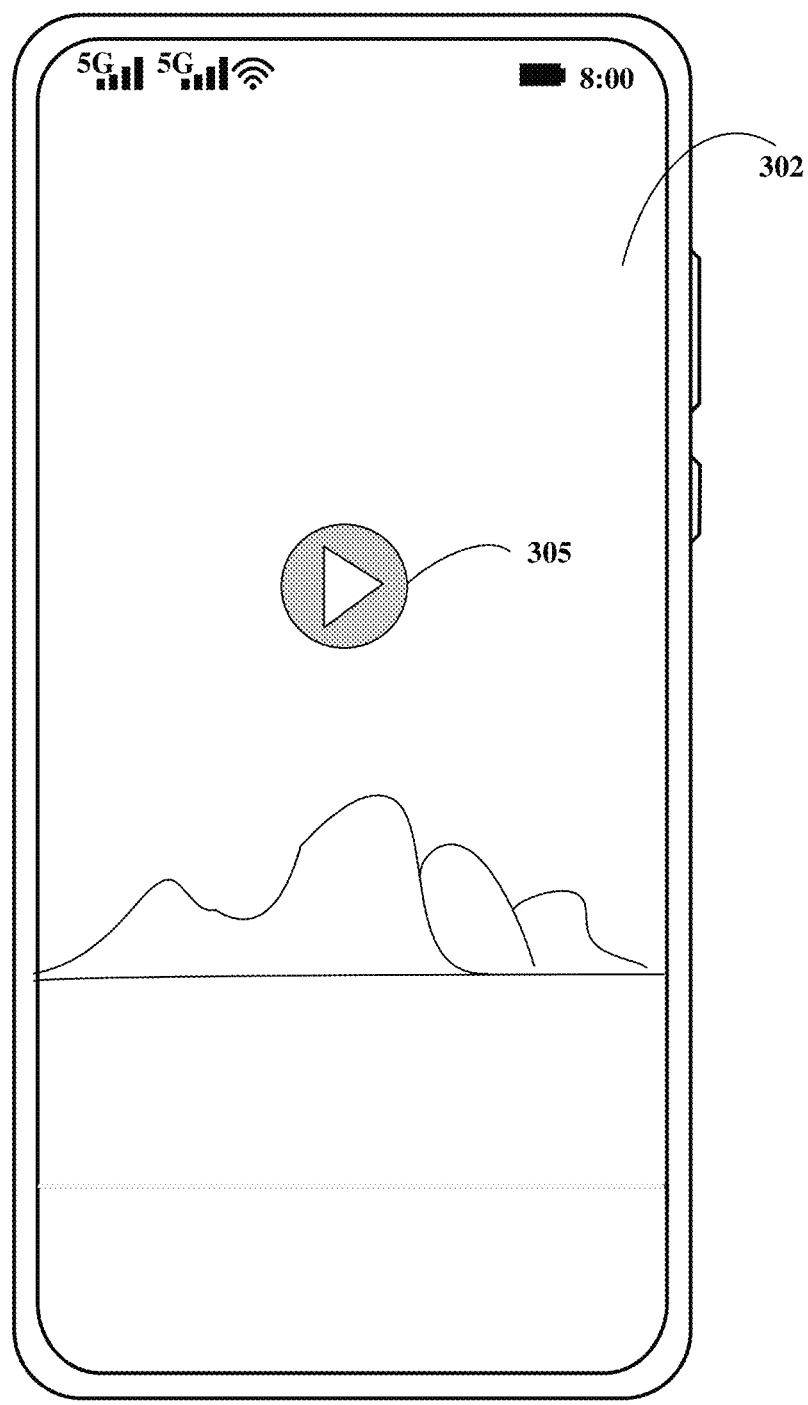
Figure 5:
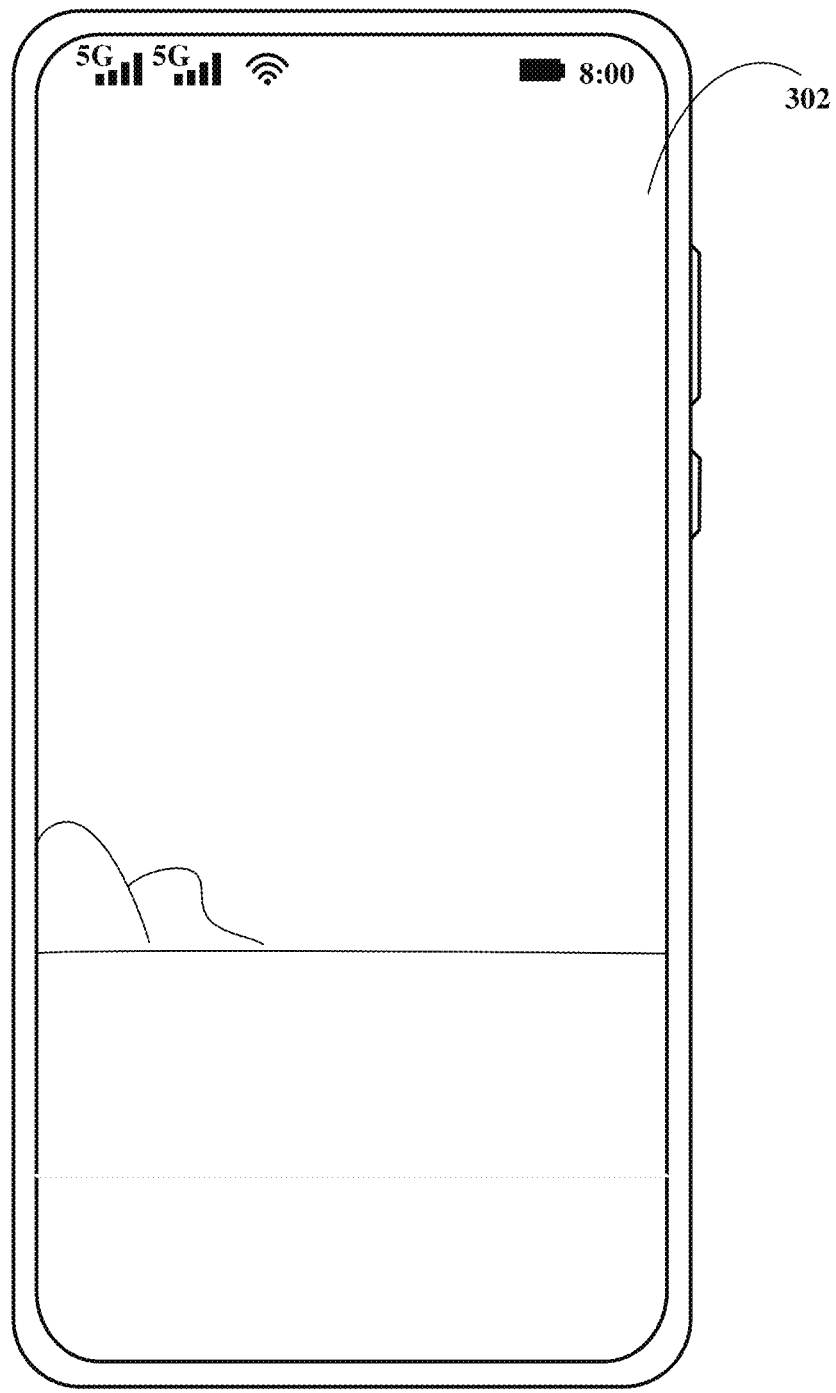
Figure 5:
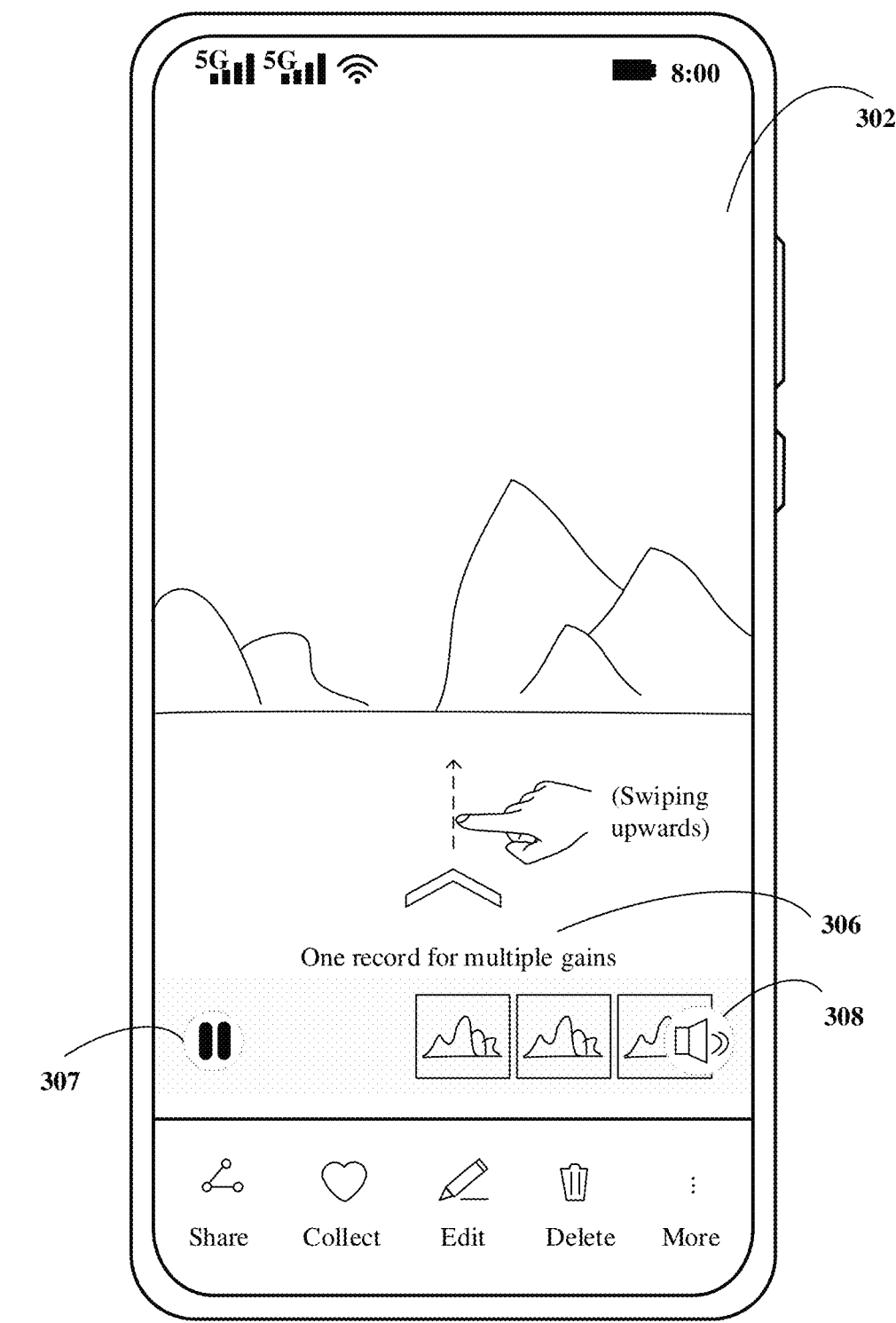
Figure 5:
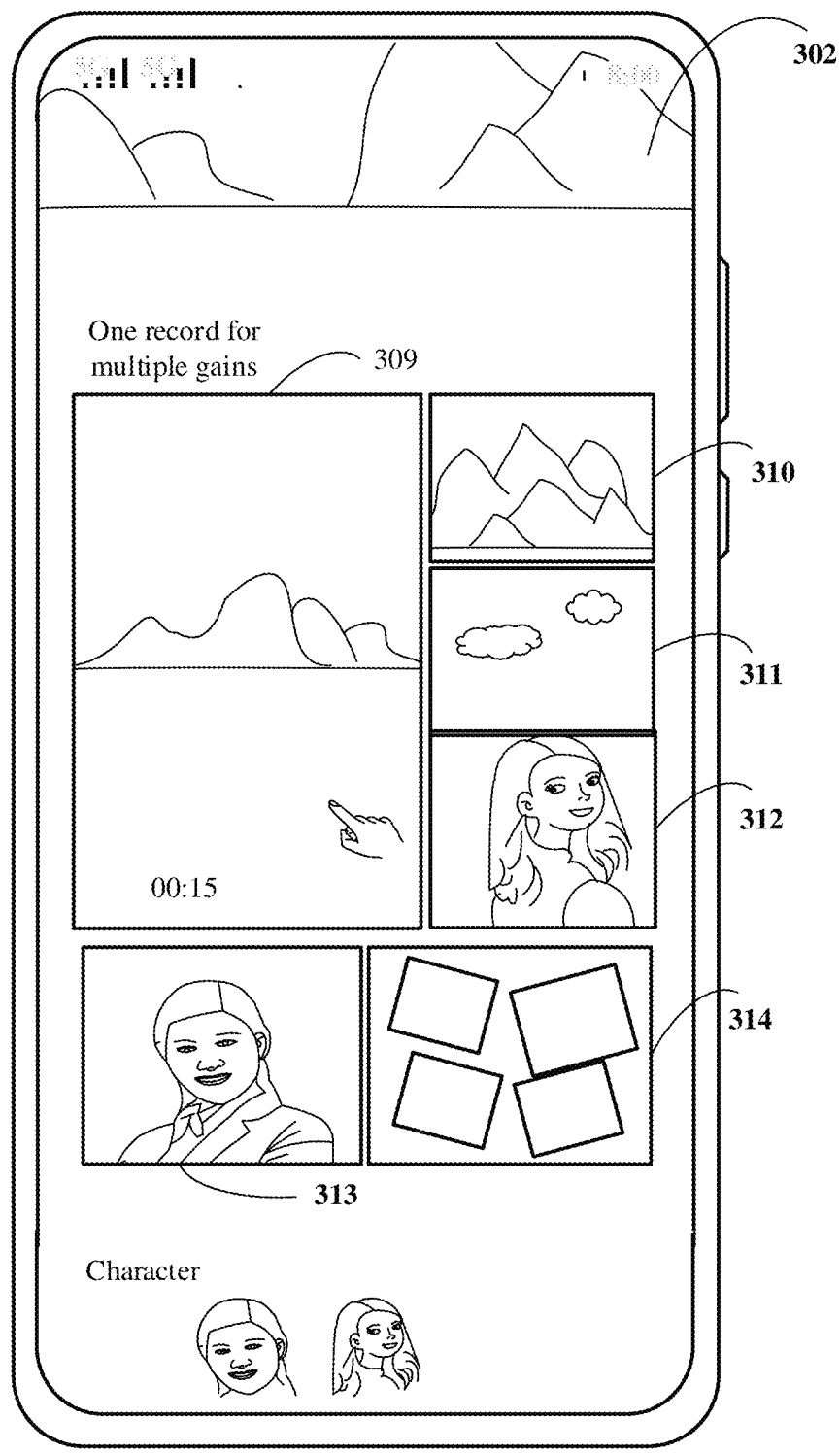
Figure 5:
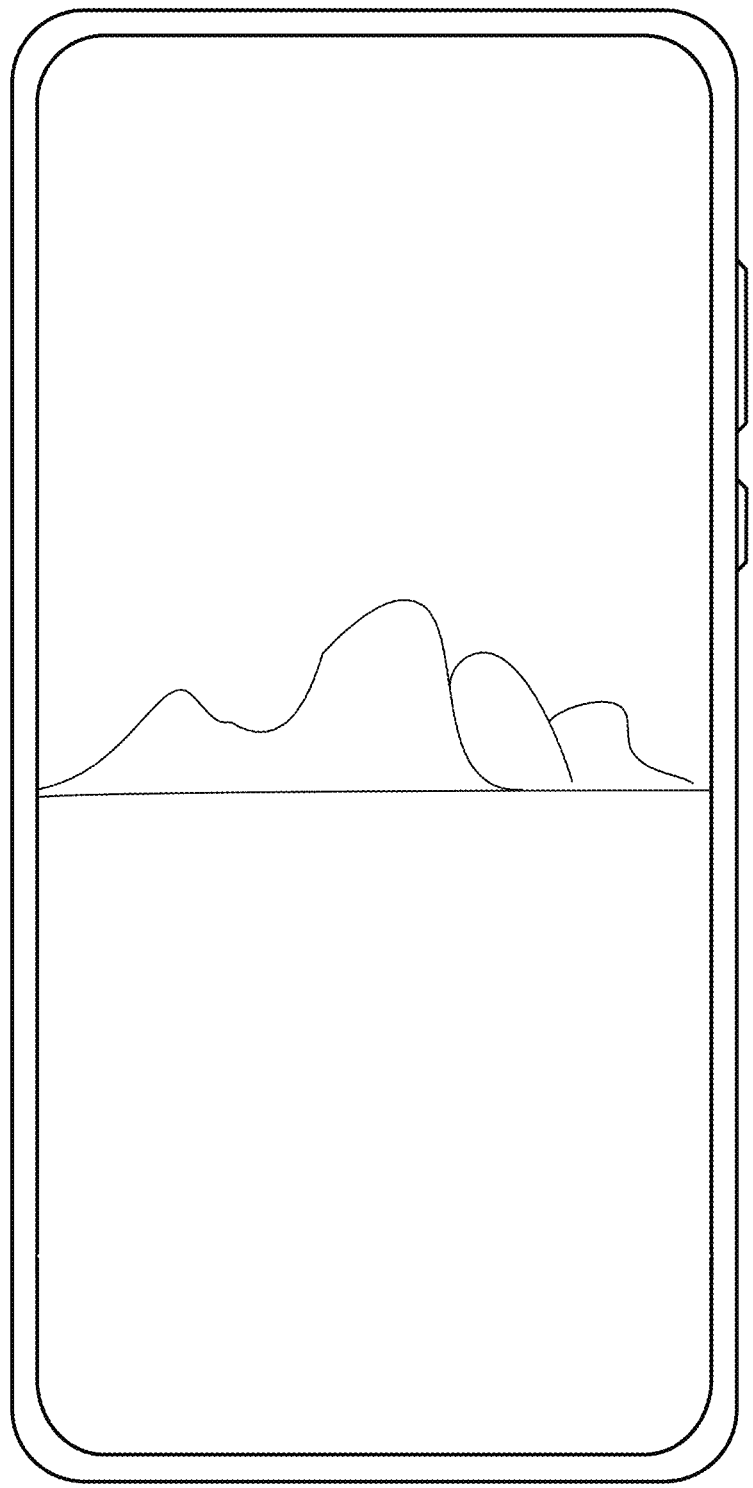
Figure 5:
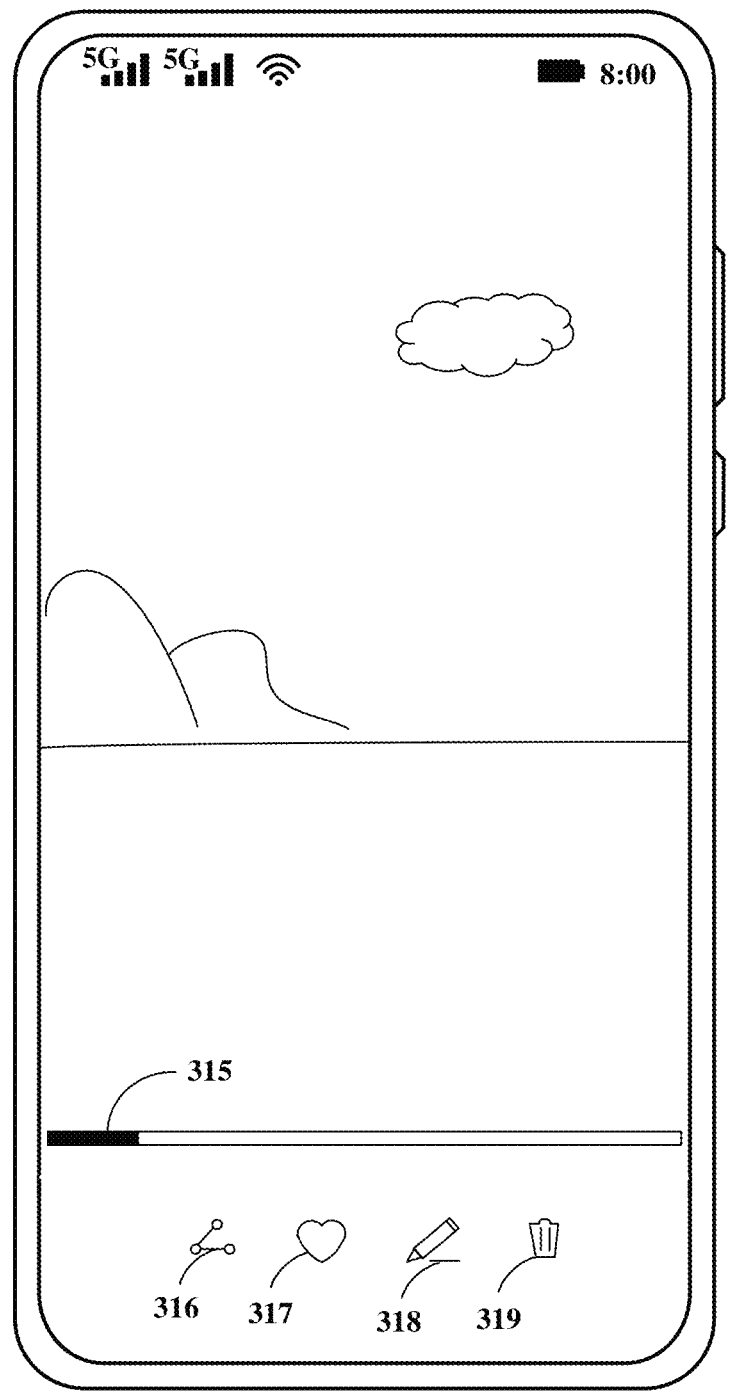

FIG. 5 is a schematic diagram of an example of a graphical user interface (graphical user interface, GUI) related to "one record for multiple gains" according to an embodiment of this application.

For example, the user can instruct the mobile phone to start the gallery application by touching a specific control on a screen of the mobile phone, pressing a specific physical key or key combination, inputting a voice, a mid-air gesture, or the like. The gallery application is also referred to as an album, a photo, or the like. In response to receiving an instruction from the user to start the gallery application, the mobile phone displays a photo interface. For example, as shown in FIG. 5(1), a screen display system of the mobile phone displays currently output interface content. The interface content displays a plurality of applications APPs. The user can instruct the mobile phone to start the gallery application by tapping the "gallery" application icon 301 on a desktop of the mobile phone, and the mobile phone displays an interface shown in FIG. 5(2).

As shown in FIG. 5(2), the interface displays a photo and a video shot by the user, for example, a video 302 (for example, a video with duration of 16 minutes and 15 seconds obtained in FIG. 2(6)), a photo 303, and a video 304 (with duration of 12 seconds) shot by the user. The photos and videos shot by the user may be sorted by the time of shooting. The videos and photos displayed in the interface shown in FIG. 5(2) are arranged in thumbnails, and a video 302 shot by the user (for example, a video with duration of 16 minutes and 15 seconds obtained in FIG. 2(6)) is the latest recorded video. When the video 302 is recorded, the "one record for multiple gains" function is enabled.

The interface shown in FIG. 5(2) displays all photos and videos shot by the user (or in other words, the shot photos and videos are presented in an unclassified manner in the gallery application).

In a possible implementation, the gallery application may include a plurality of albums, and the plurality of albums are used to store files such as videos, screenshots, and my movies in a classified manner. The plurality of albums include an album used to store videos obtained through "one record for multiple gains". For example, the album used to store videos obtained through "one record for multiple gains" may be named an album for "one record for multiple gains". The album for "one record for multiple gains" may further store a photo of a magic moment and a wonderful short video that are associated with the recorded original video.

It should be noted that, when the user does not trigger sharing or saving of the wonderful short video, the wonderful short video stored in the album for "one record for multiple gains" is a virtual video. The virtual video refers to a data file for which no video file is actually generated. For example, the virtual video may be XML play logic. Furthermore, the virtual video also has a corresponding video thumbnail in the album for "one record for multiple gains". Because the virtual video is not an actually generated video file, the virtual video occupies less memory space than the actually generated video file. For example, the actually generated video file occupies 5M and the virtual video occupies 30 k. In addition, if the user triggers an action of saving the wonderful short video, the actually generated wonderful short video file is also stored in the album for "one record for multiple gains".

The thumbnail of the video 302 shown in FIG. 5(2) and thumbnails of another photo and video (a video for which the "one record for multiple gains" function is not enabled) in the gallery may have different sizes or a same size. This is not limited in this embodiment of this application.

In a possible implementation, after the "one record for multiple gains" function is enabled, the thumbnail of the recorded video may be larger than the thumbnails of the another photo and video (a video recorded when the "one record for multiple gains" function is not enabled) in the gallery. For example, in the interface shown in FIG. 5(2), the thumbnail of the video 302 is larger than the thumbnail of the photo 303, and the thumbnail of the video 302 is also larger than the thumbnail of the video 304.

Alternatively, in a possible implementation, the thumbnail of the video recorded after the "one record for multiple gains" function is enabled has a same size as another thumbnail.

In a possible implementation, when the mobile phone displays the interface shown in FIG. 5(2), the video 302 may be automatically played as a latest recorded video of "one record for multiple gains", for the user to preview. It may be understood that, the video 302 is not played in full screen when previewed by the user, and a preview window of the video follows a window size of the thumbnail. In other words, thumbnails of other photos and videos can still be seen when the video 302 is previewed.

In still another optional manner of playing the video 302, after the user opens the gallery, the video 302 may be automatically played as the latest recorded video, that is, the video 302 is played in full screen, for the user to view. Certainly, if the user further takes some photos after the video 302 is recorded, that is, the video 302 is not the latest recorded video, the video 302 is not automatically played.

In another optional manner of playing the video 302, the user may tap the video 302 shown in FIG. 5(2) for viewing. After the video 302 is tapped, the mobile phone displays an interface shown in FIG. 5(3), and a play button 305 appears on a screen. When the user taps the play button 305, the mobile phone starts to play the video 302, and the mobile phone displays an interface shown in FIG. 5(4).

In the interface shown in FIG. 5(4), the video 302 is in a play state (for example, the video is being played to the third second). In the play state of the video 302, the user can perform triggering by using a specific gesture, so that the mobile phone presents an interface of a wonderful photo and a wonderful short video that are obtained through "one record for multiple gains". The trigger gesture may be a gesture by which the user swipes up from below the screen. The user can enter "one record for multiple gains" by swiping the screen upwards. It may be understood that, this application does not limit how to enter "one record for multiple gains", and the user can alternatively enter "one record for multiple gains" in another UX interaction manner.

For example, in the interface shown in FIG. 5(5), when the user's finger swipes the screen upwards beyond a preset distance, an identifier 306 is presented in the interface, prompting the user that a "one record for multiple gains" interface associated with the video 302 is to be presented. When the user completes the operation of swiping upwards, after the finger leaves the screen, the mobile phone displays an interface shown in FIG. 5(6). In the interface shown in FIG. 5(6), a portion of a preview image of the video 302 is displayed in an uppermost part of the screen. In this case, if the user's finger swipes the screen downwards, the interface returns to the play interface of the video 302.

The interface shown in FIG. 5(5) further includes a pause control 307 and a speaker control 308. The pause control 307 is configured to pause video playing. The speaker control 308 is configured to choose whether to mute video playing. An image frame queue arranged in a time sequence is displayed below the video for displaying current progress of video playing, so that the user can view a picture frame to be played.

In addition, the interface shown in FIG. 5(5) further includes options such as sharing, collection, editing, deletion, and more. If the user taps sharing, the video 302 can be shared. If the user taps collection, the video 302 can be collected in a folder. If the user taps editing, the video 302 can be edited. If the user taps deletion, the video 302 can be deleted. If the user taps more, other operational functions (such as moving, replicating, adding remarks, hiding, and renaming) with respect to the video can be performed.

With respect to the interface shown in (6) of FIG. 5, the mobile phone presents an interface of a photo of a magic moment and a wonderful short video that are obtained through "one record for multiple gains", and the interface presents a recommended 15-second wonderful short video 309 and four recommended high-quality photos (310, 311, 312, and 313) of magic moments and a jigsaw puzzle 314 to the user. The 15-second wonderful short video 309 includes magic moments. Image frames included in the 15-second wonderful short video 309 are all captured from the complete video with duration of 16 minutes and 15 seconds. Certainly, the capturing herein does not refer to an operation of capturing an image (or capturing an image frame) from the short video with duration of 16 minutes and 15 seconds in a conventional manner. The following describes a manner of obtaining the 15-second wonderful short video 309.

In a possible manner, the 15-second wonderful short video 309 is a video formed by splicing different clips from the video with duration of 16 minutes and 15 seconds. For example, the 15-second wonderful short video is formed by splicing the following plurality of clips: the 9th second of the 5th minute to the 11th second of the 5th minute, the 20th second of the 7th minute to the 22nd second of the 7th minute, the 3rd second of the 10th minute to the 5th second of the 10th minute, the 13th second of the 13th minute to the 15th second of the 13th minute, and the 8th second of the 15th minute to the 10th second of the 15th minute.

In another possible manner, the 15-second wonderful short video 309 is a complete video from the video with duration of 16 minutes and 15 seconds. For example, the 15-second wonderful short video includes a video starting from the 3rd second of the 10th minute to the 18th second of the 10th minute. In this case, the image frames corresponding to the magic moments MMs are all in the video starting from the 3rd second of the 10th minute to the 18th second of the 10th minute.

It should be noted that, if a quantity of photos of magic moments is large, photos of some magic moments MMs may be discarded when the 15-second wonderful short video is generated. A principle of discarding is that photos of magic moments with higher scores are retained preferentially.

It should be further noted that, if the quantity of photos of magic moments MMs is not large enough, it may be considered that some image frames may be appropriately added for transition. For example, image frames in which transition occurs may be added. For another example, when previous and next image frames of the magic moment are cropped, a cropping range may be appropriately extended. For example, if three MMs are determined, when the 15-second wonderful short video is generated, each MM may be used as a center, and a clip with cropping duration of 5 seconds is extended to both sides, to obtain three clips with cropping duration of 5 seconds, and then the three clips are spliced into a 15-second wonderful short video.

It may be understood that, embodiments of this application do not limit duration and a quantity of wonderful short videos. For example, the wonderful short video may be one 20-second wonderful short video, or may be two wonderful short videos, duration of which is 15 seconds and 20 seconds, respectively. Likewise, it may be understood that, embodiments of this application do not limit a quantity of photos of magic moments MMs, either. There may be one or more photos of magic moments MMs. Specifically, there may be one to four photos of magic moments MMs.

In the interface shown in FIG. 5(6), the jigsaw puzzle 314 may be a jigsaw puzzle that includes a plurality of photos of magic moments MMs. It should be understood that, embodiments of this application do not limit a quantity of photos of magic moments included in the jigsaw puzzle 314. The jigsaw puzzle 314 may include some or all of photos of magic moments MMs.

In the interface shown in FIG. 5(6), a character tag icon is further included in a lower part of the screen. If the user taps a character tag icon, the mobile phone displays a photo related to the character tag icon (or in other words, displays a cluster of the character tag icon).

In the interface shown in FIG. 5(6), the user taps the 15-second wonderful short video 309 shown in FIG. 5(6), and the mobile phone displays an interface shown in FIG. 5(7).

As shown in FIG. 5(7), the user enters immersive card playing. Immersive card playing is a playing mode in which a picture fills an entire screen. It can be seen that, in the interface shown in FIG. 5(7), a picture fills an entire screen of the mobile phone.

In a possible implementation, in the interface shown in FIG. 5(7), if the user taps the screen, the interface displays an interface shown in FIG. 5(8). The interface shown in FIG. 5(8) may include options such as a progress bar 315 for video playing, sharing 316, collection 317, editing 318, and deletion 319. Through the progress bar 315, the user can know the progress of the video playing.

In the interface shown in FIG. 5(8), if the user taps sharing 316, the mobile phone generates a video file corresponding to the wonderful short video 309 based on the MM tag, and stores the video file, so that the user can share the video file. If the user taps collection 317, the mobile phone stores the wonderful short video 309 in a collection folder. In this case, the video file corresponding to the wonderful short video 309 does not need to be generated. If the user taps editing 318, the mobile phone edits the wonderful short video 309. Whether the video file of the wonderful short video 309 is generated may depend on a subsequent operation of the user. For example, if the user needs to save the wonderful short video 309, a video file of the edited wonderful short video 309 is generated for saving. If the user taps deletion 319, the video 309 is deleted. It should be noted that, sharing 316 in the interface shown in FIG. 5(8) is substantially different from the sharing option in the interface shown in FIG. 5(5). Sharing 316 in the interface shown in FIG. 5(8) is used to share the wonderful short video 309. The mobile phone generates a video file of the to-be-shared wonderful short video 309 only after the user taps sharing 316 in the interface shown in FIG. 5(8). The sharing option in the interface shown in FIG. 5(5) is used to share the recorded original video (that is, the video 302).

It should be noted that, in an optional implementation, to save storage space of the terminal, the 15-second wonderful short video 309 displayed in the interface in FIG. 5(6), the video played in FIG. 5(7), and the video displayed in the interface in FIG. 5(8) are all playing policies generated by a player based on a video tag. In this case, an internal memory 121 of the mobile phone does not actually generate a corresponding video file. In other words, the memory does not store the corresponding video file before the user delivers a sharing or saving instruction. Specifically, the 15-second wonderful short video 309 displayed in the interface in FIG. 5(6), the video played in FIG. 5(7), and the video displayed in the interface in FIG. 5(8) may be generated in the following manner: A location of a magic moment in a complete video file may be known based on an MM tag, and a preview video may be generated based on a location of the MM tag in the video.

For example, it is assumed that five MM tags are obtained by using the video 302. A first MM tag is the 10th second of the 5th minute, a second MM tag is the 21st second of the 7th minute, a third MM tag is the 4th second of the 10th minute, a fourth MM tag is the 14th second of the 13th minute, and a fifth MM tag is the 9th second of the 15th minute. In this case, time of each MM tag is used as a center point, cropping is extended to both sides, to generate a 15-second wonderful short video. The finally obtained 15-second selected video includes the following time segments: the 9th second of the 5th minute to the 11th second of the 5th minute, the 20th second of the 7th minute to the 22nd second of the 7th minute, the 3rd second of the 10th minute to the 5th second of the 10th minute, the 13th second of the 13th minute to the 15th second of the 13th minute, and the 8th second of the 15th minute to the 10th second of the 15th minute. It should be understood that, the examples herein are merely for illustrative description, and this application is not limited thereto.

The 15-second wonderful short video is actually generated only when the user needs to share or save the 15-second wonderful short video. For example, in the interface shown in FIG. 5(8), when the user taps sharing 316, the mobile phone generates an actual 15-second wonderful short video based on a playing policy.

Figure 6:
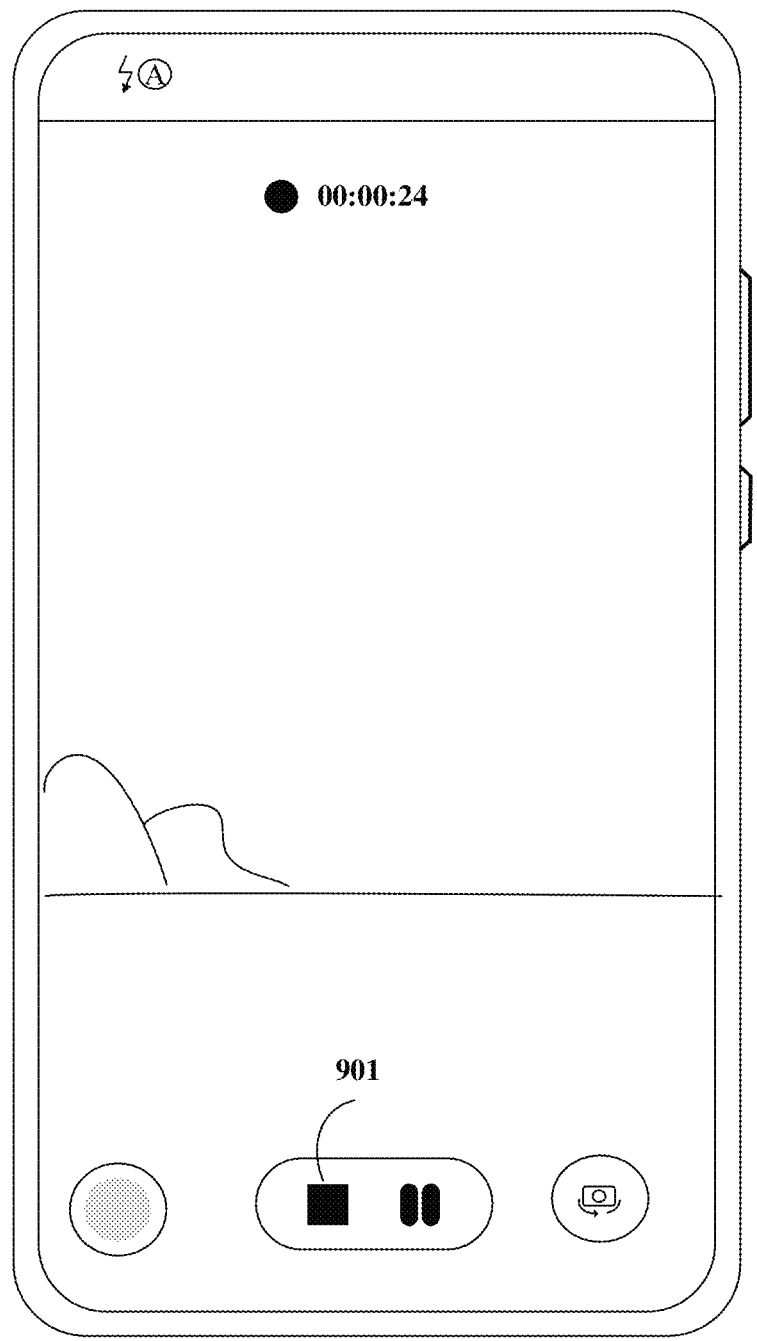
FIGS. 6(1)-6(5) of a graphical user interface GUI for another example of "one record for multiple gains" according to this application.
Figure 6:
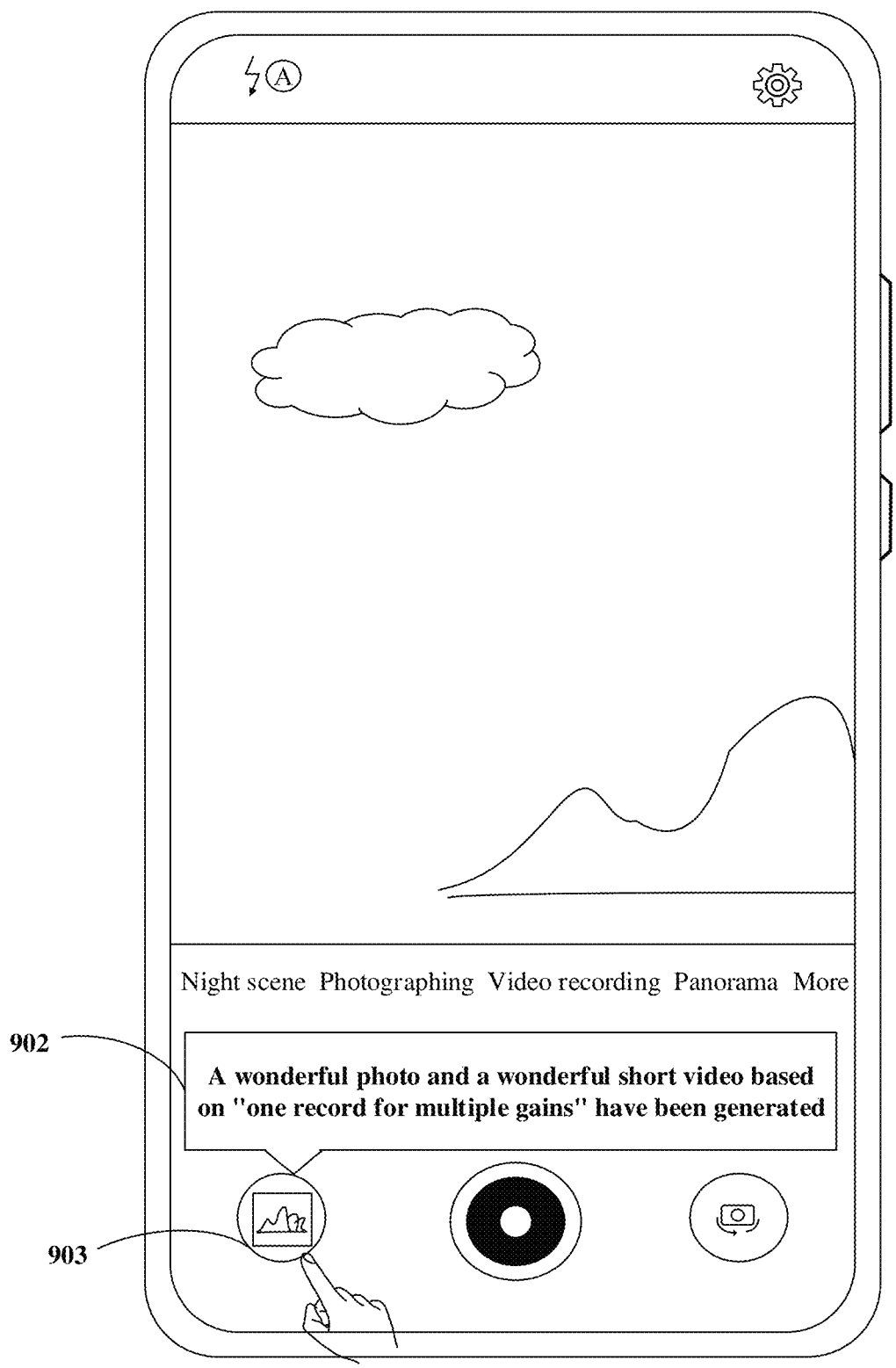
Figure 6:
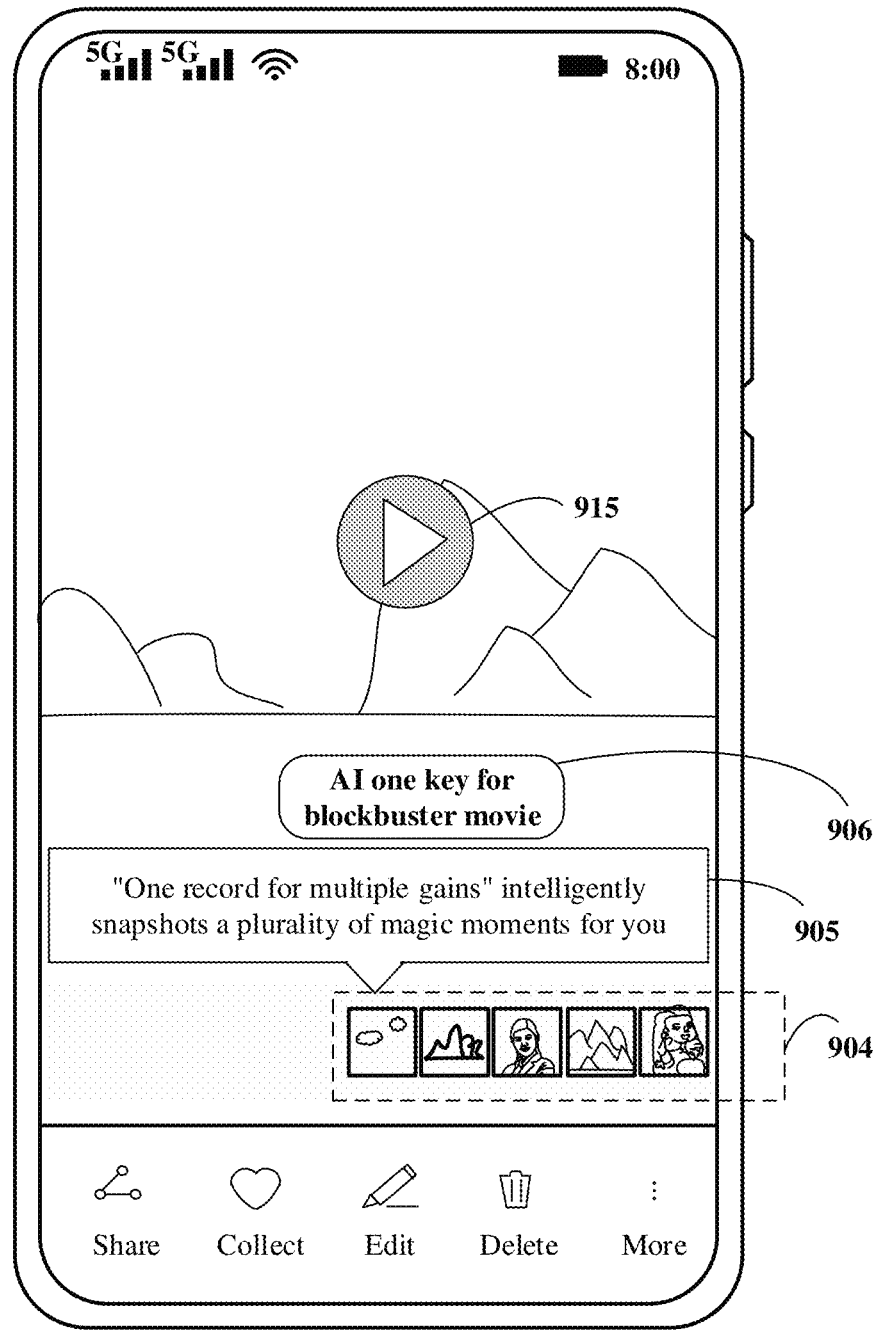
Figure 6:
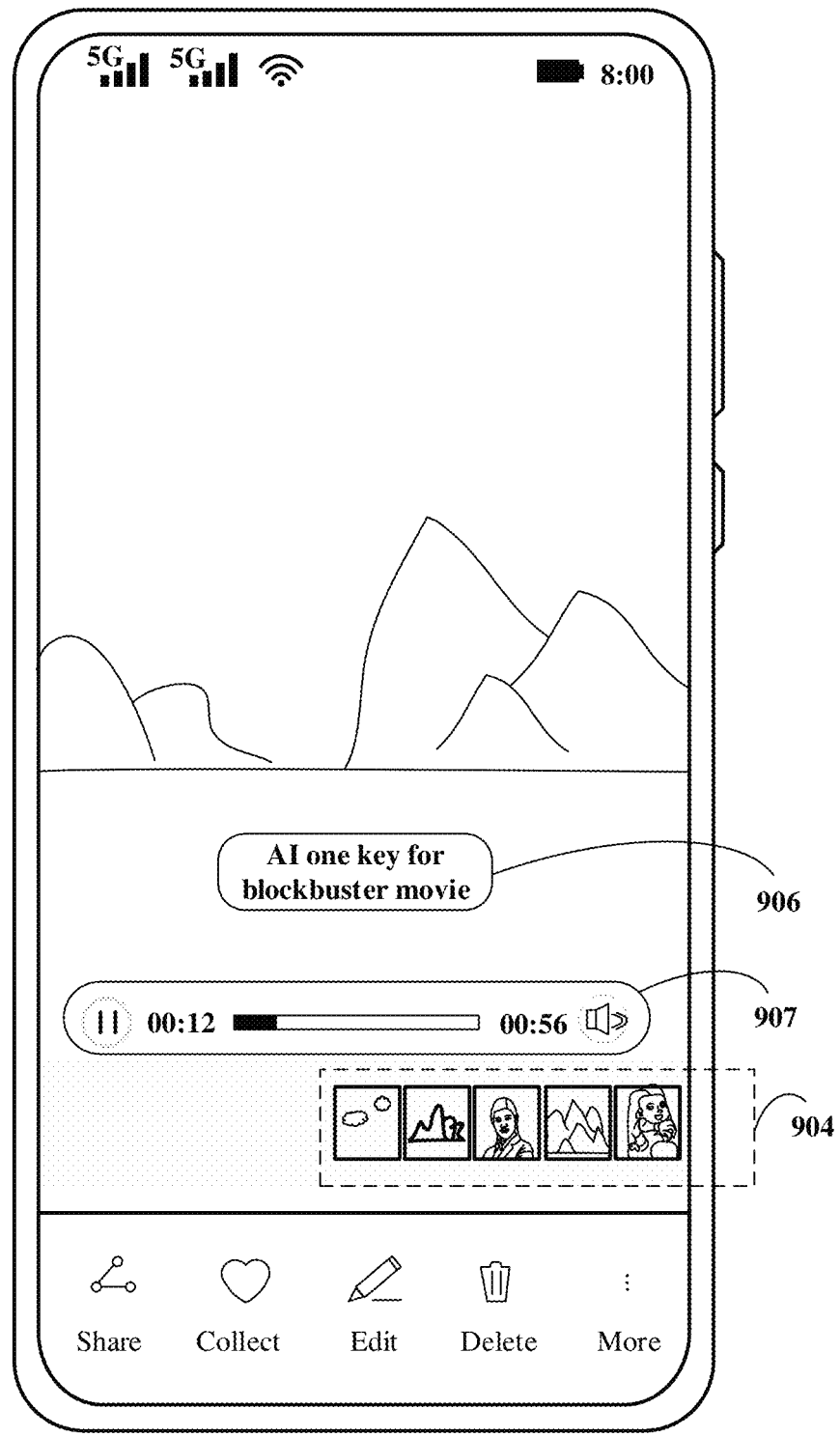
Figure 6:
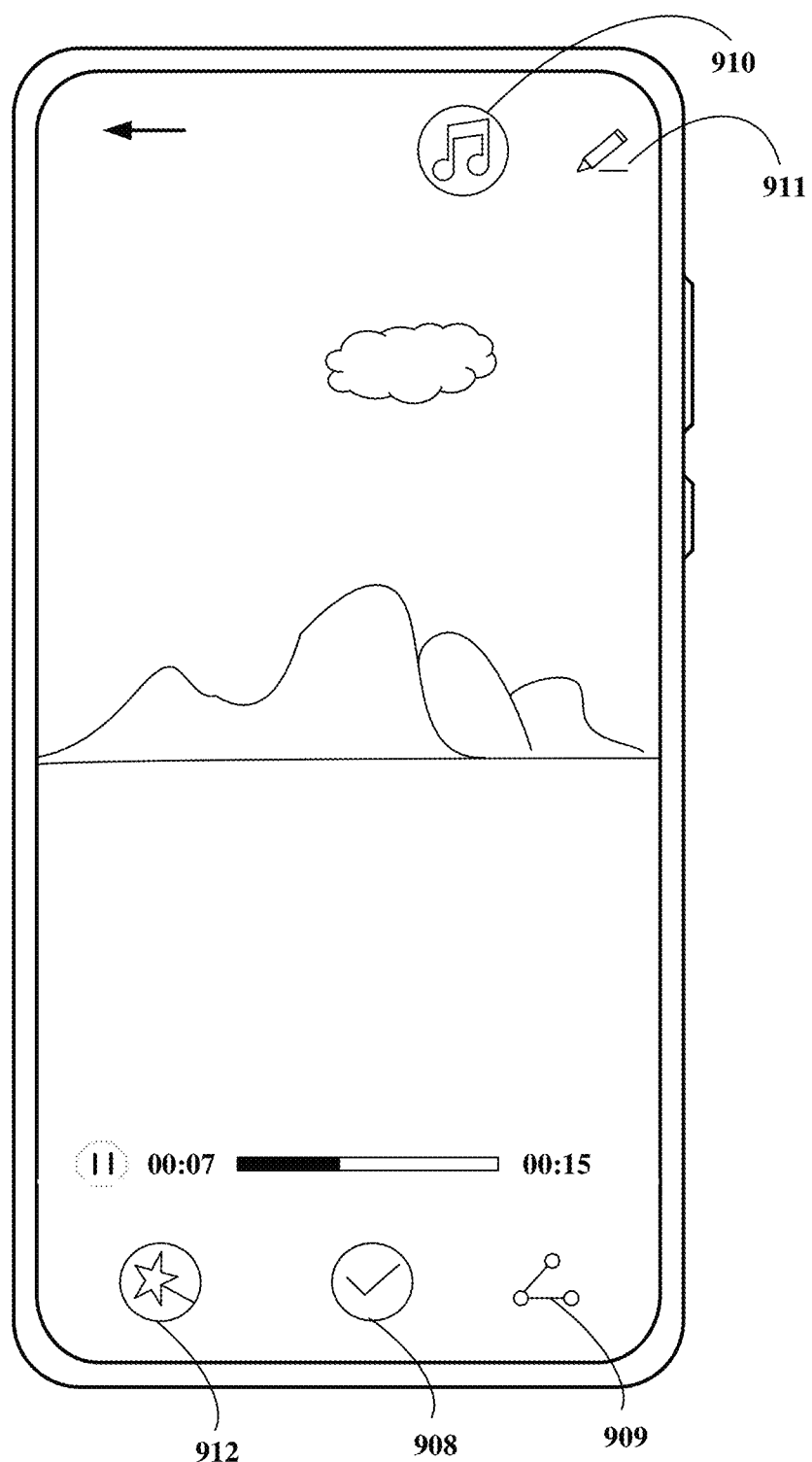

FIG. 6 is a schematic diagram of another example of a GUI related to "one record for multiple gains" according to an embodiment of this application.

When the "one record for multiple gains" option is enabled, FIG. 6(1) presents an interface in the recording process, such as a picture at the 24th second. If the recording needs to end, the stop control 901 in the interface shown in FIG. 6(1) may be tapped.

After the recording ends, if it is the first time for the user to use the "one record for multiple gains" function for video recording, the mobile phone prompts the user that a file of "one record for multiple gains" has been generated. For example, the interface shown in FIG. 6(2) is the preview interface after the recording ends. The interface displays a balloon window 902, and the window 902 displays content "a wonderful photo and a wonderful short video based on "one record for multiple gains" have been generated". Herein, a preview image 903 in FIG. 6(2) is a thumbnail display of the recorded original video. If the user taps 903, the recorded original video may be presented in the gallery.

After the user taps 903, the gallery may be started to display the interface shown in FIG. 6(3). The interface shown in FIG. 6(3) is a presentation of the recorded original video in the gallery application. In the interface shown in FIG. 6(3), a magic moment area 904 is included below the recorded video. The magic moment area 904 is used to present an image frame of a magic moment. For example, the magic moment area 904 includes thumbnails of five photos of magic moments.

It should be noted that, the photos of magic moments included in the magic moment area 904 are similar to the high-quality photos 310-313 of magic moments shown in FIG. 5(6). Optionally, the photos of magic moments included in the magic moment area 904 may include a thumbnail of a jigsaw puzzle or may not include a thumbnail of a jigsaw puzzle. A definition of the jigsaw puzzle herein is similar to that of the jigsaw puzzle 314 shown in FIG. 5(6), and details are not described herein again.

In addition, because the video is accessed for the first time, the interface further displays a guide box 905 (or referred to as a prompt box). The guide box 905 is used to prompt the user with the following information: "one record for multiple gains" intelligently snapshots a plurality of magic moments for you. To be specific, the guide box 905 is used to inform the user that the magic moment area 904 includes thumbnails of the photos of magic moments. In an optional implementation, when the guide box 905 is displayed, the guide box 905 may be highlighted to better remind the user. In this case, in the interface shown in FIG. 6(3), display brightness may be lowered for parts other than the guide box 905 and the magic moment area 904, so as to highlight the guide box 905 and the magic moment area 904. Certainly, if the video is not accessed for the first time, the guide box 905 does not appear.

In addition, the interface shown in FIG. 6(3) further includes options such as a play control 915, sharing, collection, editing, deletion, and more, so that the user performs corresponding operations on the original video. For specific meanings of the options, refer to the foregoing related descriptions in FIG. 5(5). Details are not described herein again.

After the user taps the play control 915, the interface starts to play the recorded video. For example, the interface shown in FIG. 6(4) is an interface for playing the recorded video, and the interface plays a picture at the 12th second. The video playing interface displays an "AI one key for blockbuster movie" control 906 to the user. The "AI one key for blockbuster movie" control 906 is configured to access the wonderful short video. To be specific, if the user taps the control 906, a play interface of the wonderful short video is displayed, for example, the interface shown in FIG. 6(5). The interface shown in FIG. 6(5) is the same as an interface shown in FIG. 7(2). For related descriptions, refer to the following descriptions. The interface shown in FIG. 6(4) further includes a progress bar 907. For example, the progress bar 907 indicates that duration of the recorded video is 56 seconds, and the video is currently played to the 12th second. The progress bar may also be referred to as a slide bar, and the user can adjust the playing progress by dragging the slide bar. The interface shown in FIG. 6(4) further includes a magic moment area 904, and the magic moment area 904 is also used to present an image frame of a magic moment. Similarly, the interface shown in FIG. 6(4) further includes options such as sharing, collection, editing, deletion, and more.

Optionally, the interface shown in FIG. 6(4) may further include a recording time of the video 903, address location information of the mobile phone when the video 903 is recorded, and the like.

Figure 7:
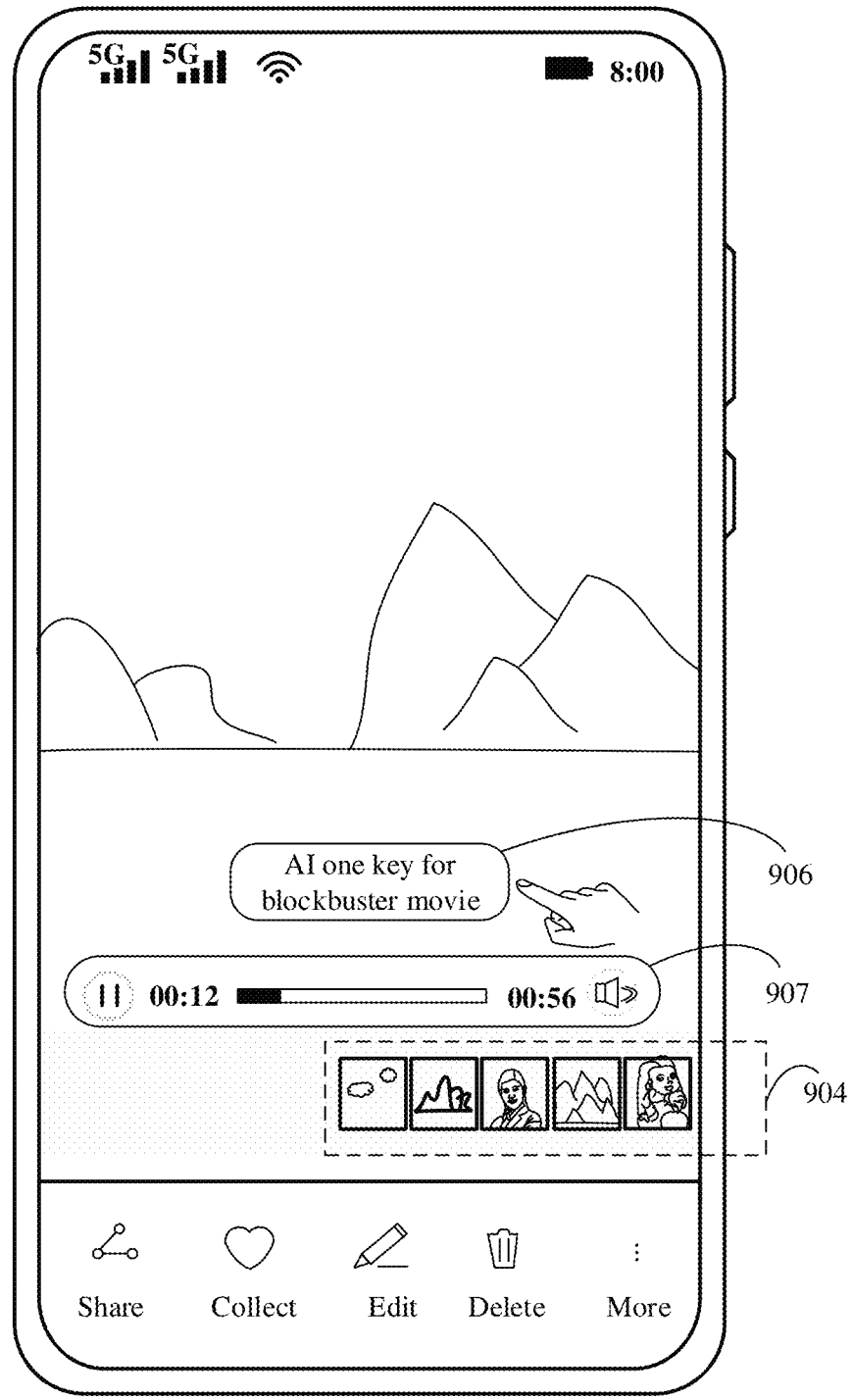
FIGS. 7(1)-7(4) are schematic diagrams of a graphical user interface GUI for still another example of "one record for multiple gains" according to this application.
Figure 7:
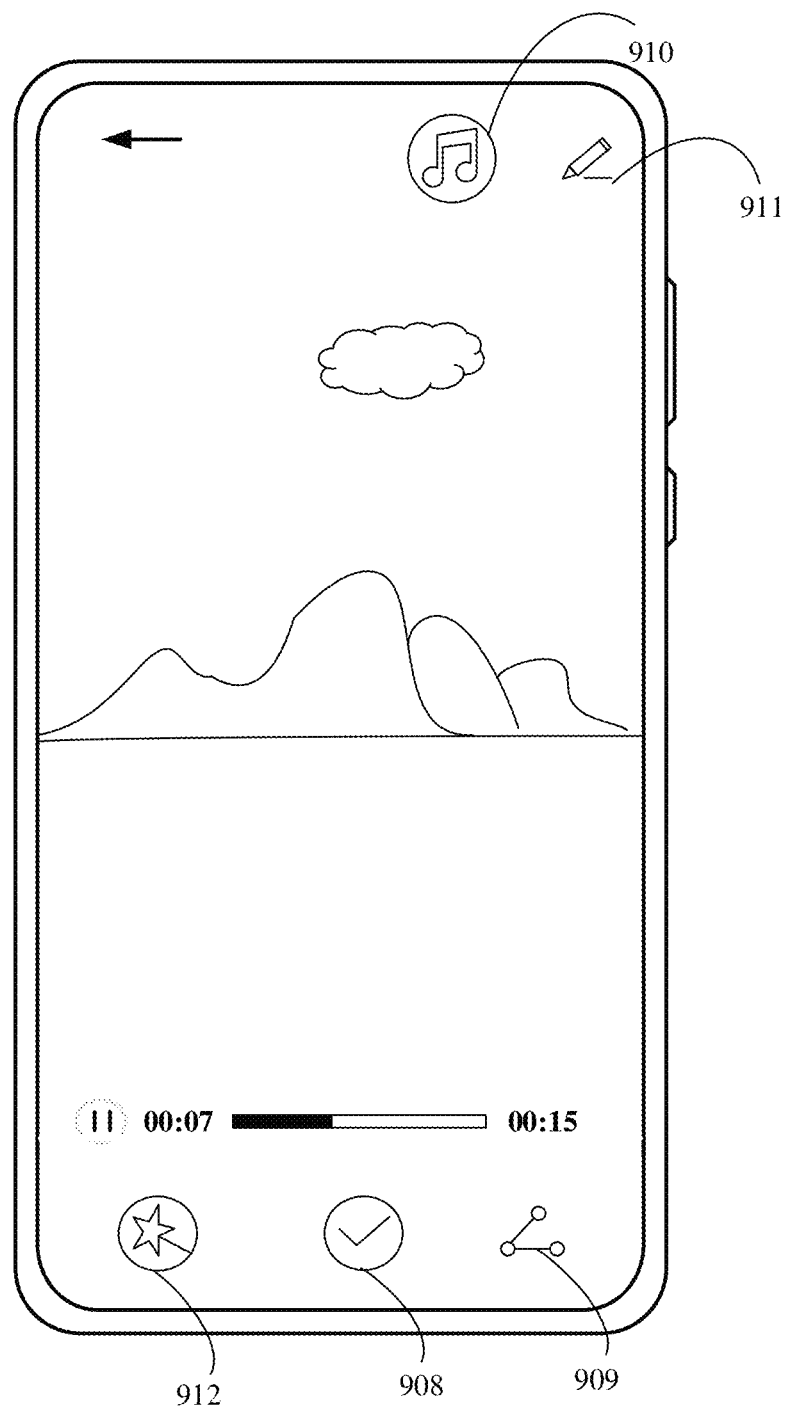
Figure 7:
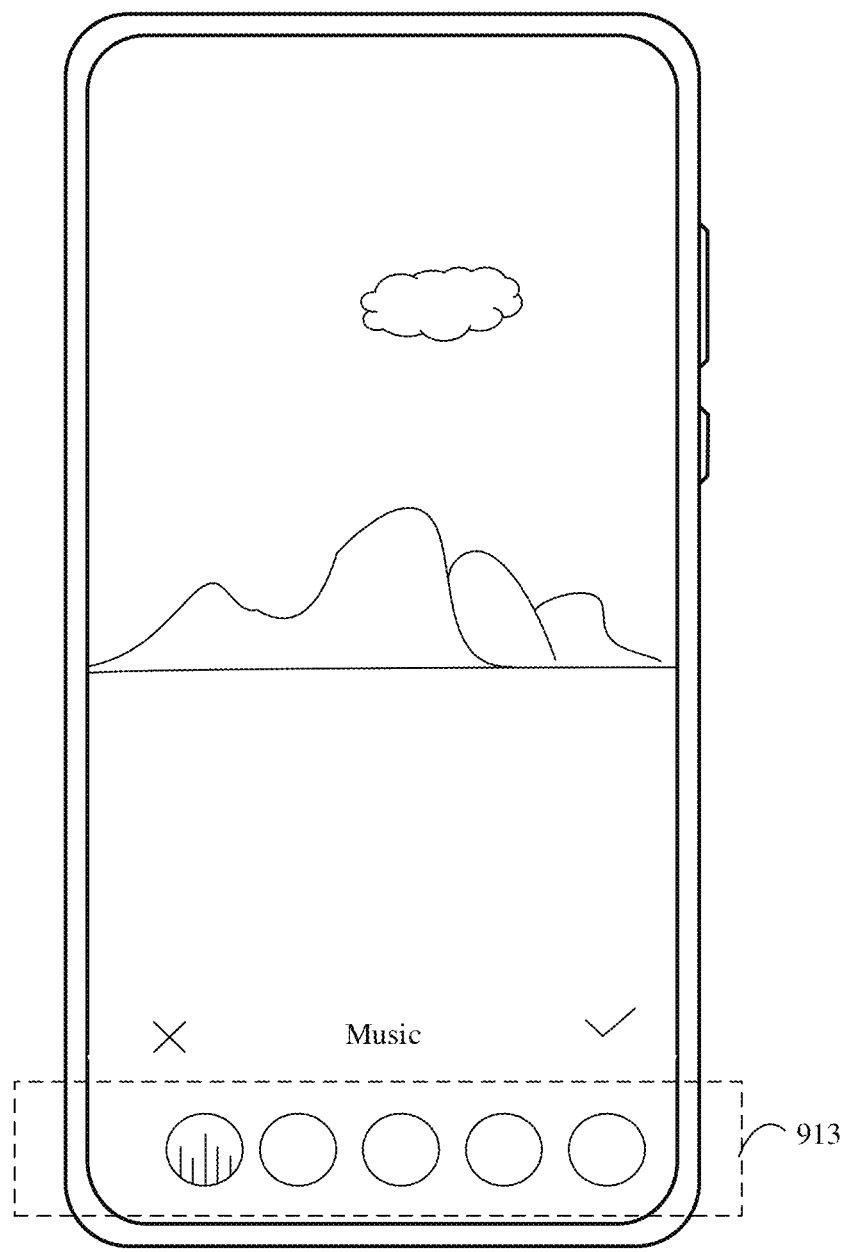
Figure 7:
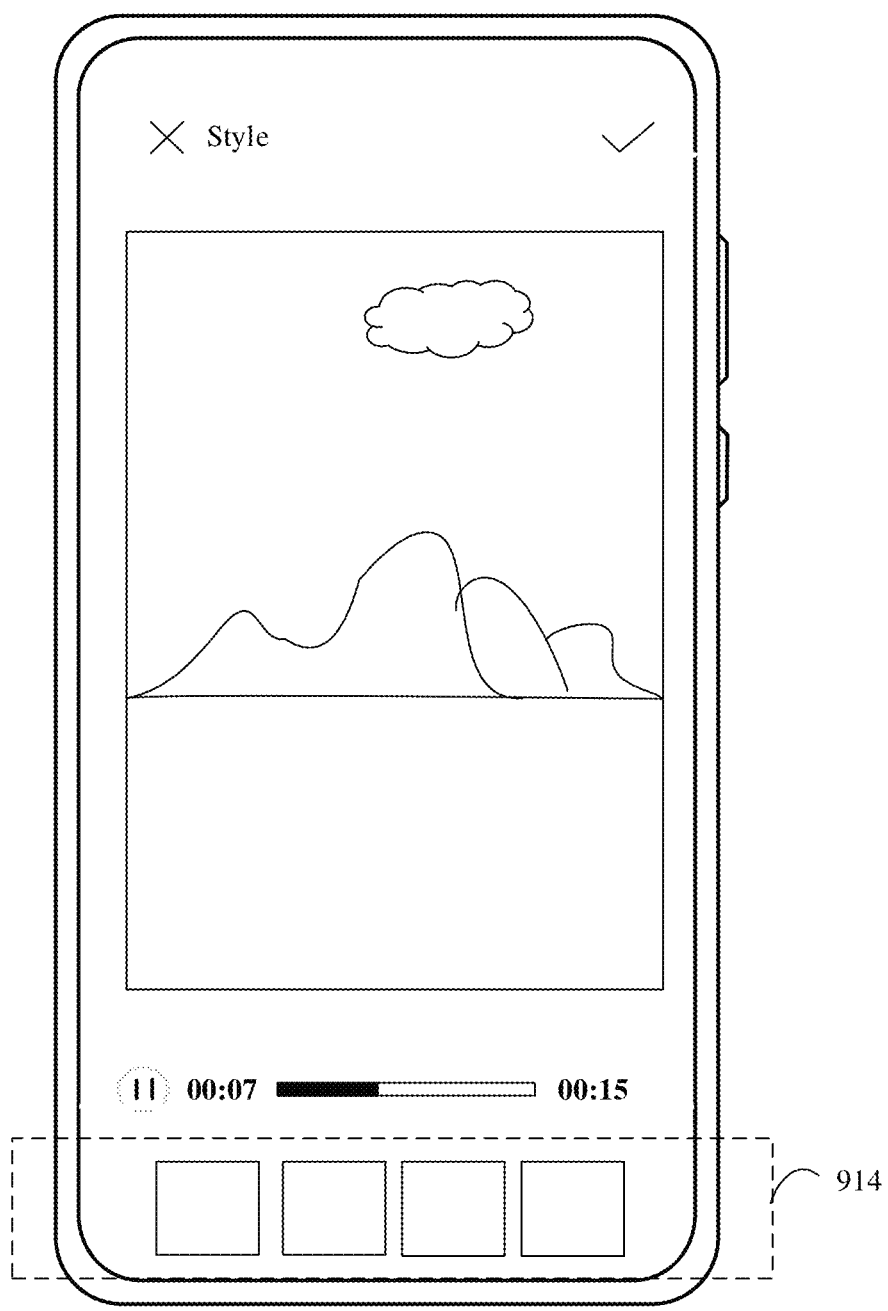

FIG. 7 is a schematic diagram of still another example of a GUI related to "one record for multiple gains" according to an embodiment of this application.

Similar to the interface shown in FIG. 6(4), FIG. 7(1) shows an interface for playing the recorded video. Similarly, as shown in FIG. 7(1), the interface includes options such as a video being played, an "AI one key for blockbuster movie" control 906, a progress bar 907, a magic moment area 904, sharing, collection, editing, deletion, and more. Optionally, to highlight the "one record for multiple gains" function, an area in which 906, 907, and 904 are located in the interface may form a display box for highlighted display. An implementation of the highlighted display is that a width of the display box formed by the area in which 906, 907, and 904 are located in the interface may be greater than a width of the video being played.

In the interface shown in FIG. 7(1), if the user taps the control 906, the interface displays the interface shown in FIG. 7(2). In the interface shown in FIG. 7(2), a wonderful short video is being played. Similarly, the wonderful short video played herein is a playing policy generated based on a video tag. In this case, an internal memory 121 of the mobile phone does not actually generate a corresponding video file. In other words, the memory does not store the corresponding video file before the user delivers a sharing or saving instruction. The interface in FIG. 7(2) further includes a save control 908, a share control 909, a music control 910, an edit control 911, a style control 912, and the like.

Similarly, if the user taps the control 908 or the control 909, the mobile phone generates a video file of the 15-second wonderful short video.

If the user taps the music control 910, an interface shown in FIG. 7(3) may be displayed for adding a different piece of music to the wonderful short video. In the interface shown in FIG. 7(3), the user may tap any one of music making controls in a dashed-line box 913 to select a piece of music for the wonderful short video, for example, soothing music, romantic music, warm music, relaxing music, and quiet music.

If the user taps the style control 912, an interface shown in FIG. 7(4) may be displayed for selecting a different style for the wonderful short video. In the interface shown in FIG. 7(4), the user taps any one of style controls in a dashed-line box 914 to select a style for the wonderful short video. The video style herein may be a filter. To be specific, a filter is applied to perform color modulation processing on the video. A filter is one of video special effects used to achieve various special effects of the video. Optionally, the video style herein may be alternatively a video effect such as fast play or slow play. Optionally, the video style herein may alternatively refer to various themes, and different themes include respective corresponding filters, music, and the like.

If the user taps the edit control 911, editing operations such as clipping, segmentation, volume adjustment, and frame size adjustment may be performed on the wonderful short video. After the user completes editing, if the edited wonderful short video is to be saved, the mobile phone may generate a corresponding edited video file. If the edited wonderful short video is to be discarded, that is, the edited wonderful short video is not saved, the mobile phone may not actually generate a video file, and only the virtual video is still stored in the album for "one record for multiple gains".

In embodiments of this application, a wonderful photo obtained through "one record for multiple gains" is actually stored. In other words, if the "one record for multiple gains" option is enabled, a wonderful photo obtained by automatically triggering photographing during video recording is automatically stored in the gallery. For example, after the end of video recording in FIG. 2(6) and after the end of video recording in FIG. 6(1), wonderful photos automatically snapshotted during recording are stored in the gallery. The wonderful photos automatically snapshotted during recording are, for example, wonderful photos 310-313 shown in FIG. 5(6), and wonderful photos shown in the magic moment area 904 in FIG. 6(3), FIG. 6(4), or FIG. 7(1). These wonderful photos automatically snapshotted during recording may be automatically stored in the album for "one record for multiple gains", as described above.

In a possible implementation, if the user does not view a file related to "one record for multiple gains", the unviewed wonderful photos are automatically deleted after an automatic retention period of N days, so as to save the storage space of the terminal. A value of N may be preset. For example, if the user does not perform the operation of swiping upwards shown in FIG. 5(5) to view the file of "one record for multiple gains", the photos 310-314 shown in FIG. 5(6) are automatically deleted after an automatic retention period of N days. For another example, if the user does not view the wonderful photos shown in the magic moment area 904 in FIG. 6(3), FIG. 6(4), or FIG. 7(1), the wonderful photos shown in the magic moment area 904 in FIG. 6(3), FIG. 6(4), or FIG. 7(1) are automatically deleted after an automatic retention period of N days.

Optionally, if the user actively deletes the recorded original video before the period of N days expires, prompt information may be displayed to the user. The prompt information is used to prompt the user whether to delete the file of "one record for multiple gains" for the original video (or a wonderful photo and a wonderful short video associated with the original video). For example, when the user taps the deletion option in the interface shown in FIG. 5(5), the mobile phone may display a prompt window. The prompt window is used to prompt the user whether to delete the associated wonderful photo and wonderful short video. For another example, when the user taps the deletion option in the interface shown in FIG. 6(3), FIG. 6(4), or FIG. 7(1), the mobile phone may display a prompt window. The prompt window is used to prompt the user whether to delete the associated wonderful photo and wonderful short video.

The foregoing describes a case in which the video file of the wonderful short video is actually generated only when the user performs operations such as tapping sharing or saving. This application is not limited thereto.

In another optional implementation, after the recording ends, the wonderful short video may be alternatively directly generated based on the MM tag for storage (that is, the wonderful short video is generated without requiring the user to perform operations such as tapping sharing or saving). In addition, with respect to the wonderful short video generated in this implementation, when the user deletes the recorded original video, the user may be alternatively prompted whether to delete the file of "one record for multiple gains" for the original video.

Figure 8A:
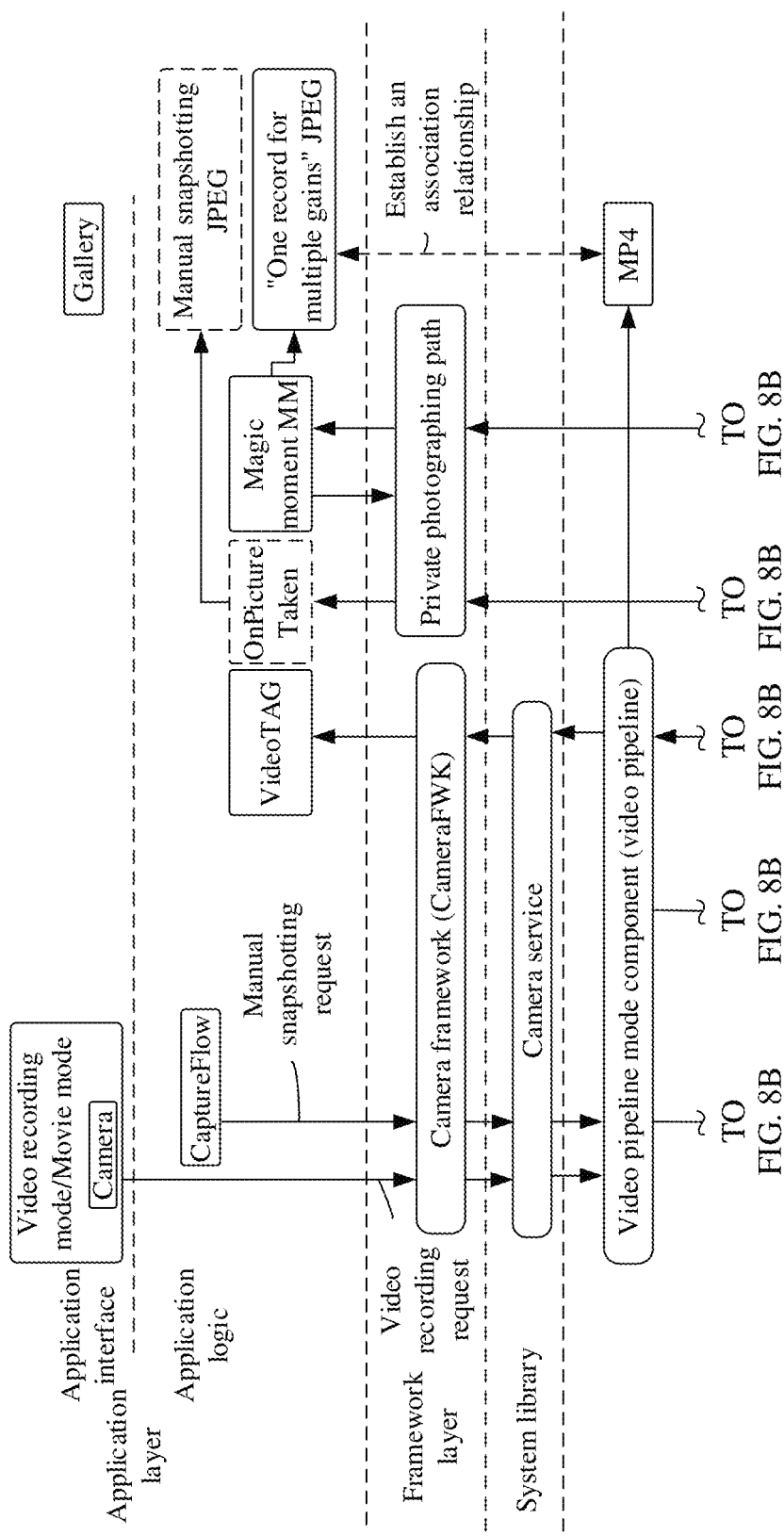
FIG. 8A and FIG. 8B are a schematic diagram of a software system of an electronic device applicable to this application.
Figure 8B:
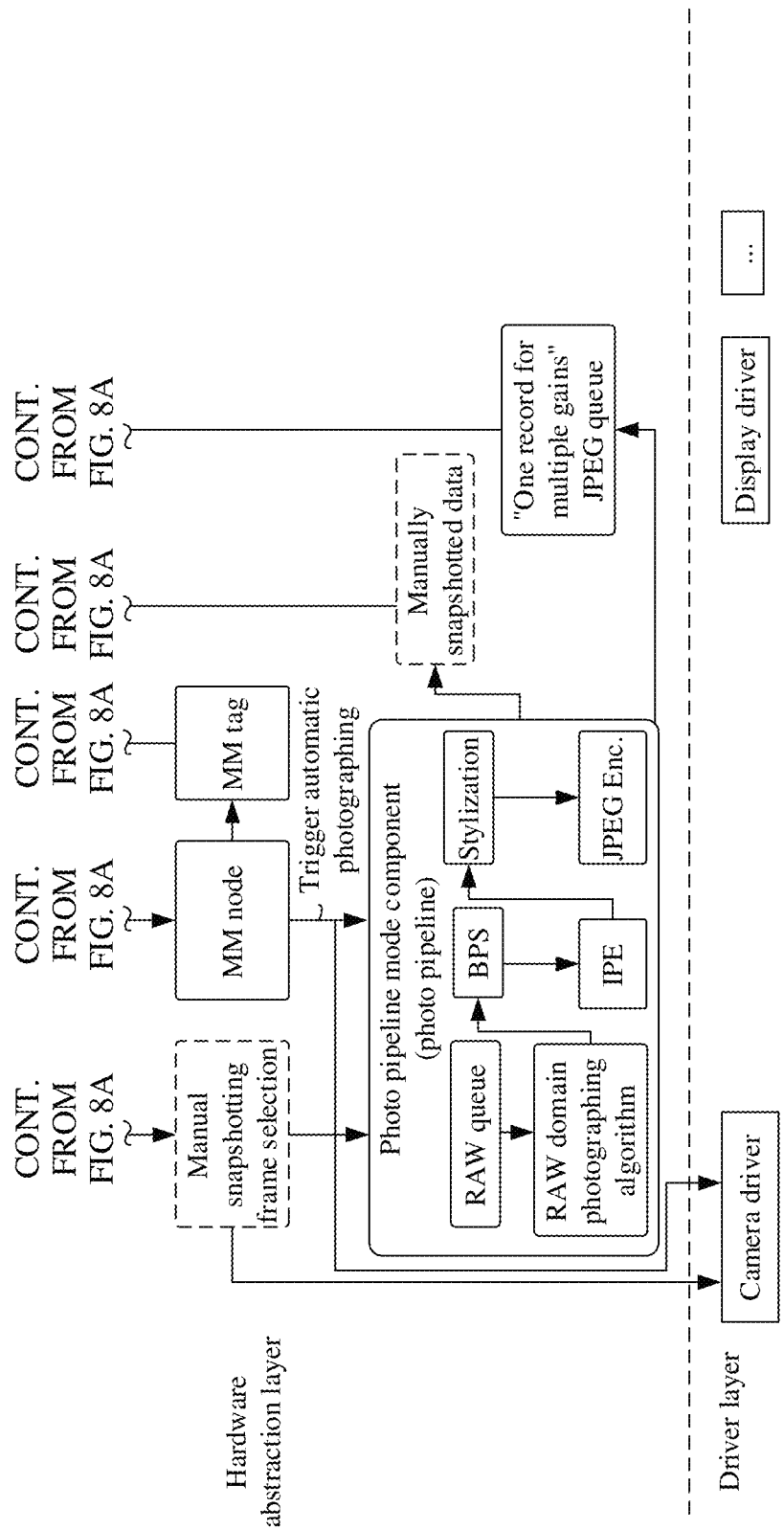

FIG. 8A and FIG. 8B are a schematic diagram of a software structure of an electronic device 100 according to an embodiment of this application. The hierarchical architecture divides software into layers, and each layer has a clear function and division of labor. The layers communicate with each other by using a software interface. In some embodiments, the Android system may be divided into five layers, which are respectively an application (application, APP) layer, an application framework (FWK for short) layer, a system library, a hardware abstraction layer (HAL), and a driver layer from top to bottom.

The application layer may include a series of application packages. For example, as shown in FIG. 8A and FIG. 8B, the application layer includes a camera application and a gallery application. The camera application supports a video recording mode (or a movie mode).

The application layer may be divided into an application interface (UI) and application logic. An application interface of the camera may include a video recording mode, a movie mode, and the like.

The application logic includes the following modules: a capture flow (CaptureFlow), a video tag (Video TAG), a magic moment MM, a captured photo callback function (OnPictureTaken), manual snapshotting JPEG, "one record for multiple gains" JPEG, and the like.

The CaptureFlow supports a snapshotting operation manually triggered by the user.

The Video TAG is used to store time information of a magic moment MM tag sent by the framework layer and description of semantic information (including LV0-LV3) of the magic moment. The description of semantic information of the magic moment includes but is not limited to a type of the magic moment (for example, the type of the magic moment is a smile, a jump, a look back, or a goal scoring instant), a score of the magic moment, and the like.

The OnPictureTaken is a callback function for calling back image data. In FIG. 8A and FIG. 8B, the OnPictureTaken in the application logic layer may be used to call back manually snapshotted image data. The manual snapshotting JPEG in the application logic layer is used to generate a manually snapshotted image based on the manually snapshotted image data that is called back by the OnPictureTaken.

The magic moment MM is used to store queue data of the "one record for multiple gains" JEPG. In a possible implementation, the queue data of the "one record for multiple gains" JEPG may be transmitted to the "one record for multiple gains" JEPG module, so that the "one record for multiple gains" JEPG module generates the "one record for multiple gains" JEPG. The "one record for multiple gains" JEPG may be presented in the gallery as 310-313 shown in FIG. 5(6), and as the magic moment area 904 in FIG. 6(3), FIG. 6(4), or FIG. 7(1).

It may be understood that, the application layer may further include other applications such as calendar, call, map, navigation, WLAN, Bluetooth, music, video, SMS, browser, WeChat, Alipay, and Taobao.

The application framework layer provides an application programming interface (application programming interface, API) and a programming framework for an application at the application layer. The application framework layer may include some predefined functions.

As shown in FIG. 8A and FIG. 8B, the application framework layer may include a camera framework (or an interface corresponding to the camera application) and a private photographing path. The private photographing path is used to transmit data of the image to corresponding modules of the application layer. In an implementation, the "one record for multiple gains" JPEG queue is transmitted to the magic moment MM module of the application layer through the private photographing path. Photos of magic moments MMs are presented in the gallery application, for example, 310-313 shown in FIG. 5(6), the magic moment area 904 shown in FIG. 6(3), or the magic moment area 904 shown in FIG. 7(1). In an implementation, the data of the manually snapshotted image is transmitted to the OnPictureTaken module of the application layer through the private photographing path.

It may be understood that, the application framework layer may further include other content, such as a window manager, a content provider, a view system, a telephone manager, a resource manager, and a notification manager.

The window manager is configured to manage a window program. The window manager can obtain a display screen size, and determine whether there is a status bar, a lock screen, a capture screen, or the like.

The content provider is configured to store and obtain data and make the data accessible to an application. The data may include a video, an image, audio, calls made and answered, a browsing history and a bookmark, and an address book.

The view system includes visual controls, such as a control for displaying a text and a control for displaying a picture. The view system may be configured to construct an application. A display interface may include one or more views, for example, include a display interface of an SMS message notification icon, and may include a view for displaying a text and a view for displaying a picture. The application layer and the application framework layer run in a virtual machine. The virtual machine executes Java files of the application layer and the application framework layer as binary files. The virtual machine is configured to perform functions such as object lifecycle management, stack management, thread management, security and exception management, and garbage collection.

As shown in FIG. 8A and FIG. 8B, the system library may include a camera service function.

The system library may further include a plurality of functional modules (not shown in FIG. 8A or FIG. 8B), for example, a surface manager (surface manager), a media library (Media Libraries), a three-dimensional graphics processing library (for example, open graphics library for embedded systems (open graphics library for embedded systems, OpenGL ES), and a 2D graphics engine (for example, a skia graphics library (skia graphics library, SGL)).

The surface manager is configured to: manage a display subsystem, and provide fusion of 2D layers and 3D layers for a plurality of applications.

The media library supports playback and recording of audio in a plurality of formats, playback and recording of videos in a plurality of formats, and still image files. The media library may support a plurality of audio and video coding formats, such as MPEG 4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The three-dimensional graphics processing library may be configured to implement three-dimensional graphics drawing, image rendering, composing, and layer processing.

The two-dimensional graphics engine is a drawing engine for 2D drawing.

The hardware abstraction layer (HAL) is an interface layer that is located between an operating system kernel and a hardware circuit, and is intended to abstract hardware. The hardware abstraction layer hides hardware interface details of a specific platform, provides a virtual hardware platform for an operating system, and makes the operating system hardware-independent and portable on a plurality of platforms.

As shown in FIG. 8A and FIG. 8B, the hardware abstraction layer includes a video pipeline mode component (video pipeline), a magic moment MM node, a photo pipeline mode component (photo pipeline), an MM tag, a "one record for multiple gains" JPEG queue, and a video encoding MP4. The photo pipeline mode component includes a RAW queue, a RAW domain photographing algorithm, a Bayer processing segment (Bayer processing segment, BPS) module, an image processing engine (Image processing engine, IPE) module, a stylization module, and a JPEG encoder (encoder, Enc).

The driver layer is a layer between hardware and software. As shown in FIG. 8A and FIG. 8B, the driver layer may include driver modules such as a display driver and a camera driver. The camera driver is a driver layer of the camera device and is mainly responsible for interaction with hardware.

The camera application is used as an example. The camera application in the application layer may be displayed on a screen of an electronic device in an icon form. When the icon of the camera application is triggered, the electronic device runs the camera application. The camera application runs on the electronic device, and the electronic device may send a corresponding touch event to the driver layer based on an operation of the user. When the touchscreen receives the touch event, the camera application is started, and the camera is started by calling the camera driver of the driver layer.

The following describes interaction between software modules used in the video recording method provided in embodiments of this application. As shown in FIG. 8A and FIG. 8B, the camera application in the application layer receives a video recording request triggered by the user. The camera application in the application layer may interact with the camera framework in the framework layer to send the video recording request to the camera framework. The camera framework sends the video recording request to the camera service in the system library. The camera service in the system library sends the video recording request to the video pipeline mode component of the hardware abstraction layer. The video pipeline mode component of the hardware abstraction layer sends video stream data of the video recording to the MM node. The MM node determines a magic moment MM based on the recorded video stream, calls the camera driver to take a photo when the magic moment MM is determined, and sends the photographing data to the photo pipeline mode component for processing. The MM node may alternatively transmit time information of the magic moment MM (or a time location of the MM in the video) and a type of the magic moment or semantic description of the magic moment (LV0-LV3 information corresponding to the magic moment, for example, information such as a look back, a smile, and a jump) to the MM tag module. The MM tag module may report the time information of the magic moment MM and the type of the magic moment to the video pipeline in real time by using a tag of the magic moment as metadata (meta) and using a clip as a unit. The time information of the magic moment MM and the type of the magic moment are transmitted to the camera service of the system library through the video pipeline. Further, the camera service transmits the time information of the magic moment MM and the type of the magic moment to the camera framework of the framework layer, and the camera framework sends the time information of the magic moment MM and the type of the magic moment to the Video Tag module of the application layer. When the MM node identifies a magic moment MM and triggers automatic photographing, the photo pipeline mode component may process photo data of the magic moment MM and output a "one record for multiple gains" JPEG queue (that is, JPEG data of a photo of the magic moment MM). Specifically, a RAW queue in the photo pipeline mode component is used to send RAW data to the RAW domain photographing algorithm for processing. Data output by the RAW domain photographing algorithm is sent to the BPS module. The BPS module is configured to convert the RAW data into Bayer data. The Bayer data processed by the BPS module enters the IPE module. The IPE module is configured to further process the Bayer data to improve definition, texture details, a tone and a color, sharpening, and the like of imaging. Data processed by the IPE module is sent to the stylization module. The stylization module is configured to render an image (for example, render an image as an art-style picture). Image data processed by the stylization module is sent to the JPEG encoder. The JPEG encoder is configured to process the image data obtained from the stylization module to obtain JPEG data. The "one record for multiple gains" JPEG queue of the hardware abstraction layer may call back the JPEG data to the magic moment MM module of the application layer through the private photographing path. The magic moment MM module of the application layer may transmit the "one record for multiple gains" JPEG queue to the "one record for multiple gains" JPEG module of the application layer. The magic moment MM module of the application layer may further register the MM with the private photographing path. The "one record for multiple gains" JPEG module may generate a JPEG, that is, a photo of the magic moment MM, based on the JPEG data. In addition, the video pipeline mode component in the hardware abstraction layer may transmit the recorded video data to the MP4 module. The MP4 module is configured to output a recorded original video. The recorded original video may be associated with the "one record for multiple gains" JPEG in the application layer by using a video recording identifier in the video recording request.

For example, the gallery application in the application layer receives a user-triggered viewing operation. The viewing operation is used to view a JPEG image of "one record for multiple gains". The gallery application displays the JPEG image of "one record for multiple gains" on the display screen by calling the display driver. For example, in the interface shown in FIG. 5(5), the user swipes the screen upwards to enter the interface shown in FIG. 5(6). The interface shown in FIG. 5(6) displays the JPEG image of "one record for multiple gains". For another example, the user taps 904 in FIG. 6(3) to view a photo of the magic moment (or the JPEG image of "one record for multiple gains").

Optionally, the manual snapshotting function is simultaneously supported during video recording. An architecture in FIG. 8A and FIG. 8B provides a related structure of the manual snapshotting function.

For example, in the video recording mode, the Capture-Flow in the application layer delivers a user-triggered manual snapshotting request to the camera framework in the framework layer. The framework layer delivers the manual snapshotting request to the video pipeline mode component of the hardware abstraction layer by using the camera service in the system library. The video pipeline mode component sends the manual snapshotting request to a manual snapshotting frame selection module. The manual snapshotting frame selection module calls the camera driver to take a photo, and sends the photographing data to the photo pipeline mode component for processing. For processing of various modules included in the photo pipeline mode component, refer to the foregoing description. Details are not described herein again. The photo pipeline mode component outputs the manually snapshotted image data. The manually snapshotted image data may be fed back to the OnPictureTaken module of the application layer through the private photographing path. The OnPictureTaken module of the application layer may determine specific manually snapshotted frames based on the manually snapshotted image data, and then may obtain a manually snapshotted JPEG image based on the frames.

Figure 9:
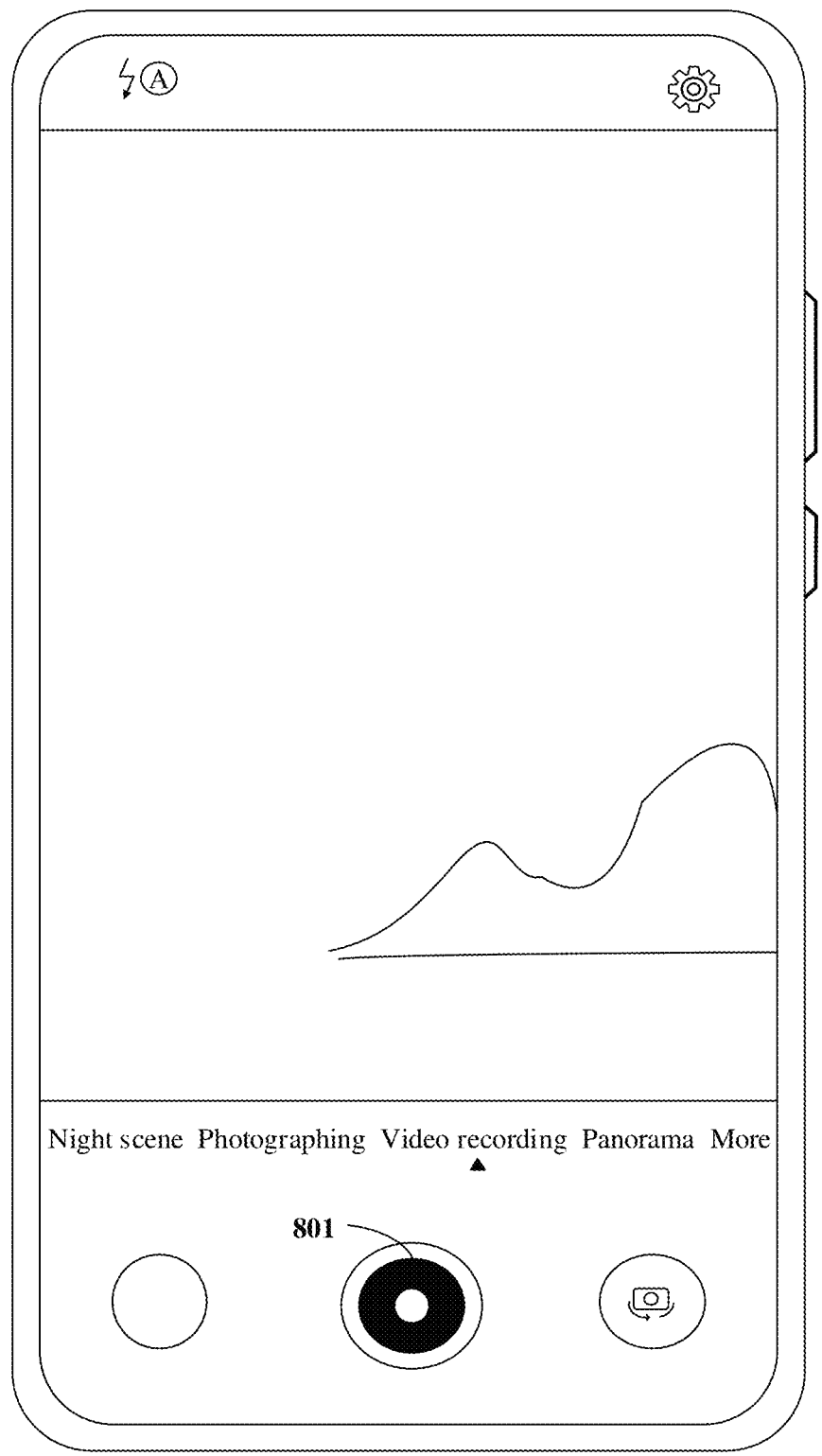
FIG. 9(1)-FIG. 12(4) are schematic diagrams of interfaces for different moments during video recording according to this application.
Figure 9:
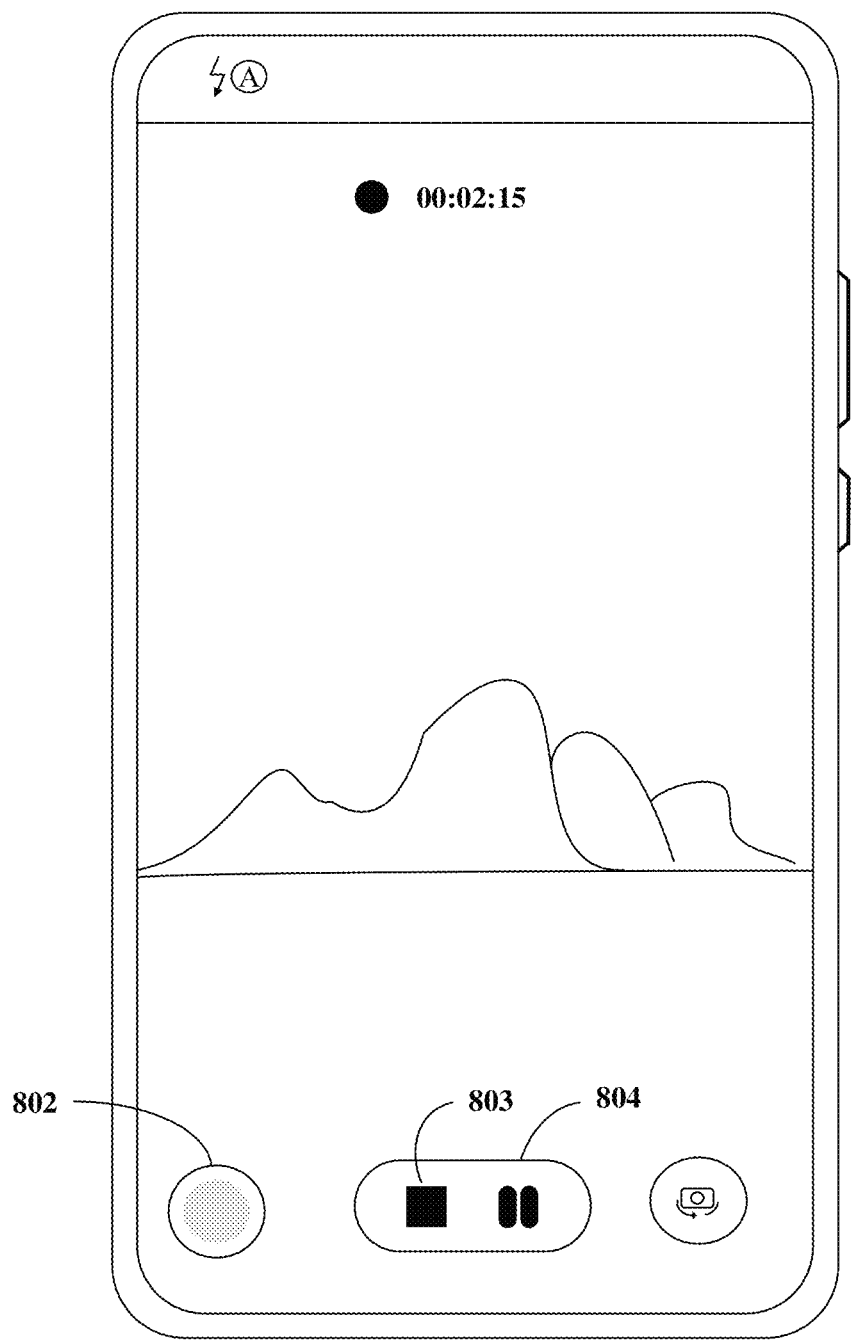
Figure 9:
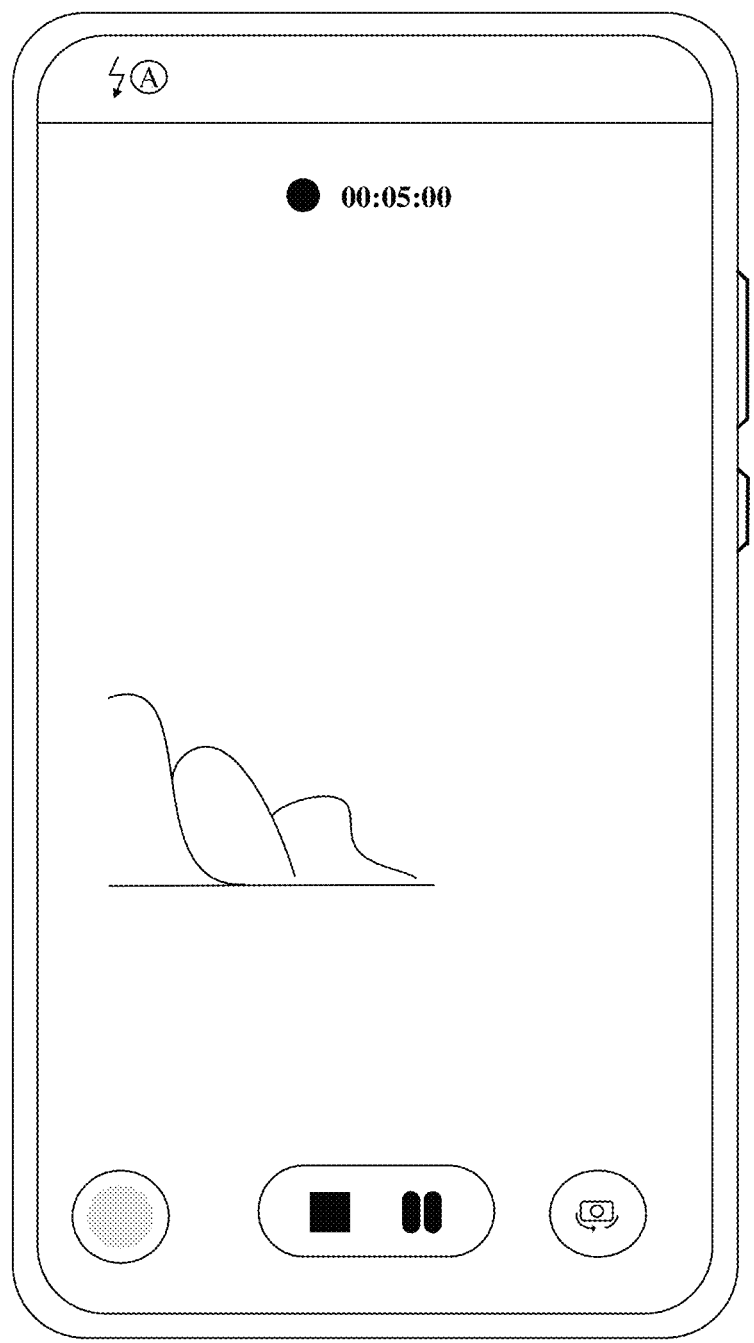

For example, in the interface shown in FIG. 9(2), the user may tap the control 802 to trigger a manual snapshotting operation.

For example, the gallery in the application layer receives a user-triggered operation for viewing a manually snapshotted image, and the gallery application displays the manually snapshotted JPEG image on the display screen by calling the display driver.

It should be understood that, the architecture shown in FIG. 8A and FIG. 8B does not constitute a limitation on embodiments of this application.

It should be further understood that, the technical solutions provided in embodiments of this application may be implemented in the electronic device 100 having the software architecture shown in FIG. 8A and FIG. 8B.

The MM node in FIG. 8A and FIG. 8B may determine the magic moment MM based on the recorded video stream. In a possible implementation, that the MM node determines the magic moment MM based on the recorded video stream includes: obtaining level information of a plurality of granularities based on the video stream; and determining a magic moment MM based on the level information of the plurality of granularities. The level information of the plurality of granularities includes first level information, second level information, and third level information, a granularity of the first level information is greater than a granularity of the second level information, and the granularity of the second level information is greater than a granularity of the third level information. The first level information is used to represent a theme or scene of the video, the second level information is used to represent a scene change of the video, and the third level information is used to represent a magic moment.

Figure 11:
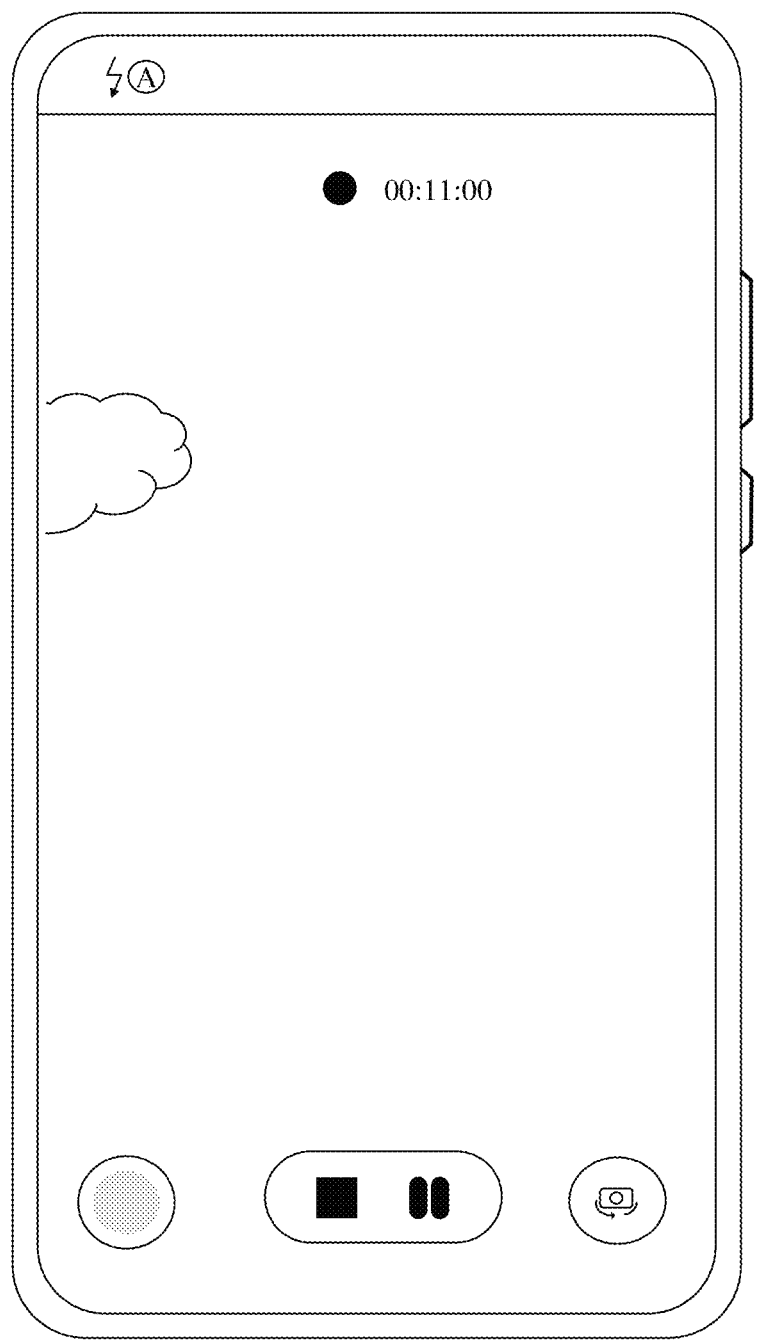
Figure 11:
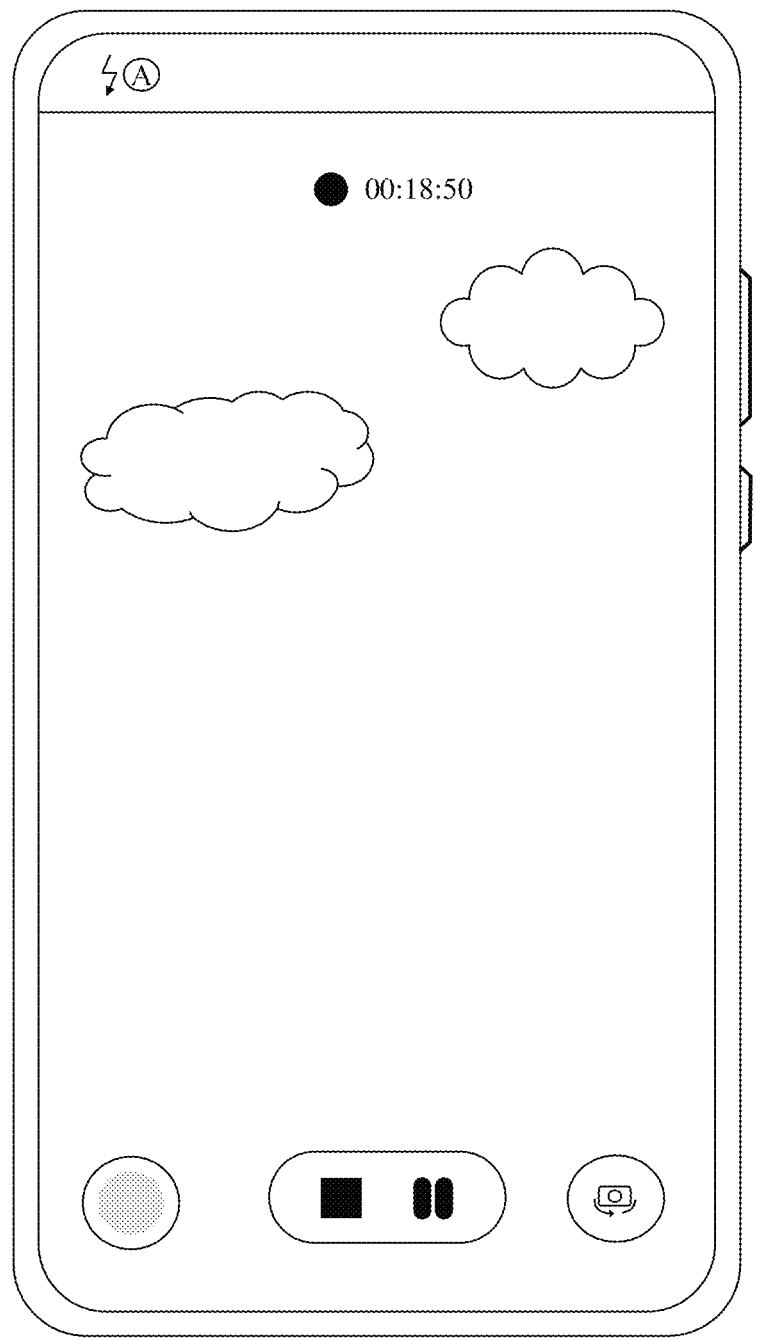
Figure 11:
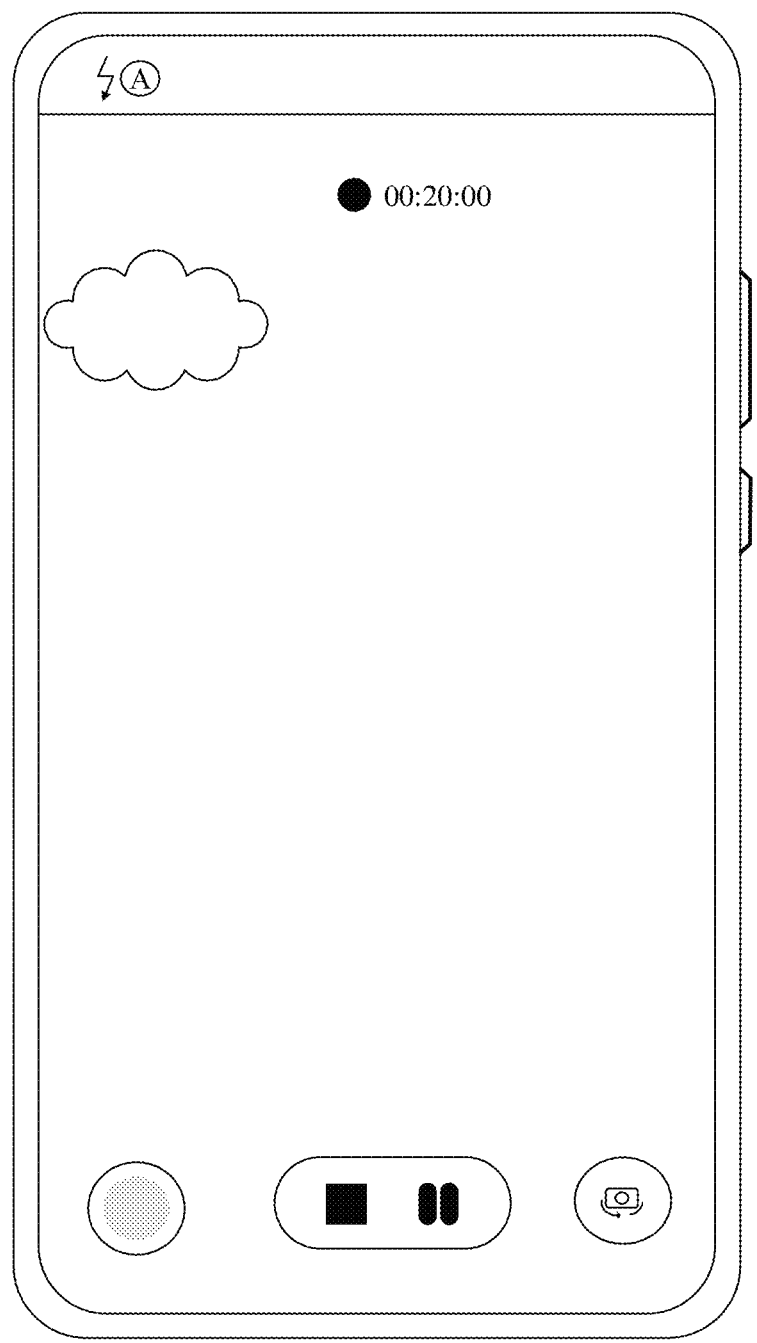
Figure 12:
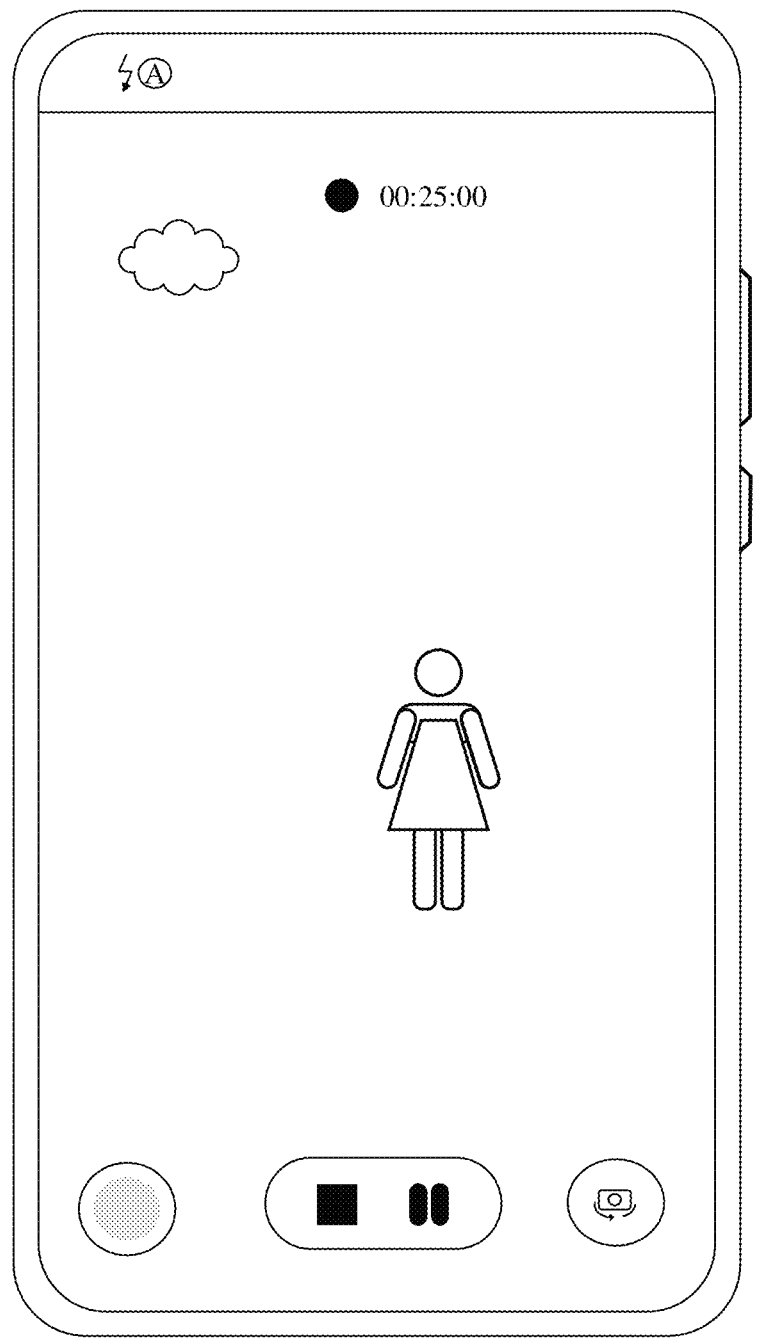
Figure 12:
Figure 12:
Figure 12:
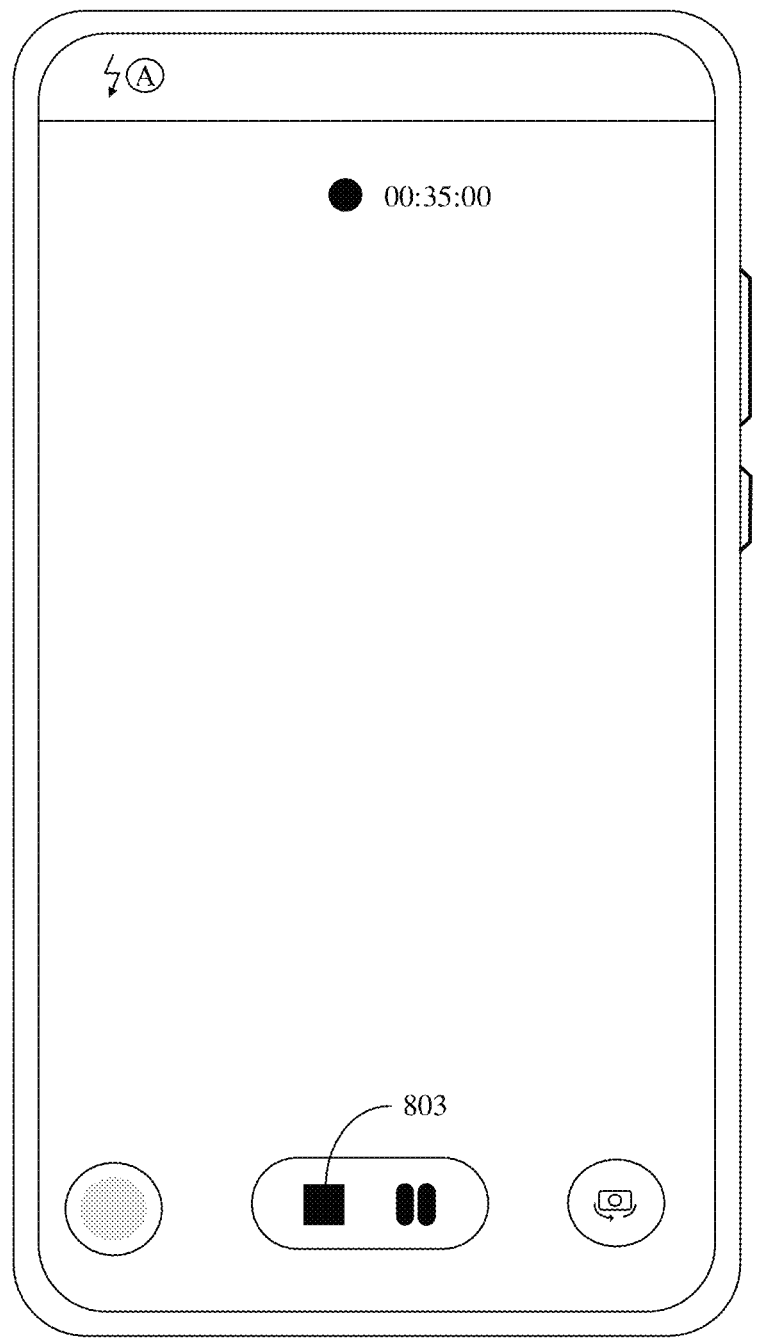
Figure 13:
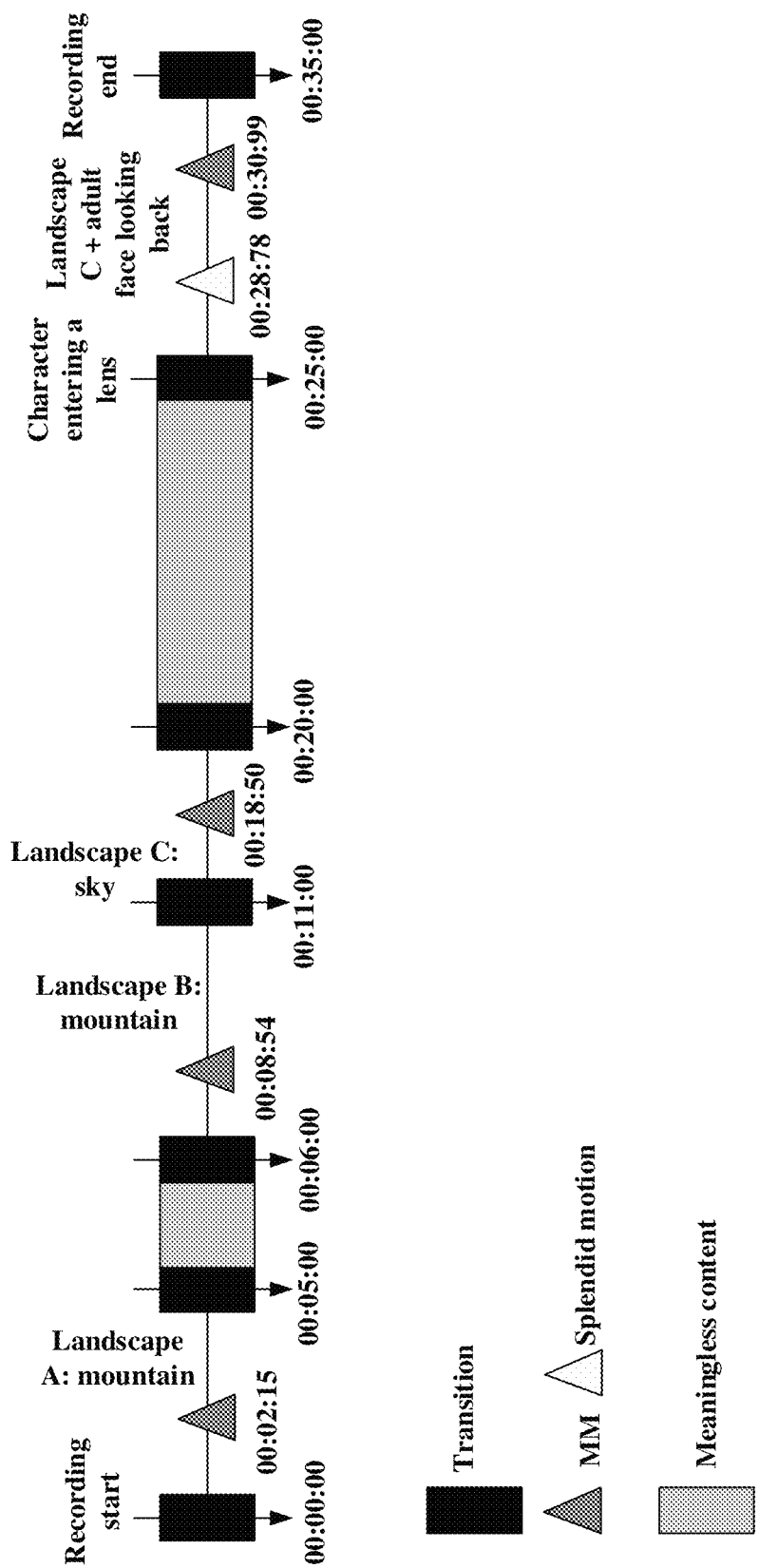
FIG. 13 is a schematic diagram of timestamps related to interfaces for different moments during video recording according to this application.

For ease of understanding, the following describes a process of obtaining a magic moment MM during video recording with reference to FIG. 9 to FIG. 13. Assuming that a shooting object is a mountain, the user moves the mobile phone during video recording to record different pictures. FIG. 9 to FIG. 12 are schematic diagrams of interfaces for different moments during video recording by the user. FIG. 13 is a schematic diagram of timestamps for interfaces shown in FIG. 9 to FIG. 12.

In the interface shown in FIG. 9(1), the user taps the control 801 to start a video recording mode. Herein, the mobile phone has enabled the "one record for multiple gains" function. For a manner of enabling the "one record for multiple gains" function, refer to the foregoing descriptions of FIG. 2 to FIG. 4. Details are not described herein again. A start time of video recording is 00 minutes 00 seconds 00 milliseconds (denoted as 00:00:00).

With respect to the interface shown in FIG. 9(2), after the video recording starts, the interface includes a photographing control 802, a stop control 803, and a pause control 804. If the user taps the stop control 803, the recording may end. If the user taps the control 802, manual snapshotting may be performed during video recording. If the user taps the pause control 804, the recording may pause. A recorded picture at the moment 00:02:15 is shown in FIG. 9(2). At this time, the picture presents a complete view of a mountain, and picture content is the mountain (denoted as mountain A). The user continues to move the mobile phone with hands to obtain a picture at the moment 00:05:00, as shown in FIG. 9(3). Picture content displayed in the interface is a part of the mountain.

For example, the MM node detects a video stream from the moment 00:00:00 to the moment 00:05:00, and can identify that a semantic scene or category of a video clip from the moment 00:00:00 to the moment 00:05:00 is a mountain. For example, the MM node can identify that the scene of the video clip is mountain A. Further, the MM node identifies that from the moment 00:00:00 to the moment 00:05:00, a picture at the moment 00:02:15 presents a complete view of mountain A. The MM node determines basic picture quality, whether composition is beautiful, and other factors of the picture at the moment 00:02:15, and learns that a score of the picture frame at this moment is 65, and determines this moment as the first MM.

Figure 10:
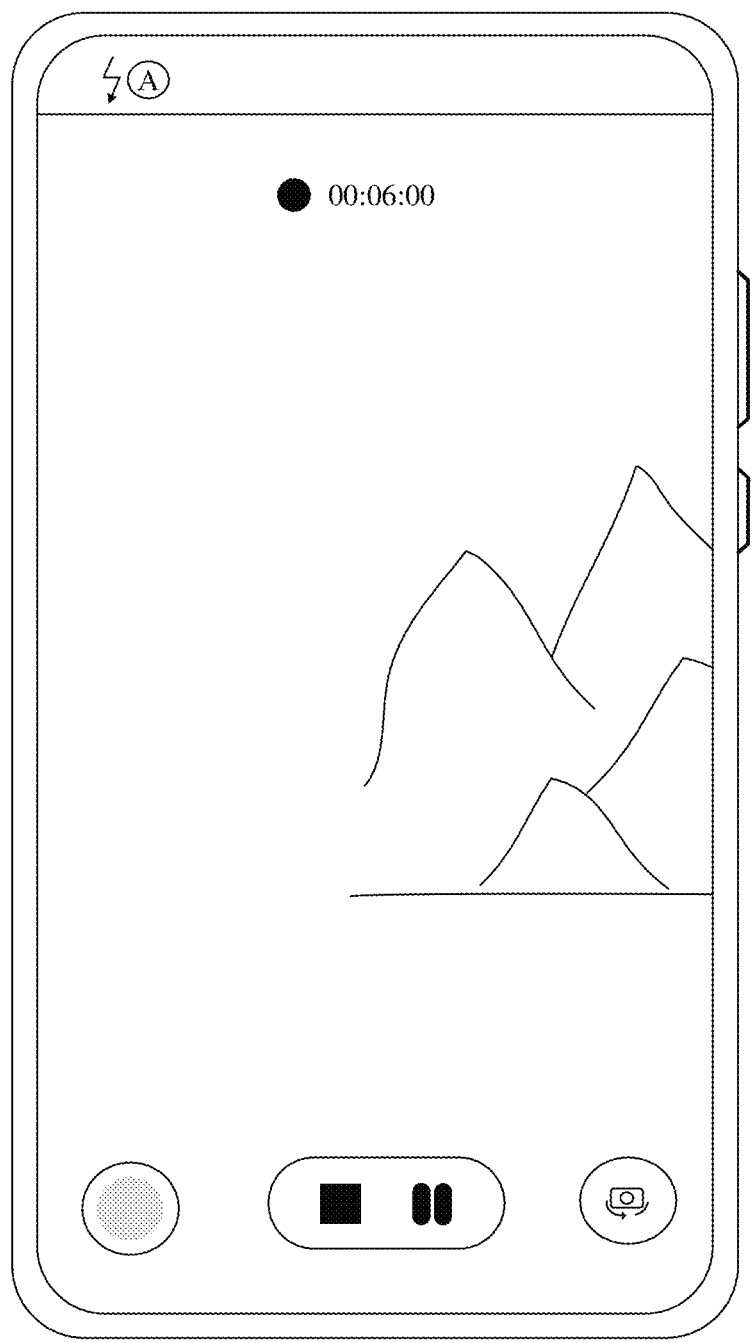
Figure 10:
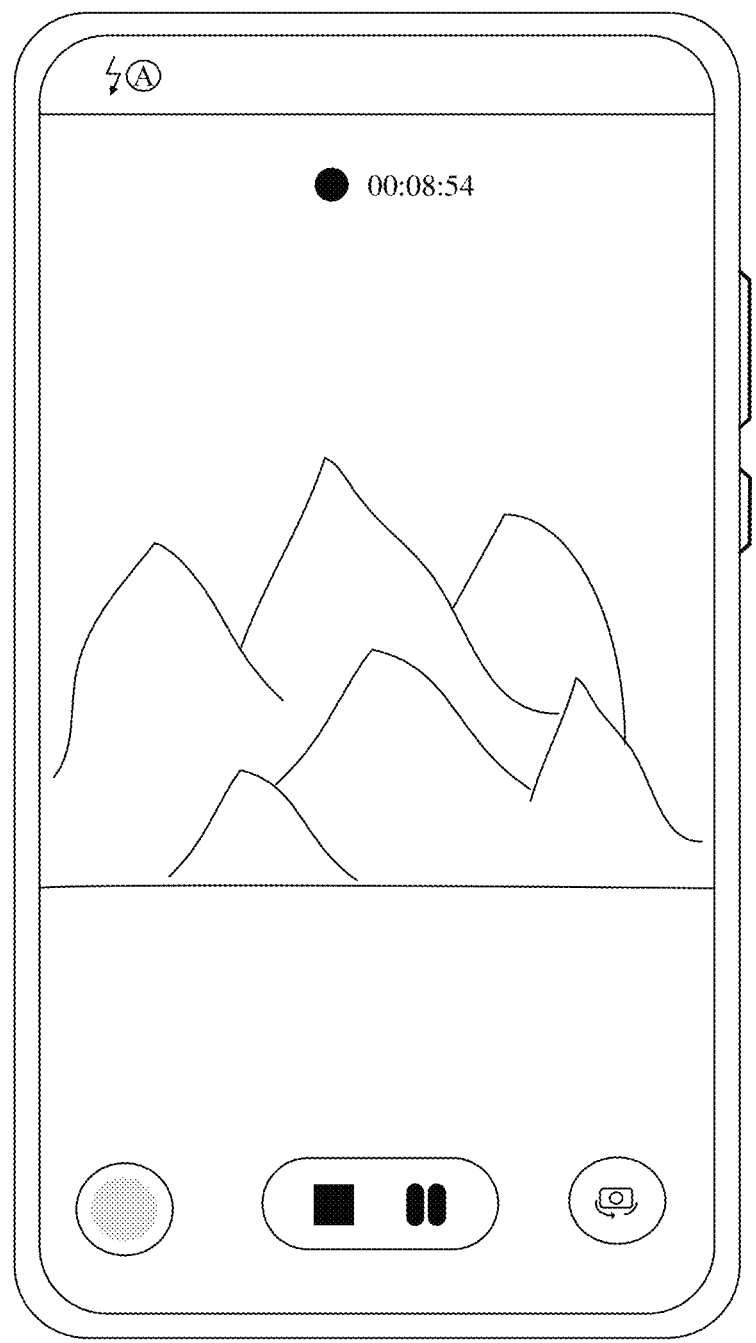

During recording of the moment 00:05:00 to the moment 00:06:00, a lens is quickly moved by 1 second. A picture at the moment 00:06:00 is shown in FIG. 10(1), and picture content is a part of another mountain. The picture at the moment 00:05:00 is different from the picture at the moment 00:06:00. The MM node detects a video stream from the moment 00:05:00 to the moment 00:06:00, and it may be considered that transition (transition refers to a scene change) occurs once at the moment 00:06:00, and a type of the transition is a fast moving shot. Therefore, when a selected short video is clipped at the back end, content from the moment 00:05:00 to the moment 00:06:00 is discarded.

The user continues to move the mobile phone with hands to shoot another mountain. For example, a picture at the moment 00:08:54 is shown in FIG. 10(2). At this time, the picture presents a complete view of the mountain, and picture content is the mountain (denoted as mountain B). A picture at the moment 00:11:00 is shown in FIG. 11(1), and picture content is sky. From the interface shown in FIG. 10(1), the interface shown in FIG. 10(2), and the interface shown in FIG. 11(1), it can be learned that at the moment 00:11:00, the picture content is changed, and therefore it is considered that transition occurs once at the moment 00:11:00. The MM node detects a video stream from the moment 00:06:00 to the moment 00:11:00, and learns that the scene changes at the moment 00:11:00. Further, the MM node detects an MM of the video stream from the moment 00:06:00 to the moment 00:11:00, and learns that the second MM is the moment 00:08:54 and has a score of 79.

After shooting of the mountain is completed, the user moves the mobile phone in order to shoot the sky. For example, a picture at the moment 00:18:50 is shown in FIG. 11(2), and picture content is sky. A picture at the moment 00:20:00 is shown in FIG. 11(3), and picture content is sky. The MM node detects a video stream from 00:11:00 to 00:20:00, and can identify that a scene category of the video clip is sky. Further, the MM node detects an MM from 00:11:00 to 00:20:00, and can learn that the third MM is the moment 00:18:50 and has a score of 70.

After shooting of the sky is completed, the user quickly moves the mobile phone with hands in order to shoot a portrait. For example, from the moment 00:20:00 to the moment 00:25:00, a lens is quickly moved by 5 seconds. A picture at the moment 00:25:00 is shown in FIG. 12(1). From the interface shown in FIG. 12(1), it can be learned that a character enters the lens at the moment 00:25:00. The picture at the moment 00:20:00 is different from the picture at the moment 00:25:00. The MM node detects a video stream from the moment 00:20:00 to the moment 00:25:00, and learns that the scene changes at the moment 00:25:00 and transition occurs once. A type of the transition is a fast moving shot. Therefore, when a selected short video is clipped at the back end, content from 00:20:00 to 00:25:00 is discarded.

A picture at the moment 00:28:78 is shown in FIG. 12(2), and the character looks back at the moment 00:28:78. A picture at the moment 00:30:99 is shown in FIG. 12(3), and the character looks back another time at the moment 00:30:99. As shown in FIG. 12(4), the user may tap the control 803 at the moment 00:35:00 to end the recording.

From the moment 00:25:00 to the moment 00:35:00, the MM node detects that the scene category is a character. Further, the MM node detects an MM of the video stream from the moment 00:25:00 to the moment 00:35:00, and learns that two magic moments are respectively 00:28:78 and 00:30:99. In addition, the MM node respectively scores the pictures of the two moments with reference to the following factors: basic picture quality, a character, and a character action, and learns that scores of the two magic moments are 95 and 70, respectively. Based on the foregoing description, the MM node determines that the fourth MM is the moment 00:28:78 and the fifth MM is the moment 00:30:99.

In FIG. 9 to FIG. 12, the five MMs obtained are the moment 00:02:15, the moment 00:08:54, the moment 00:18:50, the moment 00:28:78, and the moment 00:30:99, respectively. Based on time locations of the plurality of MMs, a wonderful short video may be generated. The wonderful short video includes image frames corresponding to these magic moments MMs, and transitions are included between the frames. The wonderful short video further includes image frames in the vicinity of these frames, for example, for the moment 00:25:00, the wonderful short video further includes image frames of 00:24:58-00:25:02 in addition to image frames of 00:25:00.

In other words, a time axis shown in FIG. 13 is used as an example. From the start of recording (00:00:00) to the end of recording (00:35:00), the MM node detects information about the following plurality of clips based on the video stream:

Clip 1: The start time is 00:00:00, the end time is 00:05:00, the category of the scene is landscape (for example, the scene shown in FIG. 9 is actually landscape A: mountain), the magic moment MM of the scene is 00:02:15, the score of the MM is 65, and the transition type of the start frame is start.

Clip 2: The start time is 00:05:00, the end time is 00:06:00, the category of the scene is dynamic rhythm, there is no MM in the scene, and the transition type of the start frame is fast moving shot. Therefore, it is recommended that the content from 00:05:00 to 00:06:00 should be discarded from the selected video.

Clip 3: The start time is 00:06:00, the end time is 00:11:00, the category of the scene is landscape (for example, the scene shown in FIG. 10 is actually landscape B: mountain), the MM of the scene is 00:08:54, the score of the MM is 79, and the transition type of the start frame is content change.

Clip 4: The start time is 00:11:00, the end time is 00:20:00, the category of the scene is sky (for example, the scene shown in FIG. 11 is actually landscape C: sky), the MM of the scene is 00:18:50, the score of the MM is 70, and the transition type of the start frame is content change.

Clip 5: The start time is 00:20:00, the end time is 00:25:00, the category of the scene is dynamic rhythm, there is no MM in the scene, and the transition type of the start frame is fast moving shot. Therefore, it is recommended that the content from 00:20:00 to 00:25:00 should be discarded from the selected video.

Clip 6: The start time is 00:25:00 (at this timestamp, it is detected that a character enters the lens), the end time is 00:35:00, the category of the scene is character, the MMs of the scene are 00:28:78 (for example, as shown in FIG. 12(2), a look-back action is detected at this timestamp) and 00:30:99 (for example, as shown in FIG. 12(3), a look-back action is detected at this timestamp), the scores of the two MMs are respectively 95 and 70, and the transition type of the start frame is content change.

It should be noted that, the foregoing six clips may be considered that the recorded original video is divided into six video clips, or the original video is divided into six video clips based on the identified semantic information (which may be denoted as LV1 information). Based on each video clip obtained through division, information about occurrence of transition (that is, LV2 information) may be further identified. Then, information about the magic moment (that is, LV3 information) may be detected in each video clip, so as to determine the magic moment MM. In addition, after the entire video recording is completed, the theme or style of the entire video, that is, the LV0 information, may be determined based on the original video.

In addition, when a total quantity of MMs of the plurality of video clips exceeds a limit of a quantity of photos of magic moments that can be finally presented, photos of MMs with higher scores may be preferentially retained. For example, it is assumed that the recorded video is divided into four video clips, and the quantity of photos of magic moments MMs is limited to 4. It is learned through analysis that, the first video clip includes two MMs, and the second video clip to the fourth video clip each includes one MM, that is, five MMs in total are determined. In this case, scores of the two MMs in the first video clip need to be compared, and the MM with a higher score in the first video clip is retained. In addition, to ensure that at least one MM needs to be output for each video clip, it is further necessary to use one MM included in each of the second video clip to the fourth video clip as a finally output photo of the magic moment, that is, four photos of magic moments are finally output.

In the example in FIG. 13, five photos of MMs can be obtained. In addition, a 15-second selected video may be further generated based on the foregoing five MMs. When the 15-second selected short video is generated based on the foregoing five MMs, it is possible to determine, based on time locations of the MMs in the complete video and a location relationship of transition between previous and next scenes, how many seconds are to be actually cropped. For example, a time of an MM is used as a center point, extension is performed toward both sides, and a timestamp at which transition occurs is bypassed. Such an operation is performed for each MM until video duration meets preset duration (for example, 15 seconds), so as to obtain a selected video with the preset duration.

It may be understood that, the examples in FIG. 9 to FIG. 13 are merely for ease of understanding by a person skilled in the art, and do not constitute a limitation on the protection scope of embodiments of this application.

Figure 14:
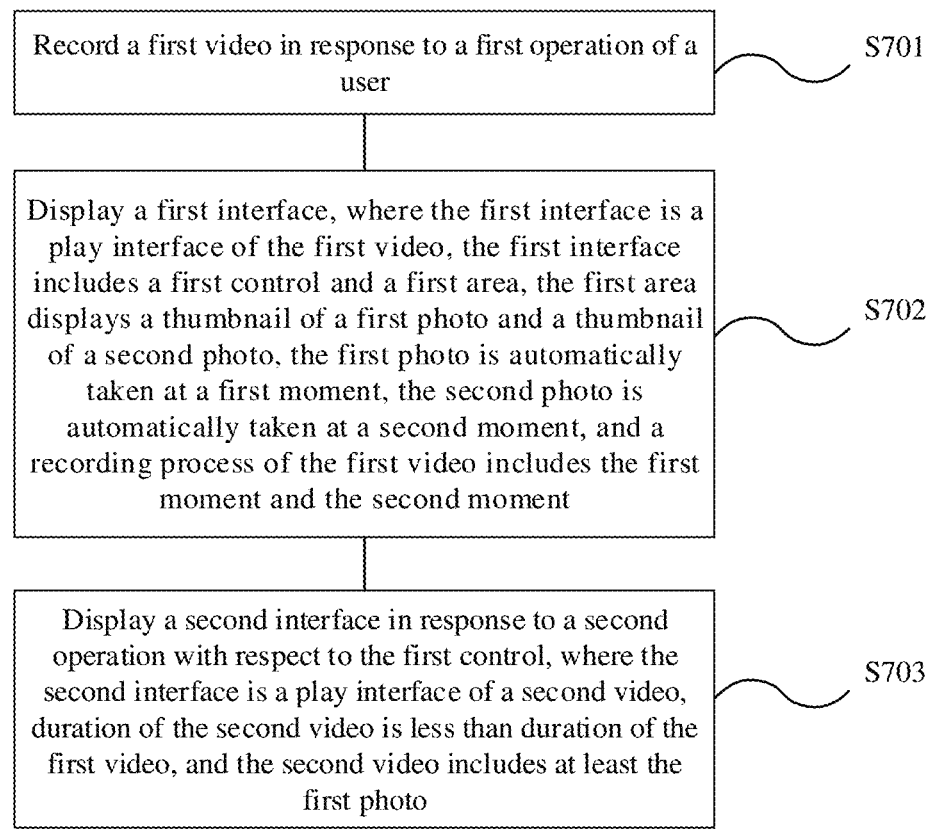
FIG. 14 is a schematic flowchart of a video processing method according to an embodiment of this application.

FIG. 14 is a schematic flowchart of a video processing method according to an embodiment of this application. As shown in FIG. 14, the method includes the following steps:

S701: Record a first video in response to a first operation of a user.

The first operation may be a recording operation. For example, in the interface shown in FIG. 9(1), the first operation may be an operation of the user tapping a video recording control 801, and an electronic device starts the video recording in response to the operation of the user tapping the video recording control 801.

The first video is an original video recorded by the user. For example, the first video is a video 302 (with duration of 16 minutes and 15 seconds) in FIG. 5(2). For another example, the first video is a video (with duration of 56 seconds) being played in the interface shown in FIG. 6(4).

S702: Display a first interface, where the first interface is a play interface of the first video, the first interface includes a first control and a first area, the first area displays a thumbnail of a first photo and a thumbnail of a second photo, the first photo is automatically taken at a first moment, the second photo is automatically taken at a second moment, and a recording process of the first video includes the first moment and the second moment.

The first photo and the second photo may be understood as photos of magic moments. It should be understood that, the first photo and the second photo are used herein as examples for description, and are not intended to limit a quantity of photos of magic moments to only two. In fact, there may be a plurality of photos of magic moments. This is not limited in embodiments of this application.

The first moment and the second moment are magic moments identified during the video recording.

For example, the first moment is the moment 00:02:15 in the interface shown in FIG. 9(2), and the first photo is a picture corresponding to the moment 00:02:15. For another example, the second moment is the moment 00:08:54 in the interface shown in FIG. 10(2), and the second photo is a picture corresponding to the moment 00:08:54.

For another example, the first moment is the moment 00:18:50 in the interface shown in FIG. 11(2), and the first photo is a picture corresponding to the moment 00:18:50. For another example, the second moment is the moment 00:28:78 in the interface shown in FIG. 12(2), and the second photo is a picture corresponding to the moment 00:28:78.

Optionally, the first interface further includes a playing progress bar, where the playing progress bar is used to display playing progress of the first video.

Illustration in FIG. 6 is used as an example. The first interface is the interface shown in FIG. 6(4). The first control is 906 in FIG. 6(4) and the first area is 904. A thumbnail of the first photo and a thumbnail of the second photo may be displayed in 904. The playing progress bar is 907 in FIG. 6(4).

For another example, the first interface is the interface shown in FIG. 7(1). The first control is 906 in FIG. 7(1) and the first area is 904.

Optionally, resolution of the first photo is higher than resolution of an image captured from the first video. With respect to the difference in image resolution, related description is provided in FIG. 2(4) in embodiments of this application, and details are not described herein again.

S703: Display a second interface in response to a second operation with respect to the first control, where the second interface is a play interface of a second video, duration of the second video is less than duration of the first video, and the second video includes at least the first photo.

The second video may be understood as a wonderful short video of the first video. The composition manner of the wonderful short video is mentioned in the foregoing description. For related description, refer to the foregoing description. Details are not described herein again.

For example, the second interface is the interface shown in FIG. 6(5). The second video is the 15-second video shown in FIG. 6(5). The 15-second video includes at least one photo in 904.

It may be understood that, the second video may include photos of some magic moments, or may include photos of all magic moments. This is not specifically limited in embodiments of this application.

Optionally, the second video further includes the second photo.

In a possible implementation, the method further includes:
  displaying a third interface in response to a third operation of the user, where the third interface is an interface of a gallery application, and the third interface includes a second control; and
  the displaying a first interface includes displaying the first interface in response to a fourth operation with respect to the second control.

The third operation may be an operation of the user viewing the first video in the gallery application. For example, the third interface may be the interface shown in FIG. 6(3). The second control is a play control. For example, the second control may be 915 shown in FIG. 6(3).

In a possible implementation, the third interface further includes a first prompt window, and the first prompt window is used to prompt the user that the first photo and the second photo have been generated.

In other words, the user may be directed to view a photo of a magic moment at the first time of access. For example, the first prompt window may be 905 shown in FIG. 6(3).

In a possible implementation, brightness of the first prompt window and brightness of the first area are higher than brightness of an area except the first area and the first prompt window in the first interface.

Therefore, a highlighting manner may be used to draw attention of the user to the first prompt window, thereby achieving a more striking reminding effect and improving user experience.

In a possible implementation, the method further includes: stopping recording of the first video in response to a fifth operation of the user, and displaying a fourth interface, where the fourth interface includes a thumbnail previewing option; and
  the displaying a third interface in response to a third operation of the user includes:
  displaying the third interface in response to a sixth operation of the user with respect to the thumbnail previewing option.

The fifth operation is an operation of triggering stopping of the recording. For example, the fifth operation may be an operation of the user tapping the control 901 shown in FIG. 6(1). The fourth interface may be the interface shown in FIG. 6(2).

The recording completion interface may further display a thumbnail previewing option of the currently recorded video. After the user taps the thumbnail previewing option, the interface may jump to the gallery application to display the currently recorded video (in a non-play state). For example, the thumbnail previewing option may be 903 in FIG. 6(2). The sixth operation may be an operation of the user tapping 903. After the user taps 903, the interface shown in FIG. 6(3) is displayed, including the play control 915.

In a possible implementation, the fourth interface further includes a second prompt window, where the second prompt window is used to prompt the user that the first photo, the second photo, and the second video have been generated.

Certainly, if the "one record for multiple gains" function is used for the first time, the user may be guided through the prompt window in viewing content of "one record for multiple gains". For example, the second prompt window may be 902 shown in FIG. 6(2).

In a possible implementation, before recording the first video, the method further includes:
enabling the "one record for multiple gains" function in response to a seventh operation of the user.

The first video is recorded after the "one record for multiple gains" function is enabled. An implementation of enabling the "one record for multiple gains" function has been described above. For details, refer to the descriptions in FIG. 2 to FIG. 4. For example, enabling the "one record for multiple gains" function may be set by using 404 shown in FIG. 2(4).

Optionally, the application may set minimum duration of the recorded video. The recording duration is less than the minimum duration, the "one record for multiple gains" feature of the video is not called back. In a possible implementation, the duration of the first video is greater than or equal to the preset duration. For example, the preset duration is set to 15 seconds. When the recording duration of the user is less than 15 seconds, no photo of "one record for multiple gains" is called back. For example, the minimum duration of the recorded video may be set by using 405 shown in FIG. 2(4).

Optionally, the second interface further includes a music control, and the method further includes:
displaying a plurality of different music options in response to an eighth operation of the user with respect to the music control.

The user may perform a music making operation on the second video. For example, the second interface may be the interface shown in FIG. 7(2). The music control may be the music control 910 shown in FIG. 7(2).

Optionally, the second interface further includes a style control, and the method further includes:
displaying a plurality of different style options in response to a ninth operation of the user with respect to the style control.

For example, the style control may be the style control 912 shown in FIG. 7(2).

The user may add a style to the second video. The description about the style has been provided above. For related description, refer to the foregoing description. Details are not described herein again.

Optionally, a gallery application includes a first album, where the first album includes the first photo and the second photo.

Unified description is provided herein. For the first album, refer to the album for "one record for multiple gains" described above. For related description, refer to the foregoing description. Details are not described herein again.

Optionally, the first album further includes a virtual video of the second video. For a meaning of the virtual video, refer to the foregoing explanation.

Optionally, the second interface further includes a share control or a save control, and the method further includes:
generating a video file of the second video in response to a tenth operation of the user with respect to the share control or the save control; and
storing the video file in the first album.

For example, the share control is 909 shown in FIG. 7(2). The save control is 908 shown in FIG. 7(2).

Optionally, storage space occupied by the video file is larger than storage space occupied by the virtual video.

In a possible implementation, the first interface further includes a deletion option, and the method further includes:
displaying a third prompt window in response to an eleventh operation of the user with respect to the deletion option, where the third prompt window is used to prompt the user whether to delete the second video, the first photo, and the second photo.

For example, the deletion option is the deletion option shown in FIG. 6(4).

To be specific, if a request (the thirteenth operation) of the user for deleting the recorded original video is received, prompt information is displayed in the user interface to prompt the user whether to delete the image and the video (for example, the first photo, the second photo, and the second video) that are associated with the original video. Therefore, if the user wants to retain the image and the video that are associated with the original video, the user may choose to retain the image and the video that are associated with the original video. This avoids a data loss and helps improve user experience. If the user wants to delete all, the original video and the image and the video that are associated with the original video are deleted together, helping save space.

The foregoing photos of magic moments associated with the first video may be automatically retained for preset duration, such as N days, N hours, or another time unit. For example, the preset duration may be set by a factory, or may be set by the user. This is not limited. In a possible implementation, the method further includes: automatically deleting the first photo if no user operation of viewing the first photo is received after N days. It may be understood that, the first photo is merely used herein as an example for description, and the second photo may also be automatically deleted after a retention period of N days.

Optionally, the second photo is automatically deleted if no user operation of viewing the second photo is received after N days.

In a possible implementation, the second video further includes a nearby image frame of the first photo, the nearby image frame is determined based on the first time tag, the nearby image frame includes image frames corresponding to first A moments of the first time tag and image frames corresponding to last B moments of the first time tag, A is greater than or equal to 1, and B is greater than or equal to 1.

In the foregoing description of the interface in FIG. 5(6), a manner of obtaining the 15-second wonderful short video 309 has been described. A nearby image frame is described by using a magic moment in the manner of obtaining the wonderful short video 309 as an example. For example, it is assumed that the 10th second of the 5th minute is a magic moment (corresponding to the first moment), and an image frame corresponding to the 10th second of the 5th minute is a photo of the magic moment (corresponding to the first photo). In this case, an image frame corresponding to the 9th second of the 5th minute and an image frame corresponding to the 11th second of the 5th minute are so-called nearby image frames.

Optionally, an image frame corresponding to a moment at which transition occurs is removed from the second video, and the transition means that the scene changes. An example is used herein to describe a meaning of removing the image frame corresponding to the moment at which transition occurs. For example, after photos of five magic moments MMs are obtained, a second video is generated based on the photos of the five MMs. A time of each MM is used as a center point, extension is performed toward both sides, and a timestamp at which transition occurs is bypassed. Such an operation is performed for each MM until duration of the second video meets preset duration (for example, 15 seconds), so as to obtain a selected short video with the preset duration.

In a possible implementation, the first moment is determined based on a first time tag. The first time tag is determined based on first level information, second level information, and third level information, the first level information is used to represent a theme or scene of the video, the second level information is used to represent a scene change of the video, and the third level information is used to represent a magic moment.

For example, during specific implementation, the MM node may obtain level information of a plurality of granularities of the video stream in real time, so as to identify a magic moment.

In a possible embodiment, a plurality of pieces of level information of the video stream are obtained in real time during video recording, and a magic moment of the video is identified based on the plurality of pieces of level information. Photographing is automatically triggered at the magic moment of the video to obtain a photo of the magic moment (for example, a first photo is automatically taken at a first moment and a second photo is automatically taken at a second moment). The plurality of pieces of level information include first level information, second level information, and third level information. The first level information is used to represent a theme or scene of the video, the second level information is used to represent a scene change of the video, and the third level information is used to represent a magic moment.

The first level information, the second level information, and the third level information provide decision information in an order of granularities from coarse to fine, to assist the MM decision component in identifying a magic moment in a recording process.

For example, it is assumed that a level corresponding to the first level information includes LV0 and LV1, a level corresponding to the second level information is denoted as LV2, and a level corresponding to the third level information is denoted as LV3, that is, the decision information is divided into LV0, LV1, LV2, and LV3 in an order of granularities from coarse to fine.

Here, the LV0 information is used to provide a style or atmosphere tag of the entire video (for example, a child's taste, a character, the Spring Festival, Christmas, a birthday, a wedding, graduation, gourmet food, art, travel, a night scene, sports, nature, or joyful/sentimental/dynamic rhythm/ leisure). The LV1 information is used to identify a semantic scene, divide a video into several clips, and provide a category of each clip, for example, a mountain or a portrait.

For example, assuming that the level corresponding to the first level information described above includes LV0 and LV1, Table 1 provides examples of definitions of LV0 and LV1 below.

TABLE 1

| Theme category (LV0) | Semantic scene category (LV1) |
| --- | --- |
| Child's taste | Children, cats and dogs |
| Character | Character |
| Spring Festival | Spring Festival |
| Christmas | Christmas |
| Birthday | Birthday |
| Wedding | Wedding |
| Graduation | Graduation |
| Gourmet food | Gourmet food |
| Art | Calligraphy and painting |
| Travel | Beach, aircraft, and ancient building |
| Night scene | Fireworks and other night scenery |
| Motion | Motion |
| Nature | Snow scenery, plant, mountain, and river |
| Joyful/sentimental/ dynamic rhythm/leisure | Joyful, sentimental, dynamic rhythm, and leisure |

For example, it is assumed that the level corresponding to the second level information described above is denoted as LV2, and a granularity of the LV2 information is finer than that of LV0-1. The LV2 information may provide a video transition location (for example, a frame number at which transition occurs) and a transition type (character protagonist switching, fast moving shot, scene category change, or image content change caused by other situations), to avoid an excessive quantity of recommended similar scenes. The LV2 information is used to represent a video scene change (which may also be briefly referred to as transition), including but not limited to one or more of the following changes: a change in a character subject (or a protagonist), a great change in image content composition, a change in a semantic scene, and a change in image brightness or color.

With respect to a change in a character subject, when the character subject changes, it is considered that transition occurs once. The character subject may define a character with the largest proportion in an image. For example, if a character subject of the $(t-1)^{th}$ image frame is A, and a character subject of the $t^{th}$ image frame additionally includes B, but the main body is still A, it is not considered that transition occurs once. For another example, if a character subject of the $(t-1)^{th}$ image frame is A, and a character subject of the $t^{th}$ image frame is changed to B, it is considered that transition occurs once.

Figure 15:
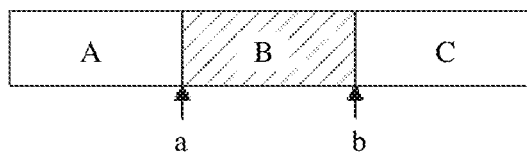
FIG. 15 is a schematic diagram of a transition frame in a case of a fast moving shot according to this application.

A great change in image content composition is considered as one transition. For example, when a camera is substantially stable, if many objects move in a recorded picture, causing a great change in the picture content, it is considered that transition occurs once. For example, when watching a racing car game, the user records a racing car screen by using a mobile phone. If a racing car passes through the screen, it may be considered that transition occurs once when the racing car passes. Fast moving shot (for example, quick shaking from A to B). For another example, during slow and smooth moving shot of the camera, the picture content generally does not have an obvious transition demarcation in this case, but a transition detection frame rate is 2 FPS. For example, when content composition of the $t^{th}$ image frame differs greatly from content composition of the $(t-16)^{th}$ image frame, it is considered that transition occurs once. For another example, during fast moving shot of the camera, the picture is blurred seriously, and a content change between frames is major, but only the entire moving shot process can be considered as one transition. As shown in FIG. 15, in intervals A to C for moving shot of the camera, assuming that B is the interval for fast moving shot, the start frame a and the end frame b of the interval B are considered as transition frames.

A change in image brightness or color is considered as one transition. For example, in a concert, the picture content changes slightly, but a color and brightness of an atmosphere lamp change. In this case, it is considered that transition occurs once.

For example, it is assumed that the level corresponding to the third level information described above is denoted as LV3, and a granularity of the LV3 information is finer than that of LV2. The LV3 information is used to determine a magic moment. The LV3 information may be divided based on the following categories: basic picture quality, subjective image evaluation, character, and action.

For example, the basic picture quality means that overall definition of an image is determined from the overall dimension of the image, for example, whether the image is out of focus, whether the motion is blurred, whether the exposure is appropriate, or whether the noise is apparent. The subjective image evaluation may be determined from the dimension of composition, for example, whether the composition is beautiful (the evaluation criteria may be based on evaluation criteria such as symmetry and trichotomy).

For example, a character may be determined from the following dimensions: whether a face is clear (only one face is determined herein), whether a character opens or closes an eye, and an expression conveying emotion (such as laughter and surprise; meaningless labels need to be removed herein, such as muscle twitching and eye corner skew).

For example, an action may be determined from the following dimensions: basketball shooting (the highest point of laying up a shot, the highest point of jumping (the highest point of a character)), ball kicking (the moment of ball kicking, such as the starting or finishing action), badminton (the playing or smashing action), jumping (the highest point of jumping), running (the leg-walking or the stagnant point), looking back (the moment of looking back, the long hair drifting (below 45 degrees)), splashing water (the brook water splashing check-in), and throwing object (the object throwing check-in photo). It should be noted that, if there is a multi-character scene in the image, the principal character (such as one character) is selected for action detection.

It should be understood that, the foregoing examples of information about LV0-LV3 are merely for illustrative description, and this application is not limited thereto.

In a possible implementation, a time tag (or a video tag) may be generated when a magic moment is identified. The time tag refers to a time location of the magic moment in the first video. For example, the first moment corresponds to the first time tag. A selected video may be generated based on time tags.

During specific implementation, the MM node in the HAL may determine a magic moment (or a magic instant) in the video recording process in real time when recording a video, and automatically trigger photographing when identifying a magic moment, to obtain an image of the magic moment.

Optionally, during video recording, a quantity of images of magic moments obtained by automatically triggering the photographing may be set or adjusted based on a requirement. For example, a maximum quantity of images of magic moments obtained may be set to 5.

Optionally, to associate the recorded video with the foregoing photos of magic moments, the video recording identifier and the time tag may be written into the JPEG information of the snapshotted image. For example, the JPEG information of the multi-frame image carries exchangeable image file format EXIF information, where the EXIF information includes the video recording identifier and information about the video tag. It may be understood that, the EXIF information may further include other JPEG data, such as standard information, thumbnails, and watermark information.

Optionally, the method further includes:
  generating a request message in response to the first operation, where the request message includes a first identifier, and
  the first photo is associated with the second video by using the first identifier.

The request message may be referred to as a video recording request. The video recording request is used to trigger the camera application to start the video recording mode. For example, in the interface shown in FIG. 9(1), the user taps the video recording control 801 to trigger the camera application to start the video recording mode.

For example, the first identifier is referred to as a video recording identifier, and the video recording identifier is UUID.

Optionally, in the gallery application, the recorded original video (the first video), the first photo, and the second photo may be associated by using the first identifier.

Optionally, in the gallery application, the recorded original video (the first video), the first photo, the second photo, and the selected short video (the second video) may be associated in the gallery application by using a database. In this way, when viewing the original video, the user may choose to view a photo of a magic moment and a selected short video that are associated with the first video.

When the user is viewing the recorded original video, if a viewing operation is triggered, a photo of a magic moment or a selected short video associated with the video may be viewed. For example, as shown in FIG. 5(5), the viewing operation is swiping the screen upwards. The interface presents an identifier 306, prompting the user that a "one record for multiple gains" interface associated with the video 302 is to be presented. When the user completes the operation of swiping upwards, after the finger leaves the screen, the mobile phone displays an interface shown in FIG. 5(6). For another example, the viewing operation may be tapping 906 shown in FIG. 6(4) to enter the interface shown in FIG. 6(5).

It should be noted that, the time tag refers to the location of the magic moment in the video, and may be specifically a timestamp corresponding to the magic moment. The time tag may be used to generate the selected video. It may be understood that, after the end of the video recording, a playing policy may be automatically generated based on the tag location in the video. The playing policy may be used to generate a selected video (or a wonderful short video). In addition, when the user needs to perform an operation on the selected video (for example, the operation may be sharing the selected video), the video tag is used to generate the selected video, rather than generating the selected video in real time during video recording, so that storage space can be saved.

Figure 16:
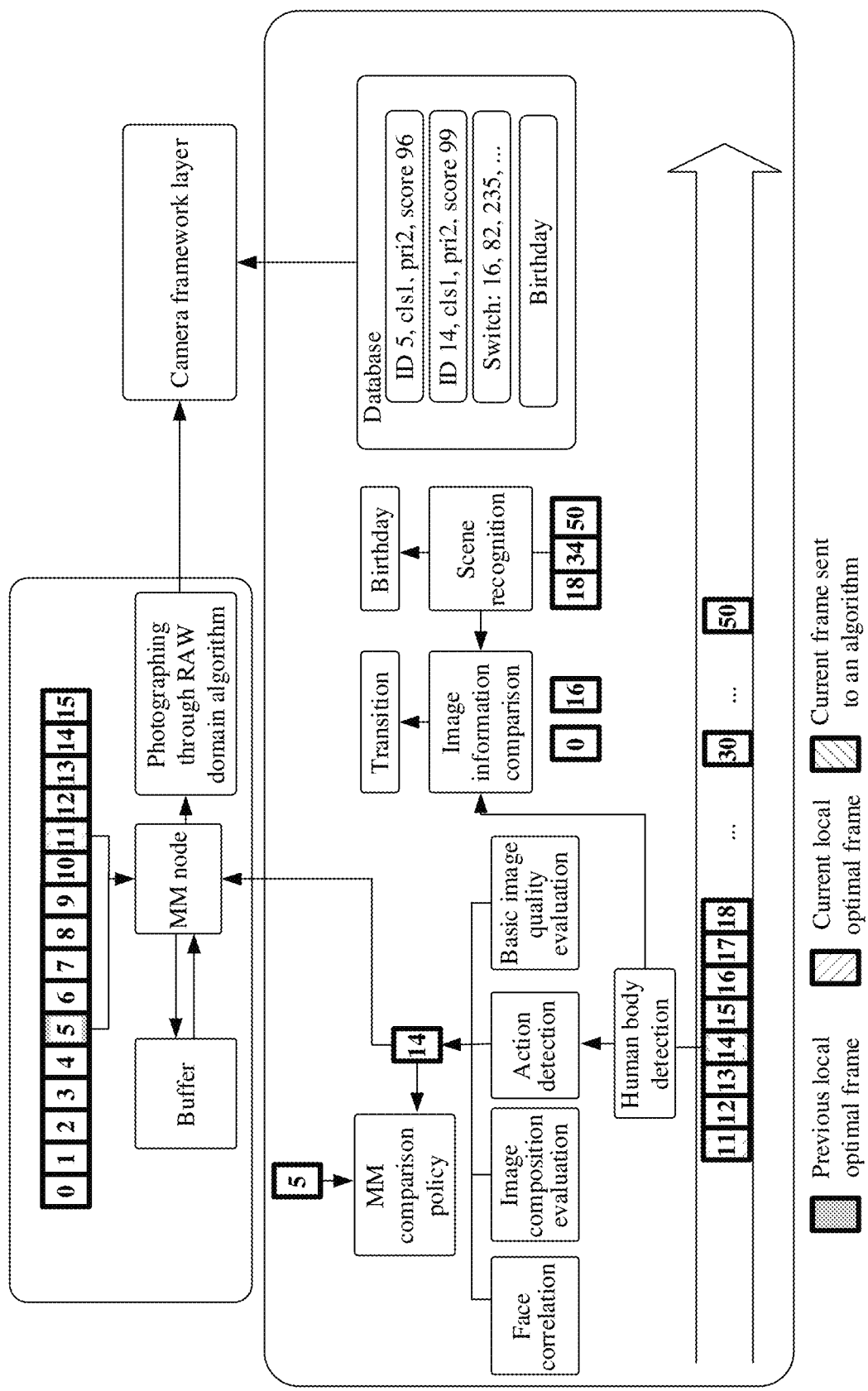
FIG. 16 is a schematic diagram of an example of operation of an MM node according to this application.

FIG. 16 is an example diagram of operation of an example MM node (herein, the MM node may be an MM node in the hardware abstraction layer in FIG. 8A and FIG. 8B) according to this application. As shown in FIG. 16, a cache includes RAW data of 16 timestamps. The MM node is currently comparing image frames of a timestamp 5 and a timestamp 14. Due to a delay in an algorithm, the current local optimal frame obtained in the current frame (a timestamp 14) of the algorithm is actually an image frame of a timestamp 11. The MM node can identify the scene as a birthday by analyzing LV1 information of timestamps (such as a timestamp 18, a timestamp 34, and a timestamp 50). By analyzing and comparing image information (LV2 information) of a timestamp 0 and a timestamp 16, the MM node can learn that transition has occurred at the timestamp 16. The MM node analyzes the LV3 information (for example, the LV3 information includes the following dimensions: face correlation, image composition evaluation, action detection, and basic image quality evaluation) of the current frame (the timestamp 14) sent to the algorithm, and compares a score of the image frame corresponding to the timestamp 14 with a score of the timestamp 5 (a previous local optimal frame) by using the MM comparison policy. In addition, the MM node may temporarily store the RAW data in the buffer when obtaining the RAW data of the image frame. When identifying a data frame with a high score, the MM node sends the RAW data temporarily stored in the buffer to the photographing path, and triggers the RAW domain algorithm to perform photographing. The MM node may feed back the database (the database includes decision information of different granularities shown in FIG. 16, for example, information about the timestamp 5: ID5, cls1, pri2, score 96; information about the timestamp 14: ID14, cls1, pri2, score 99; transition occurrence timestamps: 16, 82, 235, . . . ; and theme: birthday) to the camera framework layer.

It should be understood that, a working diagram in FIG. 16 is merely an example for description, and does not constitute a limitation on embodiments of this application.

In embodiments of this application, during video recording, the user can be further allowed to manually snapshot an image, so as to improve shooting experience of the user. For example, referring to the interface shown in FIG. 9(2), during video recording, the user may tap the control 802 to perform manual snapshotting.

In a possible implementation, the method further includes: receiving a photographing request during video recording, where the photographing request carries a (manual) snapshotting tag; and triggering photographing and obtaining a first image in response to the photographing request, where exchangeable image file format EXIF information corresponding to the first image includes the snapshotting tag.

During specific implementation, the HAL layer supports the manual snapshotting capability, and the first image and the corresponding EXIF information may be generated through processing of the photographing path.

It can be learned from the foregoing description that, according to the video processing method provided in this application, during video recording, the user can simultaneously obtain a high-quality photo of a magic moment and a wonderful video, greatly improving user experience.

This application further provides a computer program product. When the computer program product is executed by a processor, the method according to any method embodiment in this application is implemented.

The computer program product may be stored in a memory. After undergoing processing procedures such as preprocessing, compilation, assembly, and linking, the computer program product is finally converted into an executable target file that can be executed by the processor.

This application further provides a computer-readable storage medium. The computer-readable storage medium stores a computer program. When the computer program is executed by a computer, the method according to any method embodiment in this application is implemented. The computer program may be an advanced language program, or may be an executable target program.

The computer-readable storage medium may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), which serves as an external cache. By way of example and not limitation, many forms of RAMs are available, such as a static random access memory (static RAM, SRAM), a dynamic random access memory (dynamic RAM, DRAM), a synchronous dynamic random access memory (synchronous DRAM, SDRAM), double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for convenience and brevity of description, for a specific working process and an achieved technical effect of the foregoing described apparatus and device, refer to a corresponding process and technical effect in the foregoing method embodiments. Details are not described herein again.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division. In actual implementation, there may be another division manner. A plurality of units or components may be combined or integrated into another system. In addition, a coupling between units or a coupling between components may be a direct coupling, or may be an indirect coupling. The coupling includes an electrical, mechanical, or another form of connection.

It should be understood that, in embodiments of this application, sequence numbers of processes do not mean a sequence of execution. The sequence of execution of the processes should be determined according to functions and internal logic of the processes, and should not constitute any limitation on an implementation process of embodiments of this application.

In addition, the terms "system" and "network" in this specification are often used interchangeably in this specification. In this specification, the term "and/or" is only used to describe an association relationship between associated objects, and indicates that three relationships may exist. For example, A and/or B may indicate the following: Only A exists, both A and B exist, and only B exists. In addition, the character "/" in this specification usually indicates an "or" relationship between the associated objects.

In conclusion, the foregoing descriptions are merely example embodiments of the technical solutions of this application, and are not intended to limit the protection scope of this application. Any modification, equivalent replacement, or improvement made without departing from the spirit and principle of this application should fall within the protection scope of this application.

What is claimed is:

1. A video processing method, comprising:
    recording a first video in response to a first operation of a user;
    displaying a first interface, wherein the first interface is a play interface of the first video, the first interface comprises a first control and a first area, the first area displays a thumbnail of a first photo and a thumbnail of a second photo, the first photo is automatically taken at a first moment, the second photo is automatically taken at a second moment, and a recording process of the first video comprises the first moment and the second moment; and
    displaying a second interface in response to a second operation with respect to the first control, wherein the second interface is a play interface of a second video, a duration of the second video is less than a duration of the first video, and the second video comprises at least the first photo;
    displaying a third interface in response to a third operation of the user, wherein the third interface is an interface of a gallery application, and the third interface comprises a second control, and the displaying a first interface comprises displaying the first interface in response to a fourth operation with respect to the second control;
    wherein the third interface further comprises a first prompt window, and the first prompt window is used to prompt the user that the first photo and the second photo have been generated; and
    wherein brightness of the first prompt window and brightness of the first area are higher than brightness of an area except the first area and the first prompt window in the first interface.

2. The method according to claim 1, wherein the method further comprises:
    stopping recording of the first video in response to a fifth operation of the user, and displaying a fourth interface, wherein the fourth interface comprises a thumbnail previewing option; and
    the displaying a third interface in response to a third operation of the user comprises:
    displaying the third interface in response to a sixth operation of the user with respect to the thumbnail previewing option.

3. The method according to claim 2, wherein the fourth interface further comprises a second prompt window, and the second prompt window is used to prompt the user that the first photo, the second photo, and the second video have been generated.

4. The method according to claim 1, wherein the first interface further comprises a playing progress bar, and the playing progress bar is used to display playing progress of the first video.

5. The method according to claim 1, wherein the second interface further comprises a music control, and the method further comprises:
    displaying a plurality of different music options in response to an eighth operation of the user with respect to the music control.

6. The method according to claim 1, wherein the second interface further comprises a style control, and the method further comprises:
    displaying a plurality of different style options in response to a ninth operation of the user with respect to the style control.

7. The method according to claim 1, wherein a gallery application comprises a first album, and the first album comprises the first photo and the second photo.

8. The method according to claim 7, wherein the first album further comprises a virtual video of the second video.

9. The method according to claim 8, wherein the second interface further comprises a share control or a save control, and the method further comprises:
    generating a video file of the second video in response to a tenth operation of the user with respect to the share control or the save control; and
    storing the video file in the first album.

10. The method according to claim 9, wherein storage space occupied by the video file is larger than storage space occupied by the virtual video.

11. The method according to claim 1, wherein the method further comprises:
    automatically deleting the first photo if no user operation of viewing the first photo is received after N days.

12. The method according to claim 1, wherein the second video further comprises the second photo.

13. The method according to claim 1, wherein the first moment is determined based on a first time tag.

14. A video processing method comprising:
    recording a first video in response to a first operation of a user;
    displaying a first interface, wherein the first interface is a play interface of the first video, the first interface comprises a first control and a first area, the first area displays a thumbnail of a first photo and a thumbnail of a second photo, the first photo is automatically taken at a first moment, the second photo is automatically taken at a second moment, and a recording process of the first video comprises the first moment and the second moment; and
    displaying a second interface in response to a second operation with respect to the first control, wherein the second interface is a play interface of a second video, a duration of the second video is less than a duration of the first video, and the second video comprises at least the first photo,
    wherein before recording the first video, the method further comprises:
    enabling a "one record for multiple gains" function in response to a seventh operation of the user.

15. A video processing method, comprising:
    recording a first video in response to a first operation of a user;
    displaying a first interface, wherein the first interface is a play interface of the first video, the first interface comprises a first control and a first area, the first area displays a thumbnail of a first photo and a thumbnail of a second photo, the first photo is automatically taken at a first moment, the second photo is automatically taken at a second moment, and a recording process of the first video comprises the first moment and the second moment; and
    displaying a second interface in response to a second operation with respect to the first control, wherein the second interface is a play interface of a second video, a duration of the second video is less than a duration of the first video, and the second video comprises at least the first photo, wherein the first interface further comprises a deletion option; and the method further comprises:

displaying a third prompt window in response to an eleventh operation of the user with respect to the deletion option, wherein the third prompt window is used to prompt the user whether to delete the second video, the first photo, and the second photo.

16. An electronic device, comprising a processor and a memory, wherein the processor is coupled to the memory, the memory is configured to store a computer program, and when the computer program is executed by the processor, the electronic device is enabled to perform the method according to claim 1.

17. A chip, comprising a processor, wherein when the processor executes instructions, the processor performs the method according to claim 1.

* * * * *

UNITED STATES PATENT AND TRADEMARK OFFICE
CERTIFICATE OF CORRECTION

| | | |
|---|---|---|
| PATENT NO. | : 12,309,447 B2 | Page 1 of 1 |
| APPLICATION NO. | : 18/014553 | |
| DATED | : May 20, 2025 | |
| INVENTOR(S) | : Weilong Huo et al. | |

It is certified that error appears in the above-identified patent and that said Letters Patent is hereby corrected as shown below:

In the Specification

Column 13, Line 23, change "15 s" to --15s;--;

Column 16, Line 8, change "30 k" to --30k--; and

In the Claims

Column 41, Claim 1, Line 15, change "moment; and" to --moment;--.

Signed and Sealed this
Twenty-fourth Day of June, 2025

Coke Morgan Stewart
*Acting Director of the United States Patent and Trademark Office*